(12) United States Patent
Inaba et al.

(10) Patent No.: US 12,455,428 B2
(45) Date of Patent: Oct. 28, 2025

(54) LENS UNIT AND CAMERA MODULE

(71) Applicant: Maxell, Ltd., Kyoto (JP)

(72) Inventors: Akira Inaba, Kyoto (JP); Hiroyuki Hirama, Kyoto (JP); Yasushi Kato, Kyoto (JP); Takayuki Suginome, Kyoto (JP); Yusuke Baba, Kyoto (JP)

(73) Assignee: MAXELL, LTD., Kyoto (JP)

( * ) Notice: Subject to any disclaimer, the term of this patent is extended or adjusted under 35 U.S.C. 154(b) by 866 days.

(21) Appl. No.: 17/433,611

(22) PCT Filed: Feb. 26, 2020

(86) PCT No.: PCT/JP2020/007684
§ 371 (c)(1),
(2) Date: Aug. 25, 2021

(87) PCT Pub. No.: WO2020/175536
PCT Pub. Date: Sep. 3, 2020

(65) Prior Publication Data
US 2022/0146777 A1 May 12, 2022

(30) Foreign Application Priority Data

Feb. 26, 2019 (JP) .................. 2019-033018
Apr. 25, 2019 (JP) .................. 2019-083680
(Continued)

(51) Int. Cl.
*G02B 7/02* (2021.01)
*H04N 23/55* (2023.01)

(52) U.S. Cl.
CPC ............ *G02B 7/021* (2013.01); *G02B 7/025* (2013.01); *H04N 23/55* (2023.01)

(58) Field of Classification Search
CPC combination set(s) only.
See application file for complete search history.

(56) References Cited

U.S. PATENT DOCUMENTS

2009/0244736 A1 10/2009 Sasaki
2010/0022841 A1* 1/2010 Takahashi .......... A61B 1/00096
600/162

(Continued)

FOREIGN PATENT DOCUMENTS

CN 1975649 A 6/2007
CN 104395805 A 3/2015
(Continued)

OTHER PUBLICATIONS

Machine translation of CN 109375332A retrieved electronically from Espacenet Jan. 6, 2025 (Year: 2025).*

(Continued)

*Primary Examiner* — Thomas K Pham
*Assistant Examiner* — Jennifer A Jones
(74) *Attorney, Agent, or Firm* — XSENSUS LLP

(57) ABSTRACT

A lens unit that includes an optical element including at least a lens group in which a plurality of lenses are arranged along an optical axis; and a cylindrical lens barrel having an inner accommodation space for accommodating and holding the optical element, and the lens group includes a first lens located closest to the object side thereof; and a second lens adjacent to the first lens on the image side thereof, and optical elements and/or the optical element and the lens barrel are bonded to each other in an airtight state, such that an inter-lens space between the first lens and the second lens is sealed to the outside.

33 Claims, 29 Drawing Sheets

(30) Foreign Application Priority Data

Aug. 9, 2019 (JP) .................................. 2019-147375
Dec. 24, 2019 (JP) .................................. 2019-232765
Dec. 24, 2019 (JP) .................................. 2019-232770

(56) References Cited

U.S. PATENT DOCUMENTS

| 2015/0172521 | A1* | 6/2015 | Yasukochi | G02B 7/021 |
| | | | | 29/525.01 |
| 2018/0172986 | A1* | 6/2018 | Manushi | G02B 7/021 |
| 2018/0188472 | A1* | 7/2018 | Deng | G02B 7/025 |

FOREIGN PATENT DOCUMENTS

| CN | 109375332 A | * | 2/2019 | ............ G02B 7/021 |
| JP | 2005-326552 A | | 11/2005 | |
| JP | 2008-70484 A | | 3/2008 | |
| JP | 2008-233494 A | | 10/2008 | |
| JP | 2009-244388 A | | 10/2009 | |
| JP | 2009-244391 A | | 10/2009 | |
| JP | 2010-197877 A | | 9/2010 | |
| JP | 2011-101091 A | | 5/2011 | |
| JP | 2012-83439 A | | 4/2012 | |
| JP | 2013-231993 A | | 11/2013 | |
| JP | 2017-138526 A | | 8/2017 | |
| JP | 2017138523 A | * | 8/2017 | |
| JP | 2018-105905 A | | 7/2018 | |
| WO | 2010/087270 A1 | | 8/2010 | |
| WO | 2013/190918 A1 | | 12/2013 | |
| WO | WO-2014156954 A1 | * | 10/2014 | ........... G02B 13/004 |
| WO | 2014/188943 A1 | | 11/2014 | |
| WO | 2015/119297 A1 | | 8/2015 | |

OTHER PUBLICATIONS

Chinese Office Action dated Dec. 2, 2022, issued in corresponding Chinese Patent Application No. 202080007061.4, 7pp
Office Action in issued Mat 9, 2023 Japanese Patent Application No. 2019-033018 and Compter-generated English translation thereof, 5 pages.
Office Action issued on Sep. 27, 2022, in corresponding Japanese patent Application No. 2019-033018, 5 pages.
Office Action issued on Mar. 1, 2022, in corresponding Chinese patent Application No. 202080007061.4 , 17 pages.
International Search Report and Written Opinion mailed on Apr. 21, 2020, received for PCT Application PCT/JP2020/007684, Filed on Feb. 26, 2020, 10 pages including English Translation.

* cited by examiner (a)

○:no fogging ×:fogging

■ adhesive thickness 20μm

| sample | moisture permeability (g/m2·24hr) | width(mm) | | | required adhesion width A |
|---|---|---|---|---|---|
| | | 1.4 | 1.7 | 2.1 | |
| adhesive A (olefine base) | 45 | ○ | ○ | ○ | 1.36 |
| adhesive B (acryl base) | 50 | × | ○ | ○ | 1.52 |
| adhesive C (acryl base) | 60 | × | × | ○ | 1.84 |

■ adhesive thickness 25μm

| sample | moisture permeability (g/m2·24hr) | width(mm) | | | required adhesion width A |
|---|---|---|---|---|---|
| | | 1.4 | 1.7 | 2.1 | |
| adhesive A (olefine base) | 45 | × | ○ | ○ | 1.7 |
| adhesive B (acryl base) | 50 | × | × | ○ | 1.9 |
| adhesive C (acryl base) | 60 | × | × | × | 2.3 |

■ adhesive thickness 30μm

| sample | moisture permeability (g/m2·24hr) | width(mm) | | | required adhesion width A |
|---|---|---|---|---|---|
| | | 1.4 | 1.7 | 2.1 | |
| adhesive A (olefine base) | 45 | × | × | ○ | 2.04 |
| adhesive B (acryl base) | 50 | × | × | × | 2.28 |
| adhesive C (acryl base) | 60 | × | × | × | 2.76 |

LENS UNIT AND CAMERA MODULE

CROSS-REFERENCE TO RELATED APPLICATIONS

The present application is based on PCT filing PCT/JP2020/007684, filed Feb. 26, 2020, which claims priority to JP 2019-033018, filed Feb. 26, 2019, JP 2019-083680, filed Apr. 25, 2019, JP 2019-147375, filed Aug. 9, 2019, JP 2019-232765, filed Dec. 24, 2019 and JP 2019-232770, filed Dec. 24, 2019, the entire contents of each are incorporated herein by reference.

The present invention relates to a lens unit and a camera module that can form an in-vehicle camera mounted on a vehicle such as an automobile.

BACKGROUND ART

Conventionally, in-vehicle cameras have been installed in automobiles to support parking and to effect collision prevention by image recognition, and attempts have been further made to apply them to automatic driving. In addition, a camera module such as an in-vehicle camera usually has a lens unit including a lens group in which a plurality of lenses are arranged along an optical axis, a lens barrel for accommodating and holding the lens group, and a diaphragm member disposed between lenses at one location (see, for example, Patent Document 1).

Further, particularly regarding the lens unit for an in-vehicle camera, when at least a part of the lens unit is installed outside the vehicle, for the purpose of waterproofing and dustproofing, a lens group L is introduced and accommodated into an inner accommodation space S of a lens barrel 1102, as shown in FIG. 39. Then, with the lens group being incorporated and housed and held therein, an O-ring 1104 is inserted between the first lens 1100 (located closest to the object side of the lens group L) and the lens barrel 1102, and it is possible to prevent water or dust from invading into the lens group received in the lens barrel 1102. At this time, for example, a stepped small diameter portion 1100b having a smaller diameter on the image side of the lens 1100 is formed on the outer peripheral side surface 1100a of the first lens 1100, and an O-ring 1104 is provided on the small diameter portion 1100b. When mounted, the O-ring 1104 is radially compressed between the outer peripheral side surface 1100a of the first lens 1100 and the inner peripheral surface 1102a of the lens barrel 1102, so that the object-side end of the lens barrel 1102 is sealed.

Moreover, regarding the lens barrel 1102, in a state where the lens group L is incorporated and held in the inner accommodation space S, a caulking portion 1123 at the end portion (upper end portion in FIG. 39) of the lens barrel 1102 on the object side thereof is caused to radially inwardly caulk. By caulking, the first lens 1100 is fixed to the object-side end of the lens barrel 1102 by the caulking portion 1123.

CITATION LIST

Patent Document

Patent Document 1: Japanese Unexamined Patent Publication No. 2013-231993

SUMMARY OF THE INVENTION

Technical Problems

However, as described above, even if waterproof measure is taken by using the O-ring 1104, moisture (water vapor) can still enter the lens unit through various routes. For this reason, when a difference between the outside air temperature and the temperature inside the lens unit becomes large, the water vapor in the lens unit will condense and dew condensation occurs on the lens surface. In particular, a dew condensation occurs in an inter-lens space S1 between the first lens 1100 and the second lens 1101 adjacent thereto, which is most easily affected by a temperature difference from the outside, and particularly on the back surface 1100c of the first lens 1100.

The reason as to why a difference between the outside air temperature and the temperature inside the lens unit becomes large can be explained as follows. Namely, the temperature inside the lens unit rises in winter when the outside air is cold, for example, an image sensor (imaging element), which receives a light collected through the lens unit and is constantly energized for converting the received light into an electric signal, will produce a heat and thus increase the temperature inside the lens unit. Alternatively, the above reason may be explained differently. Namely, with the temperature inside the lens unit being high due to a heat from the image sensor or the surrounding environment (for example, a vehicle engine), the surface 1100d of the first lens 1100 is exposed to the outside air, rain, or the like, causing the first lens 1100 to be cooled.

Further, as a path allowing an intrusion of water vapor into the lens unit, there is a possibility that the path may be formed from a gap between the caulking portion 1123 of the lens barrel 1102 and the first lens 1100, leading to an inter-lens space S1 through a part of an area around the O-ring 1104, also through a gap between the first lens 1100 and the lens barrel 1102 and/or a gap between the second lens 1101 and lens barrel 1102. Alternatively, a path may be formed through a breathable resin forming the lens barrel 1102. Further, the image sensor (imaging sensor) arranged on the image side of the lens unit will rise to about 100 degrees in temperature during operation. At this time, the water contained in the substrate on which the image sensor is mounted is vaporized and reaches the inter-lens space S1.

In any case, when water vapor invades the lens unit through such a path and a temperature difference occurs between the outside air and the inside of the lens unit due to the above-mentioned factors, a dew condensation will occur in the inter-lens space S1, particularly on the back surface 1100c of the first lens 110. As a result, a captured image will be blurred, rendering it impossible to obtain a desired resolution (visibility deteriorates). Therefore, it is required to further secure the airtightness of the lens unit and suppress the invasion of water vapor into the inter-lens space S1.

The present invention has been accomplished in view of the above circumstances, and it is an object of the present invention to provide a lens unit and a camera module, which can suppress the invasion of water vapor into the inter-lens space between the lens located closest to the object and the lens adjacent thereto, thereby preventing a dew condensation on the lens surface.

Solution to Problems

To solve the above problem, the present invention provides an improved lens unit comprising: an optical element including at least a lens group in which a plurality of lenses are arranged along an optical axis; and a cylindrical lens barrel having an inner accommodation space for accommodating and holding the optical element.

Specifically, the lens group includes a first lens located closest to the object side thereof; and a second lens adjacent to the first lens on the image side thereof. In particular, optical elements and/or the optical elements and the lens barrel are bonded to each other in an airtight state, such that an inter-lens space between the first lens and the second lens is sealed to the outside.

In the present invention, an airtight material, an adhesive, or the like is used to bond together the optical elements (which might form a path allowing the intrusion of water vapor into the lens unit) and/or to bond together the optical elements and the lens barrel in an airtight state, such that the inter-lens space between the first lens and the second lens is sealed to the outside. Therefore, even in a high-humidity environment, it is still possible to inhibit the invasion of water vapor into the inter-lens space where dew condensation is most likely to occur, to inhibit the invasion of water vapor from the image side into the lens unit (improving airtightness), to reduce an amount of water vapor in the inter-lens space, thus suppressing a dew condensation on the lens surface, particularly on the surface (back surface) of the first lens on the image side.

In the above configuration, the inter-lens space between the first lens and the second lens does not need to be specified by only the first lens and the second lens. Namely, so long as the inter-lens space is between the first lens and the second lens, it is possible for the specification to be carried out by the first lens and the second lens, as well as optical elements other than the above-described lenses (for example, intermediate spacer to be inserted between the first lens and the second lens). Further, in the above configuration, the "optical element" includes not only the lenses constituting the lens group, but also all elements involved in the optical system in the lens barrel, including an intermediate spacer inserted between the lenses.

Further, in the above configuration, it is preferable that a sealing member be provided which seals between the first lens and the lens barrel. Such a sealing member ensures a sealing performance (waterproof performance) on a path that allows water vapor to enter the lens unit, and can contribute to the formation of a sealed state in the inter-lens space between the first and second lenses. Moreover, in the above configuration, the lens barrel preferably has a caulking portion for fixing the first lens of the lens group incorporated in the inner housing space in the optical axis direction by being caulked in the radial inward direction. Since such a caulking portion creates an optical axial force that pushes the first lens against the second lens, it can contribute to an adhesion of an interface between the first and second lenses, especially an adhesion required for the adhesion medium described above. In addition, not limited to caulking, it is also possible to use a fixing cap that is another member, forming a configuration for fixing the lenses by using a cap that may be screwed thereto to secure the lens. When the cap is used, it is desirable to increase the cap screwing load so that a compression load in the optical axis direction can be applied to the lens, thus improving the adhesion of the adhesion interface between the lenses.

Further, the camera module according to the present invention is characterized in that it includes the above-described lens unit.

According to such a configuration, it is possible to ensure a desired function and effect of the camera module described above.

Effects of the Invention

According to the present invention, it is possible to bond together the optical elements that can be formed into a path to allow water vapor to enter the lens unit and/or to bond together the optical elements and the lens barrel, such that the inter-lens space between the first lens and the second lens is sealed to the outside. In this way, even in a high humidity environment, it is still possible to inhibit the water vapor from entering the inter-lens space where a dew condensation is most likely to occur, thereby suppressing an invasion of water vapor into the lens unit which is facing toward the image side (improving airtightness). Therefore, it is possible to reduce an amount of water vapor in the inter-lens space, thus suppressing a dew condensation on the lens surface (back side), especially on the front surface (back surface) of the first lens.

DESCRIPTION OF THE DRAWINGS

FIG. 37 shows a series of test results in which the occurrence situations of fogging have been investigated when adhesion mediums having different moisture permeabilities are exposed to a high temperature and humidity environment by changing the adhesion thickness and adhesion width.

DESCRIPTION OF EMBODIMENTS

Hereinafter, description will be given to explain embodiments of the present invention with reference to the companying drawings.

Figure 39:
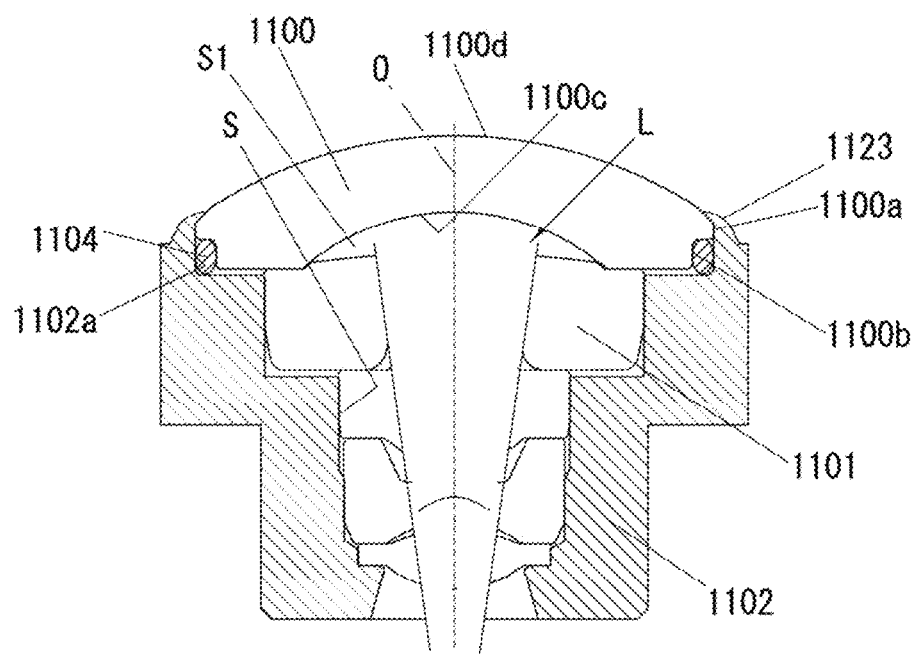
FIG. 39 Is a schematic cross-sectional view showing an example of a conventional lens unit.

The lens unit of the present embodiment described below is particularly for use with a camera module such as an in-vehicle camera. For example, the lens unit is fixedly attached on the outer surface side of an automobile, and wiring is drawn into the automobile and connected to a display or other device. Further, in all the drawings including FIG. 39 discussed above, hatching is omitted in the lenses for convenience of description.

First Embodiment

Figure 1:
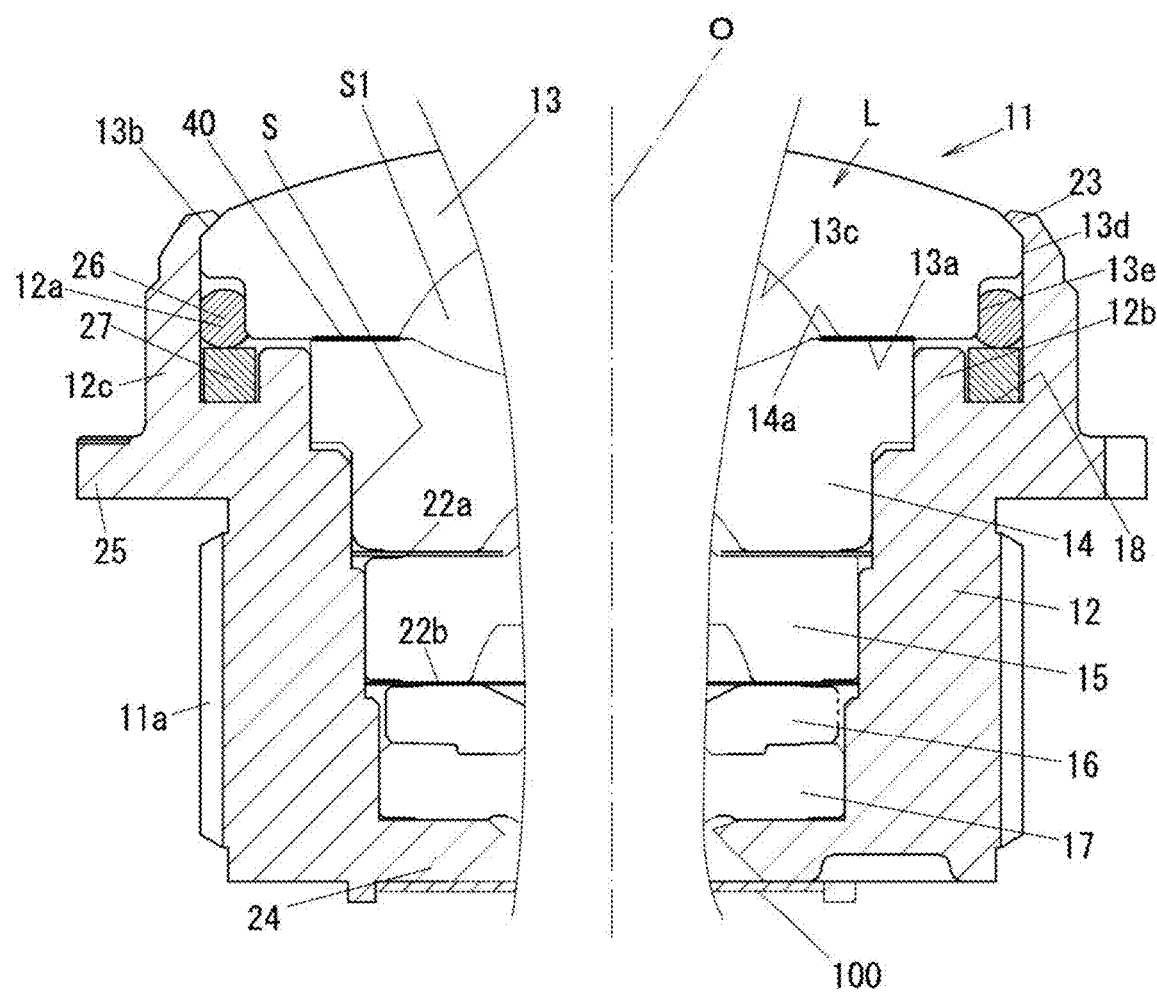
FIG. 1 Is a schematic cross-sectional view of the lens unit according to a first embodiment of the present invention.

FIG. 1 shows a lens unit 11 according to the first embodiment of the present invention. As shown, the lens unit 11 of the present embodiment includes, for example, a cylindrical lens barrel 12 made of resin and a plurality of lenses arranged in the stepped inner accommodation space S of the lens barrel 12. For example, beginning from the object side there are arranged five lenses including a first lens 13, a second lens 14, a third lens 15, a fourth lens 16 and a fifth lens 17, as well as two diaphragm members 22a, 22b. The first diaphragm member 22a of the two diaphragm members 22a, 22b arranged from the object side are disposed between the second lens 14 and the third lens 15. The second diaphragm member 22b viewed from the object side is disposed between the third lens 15 and the fourth lens 16. The diaphragm members 22a, 22b are each an "aperture diaphragm" that limits an amount of transmitted light and determines an F value which is an index of brightness, or a "light-blocking diaphragm" that blocks light rays which cause ghosts or light rays that cause aberrations. An in-vehicle camera having such a lens unit 11 includes a lens unit 11, a substrate having an image sensor (not shown), and an installation member (not shown) for installing the substrate in a vehicle such as an automobile.

A plurality of lenses 13, 14, 15, 16 and 17 incorporated and held in the inner accommodation space S of the lens barrel 12 are stacked and arranged with their respective optical axes mutually aligned. The respective lens 13, 14, 15, 16, 17 are arranged along one optical axis O to form a lens group L for use in imaging. In this case, the first lens 13 located closest to the object side and constituting the lens group L is a spherical glass lens having a convex surface on the object side and a concave surface on the image side, while the other lenses 14, 15, 16 are resin lenses. However, the present invention should not be limited as such (for example, the first lens 13 may also be a resin lens). When the first and second lenses 13, 14 are made of resin, the first lens 13 and the second lens 14 are allowed to have a linear expansion coefficient difference of $40 \times 10^{-6}$/K (m) or more (this forms a combination of lenses having different linear expansion coefficients).

The present invention including the present embodiment is characterized in that the first lens 13 and the second lens 14 are attached to each other by an adhesion (contact in an airtight state) between the mutually facing surfaces of the first lens 13 and the second lens 14, forming an inter-lens space S1 secured in a sealed state (to be described later) between the first lens 13 and the second lens 14. Meanwhile, it is possible to optionally set the number of lenses, the materials for forming the lenses and the lens barrel and the like according to an actual application or the like. Further, in the present embodiment, the fourth and fifth lenses 16, 17 located on the image side are bonded together, but this is not absolutely necessary. Moreover, if necessary, the surfaces of these lenses 13, 14, 15, 16, and 17 are each provided with an antireflection film, a hydrophilic film, a water repellent film, or the like.

Further, in the present embodiment, an O-ring 26 serving as a sealing member is inserted between the first lens 13 located closest to the object side and the lens barrel 12, thus keeping water and dust out of the lens group L received in the lens barrel 12. In this case, a stepped small diameter portion 13e having a smaller diameter on the image side of the lens 13 is formed on the outer peripheral surface 13d of the first lens 13, and an O-ring 26 is attached to the small diameter portion 13e. In this way, the O-ring 26 is compressed in the radial direction between the outer peripheral surface 13d of the first lens 13 and the inner peripheral surface 12a of the lens barrel 12, such that the end of the lens barrel 12 on the object side is in a sealed state. However, a sealing member inserted between the first lens 13 and the lens barrel 12 should not be limited to O-ring. In fact, it is also possible to use any shape of annular member as a sealing member so long as it can provide a sealing effect between the first lens 13 and the lens barrel 12.

A cylindrical inner wall 12b is formed on the object side within the lens barrel 12, a groove 18 is formed between the inner wall 12b and an outer wall 12c, while an annular body 27 is provided in the groove 18, coming into close contact with the O-ring 26. The reason as to why the groove 18 is formed between the inner wall 12b and the outer wall 12a may be explained as follows. Namely, if there is no groove and if the inner wall 12b and the outer wall 12a are integrally formed together, the wall thickness will become thicker. As a result, when molding and cooling the resin lens barrel 12, it becomes necessary to prevent large scars from occurring and to inhibit the dimensional accuracy from being deviated. The annular body 27 is composed of a substance having a relatively soft elasticity, for example, Teflon (registered trademark). The annular body 27 has a function of supporting the O-ring 26 in the optical axis direction. Since the annular body 27 is a member separated from the lens barrel 12, it can be changed into an annular shape having a different height according to the size of the O-ring 26. Here, the O-ring 26 provides an appropriate sealing effect with an appropriate elastic force.

Further, in the lens barrel 12, with the lens group L being incorporated and held in the inner accommodation space S, since the caulking portion 23 at the end of the lens barrel 12 (upper end portion in FIG. 1) on the object side is radially thermally caulked inwardly, it is possible to fix (in the optical axis direction) the first lens 13 located on the object side of the lens group L to the object side end of the lens barrel 12 by the caulking portion 23. At this time, a portion of the glass lens 13 to which the caulking portion 23 is pressure-caulked is formed as a portion 13b that has been obliquely cut into a flat portion so that it is possible to ensure a stable caulking.

Further, an inner flange portion 24 having an opening with a diameter smaller than that of the fifth lens 17 is provided at the image-side end portion (lower end portion in FIG. 1) of the lens barrel 12. The inner flange portion 24 and the caulking portion 23 hold and fix the plurality of lenses 13, 14, 15, 16, 17 and the diaphragm members 22a, 22b (forming the lens group L) within the lens barrel 12 in the optical axis direction.

The lens barrel 12 gradually decreases in its inner diameter from the object side toward the image side. Correspondingly, the outer diameters of the lenses 13, 14, 15, 16, and 17 gradually become smaller from the object side toward the image side. Basically, the outer diameters of the lenses 13, 14, 15, 16 and 17 are substantially equal to the inner diameters of the portions of the lens barrel 12 on which the lenses 13, 14, 15, 16 and 17 are supported. On the outer peripheral surface of the lens barrel 12, an outer flange portion 25 for use in installing the lens barrel 12 on the in-vehicle camera is provided on the outer peripheral surface of the lens barrel 12 in the form of a flange.

Figure 2:
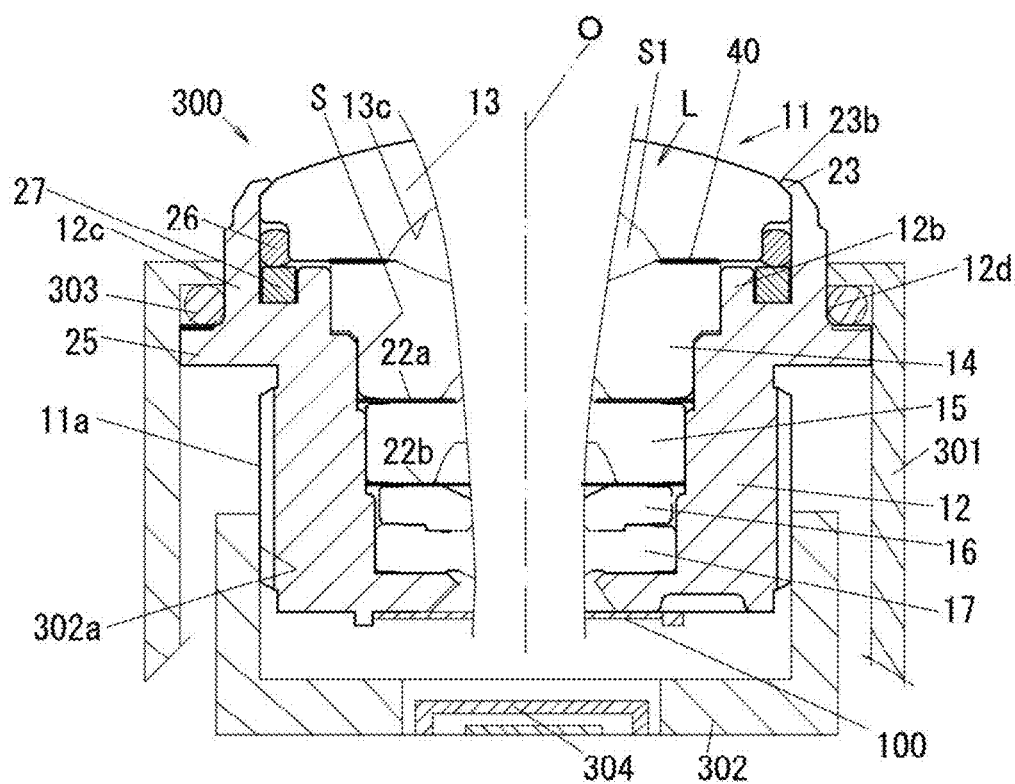
FIG. 2 Is a schematic cross-sectional view of a camera module containing the lens unit shown in FIG. 1.

Further, FIG. 2 is a schematic cross-sectional view of a camera module 300 of the present embodiment having the lens unit 11 shown in FIG. 1. As shown in the figure, the camera module 300 includes a lens unit 11 into which a filter 100 is attached. It should be noted that all lens units according to all the embodiments described below can each form a camera module shown in FIG. 2.

The camera module 300 includes an upper case (camera case) 301, which is an exterior component, and a mount (pedestal) 302 that holds the lens unit 11. Further, the camera module 300 includes a sealing member 303 and a package sensor (imaging element) 304.

The upper case 301 is a member that exposes the end portion of the lens unit 11 on the object side and covers other portions of the lens unit. The mount 302 is arranged inside the upper case 301 and has a female screw portion 302a that is screwed with the male screw portion 11a of the lens unit 11. The sealing member 303 is a member inserted between the inner surface of the upper case 301 and the outer peripheral surface 12d of the lens barrel 12 of the lens unit 11, and is also a member for maintaining an airtightness inside the upper case 301.

The package sensor 304 is arranged inside the mount 302 and is disposed at a position capable of receiving an image of an object formed by the lens unit 11. Further, the package sensor 304 includes CCD, CMOS or the like, and converts a light collected through the lens unit 11 into an electric signal. The converted electrical signal is converted into analog data or digital data, which are components of image data captured by the camera.

In the lens unit 11 and the camera module 300 having the above configuration, the first lens 13 located closest to the object side, as well as the first lens 13 and the second lens 14 adjacent to the first lens 13 on the image side have respectively mutually facing surfaces 13a, 14a facing each other in the optical axis direction. The facing region between these facing surfaces 13a, 14a are glued to each other such that the inter-lens space S1 between the first lens 13 and the second lens 14 is sealed to the outside. Here, the "facing region" between the mutually facing surfaces 13a, 14a of the lenses 13, 14 refers to an interval of 500 μm or less between the mutually facing surfaces 13a, 14a in the optical axis direction, including a state in which the mutually facing surfaces 13a, 14a are in contact with each other (hereinafter, the same applies to other sections in the present specification).

Particularly, in the present embodiment, the mutually facing surfaces 13a, 14a are bonded to each other using an adhesion medium 40 (see FIGS. 1 and 2), but it is also possible for the mutually facing surfaces 13a, 14a to be bonded to each other by using other bonding methods.

Figure 3:
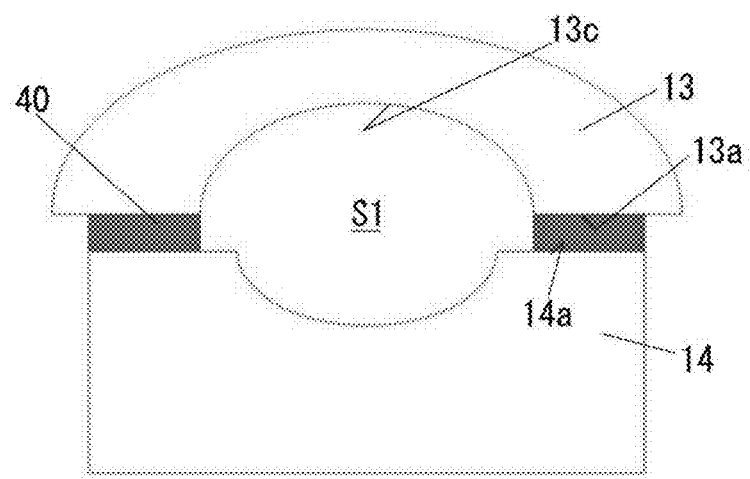
FIG. 3 Is a schematic diagram showing the first embodiment in which an adhesion between the facing surfaces of lenses is performed using an adhesion medium.

Here, as an adhesion medium 40 used in the present embodiment, it is possible to use, for example, an acrylic adhesive, an epoxy adhesive, or an olefin adhesive (hereinafter, in the present specification, an acrylic-based adhesive is an adhesive containing 50% by weight or more of acrylic resin, an epoxy-based adhesive is an adhesive containing 50% by weight or more of epoxy resin, and an olefin-based adhesive is an adhesive containing 50% by weight or more of olefin resin (a chain hydrocarbon having one double bond). It is also possible to use an elastic material having a viscosity (for example, gel-like material). Further, such an adhesion medium 40 is provided outside the effective diameters of the lenses 13, 14 (outside the optical surface through which light rays do not pass). An embodiment in which the adhesion medium 40 is arranged between the facing surfaces 13*a*, 14*a* in this way is schematically shown in FIG. 3 with a slight exaggeration.

Further, in the present embodiment, the adhesion medium 40 used for bonding together the mutually facing surfaces 13*a*, 14*a* has a "radial followability" that can follow a relative displacement between the lenses 13, 14 in the radial direction which is caused due to a difference in amount of expansion/contraction of the lenses when the temperature changes, which is in turn caused due to a difference in the linear expansion coefficient between the lenses 13, 14 (a flexibility to sufficiently withstand a radial stress applied to an adhesion interface of the lenses 13, 14 after the expansion (contraction) of the lenses 13, caused due to the temperature change), and/or a good "tight adhesion" that prevents the adhesion interface between the lenses 13, 14 from peeling off which will otherwise be caused due to a mutual separation between the lenses 13, 14 in the optical axis O direction because of an increase in the internal pressure of the inter-lens space S1 in a high temperature environment (an adhesion of the adhesion medium 40 to the mutually facing surfaces 13*a*, 14*a* of the lenses 13, 14), or a "optical axis direction followability" that can follow a separative displacement between the lens 13 and the lens 14.

The "radial followability" required for the adhesion medium 40 can be realized by setting the hardness of the adhesion medium 40 within a range of A10-A100 (Shore A hardness 10-100) in terms of Shore hardness, or by setting the hardness of the adhesion medium 40 within a range of D10-D90 (Shore A hardness 10-90) in terms of Shore hardness. Particularly, it is possible to obtain more favorable results in a range of A30-A95 or D10-D60. Further, such "radial followability" may also be realized by setting the hardness of the adhesion medium within a range of such a value, or by further ensuring the thickness of the adhesion medium to be equal to or larger than a predetermined value. As means for ensuring the thickness of the adhesion medium 40 to be equal to or greater than a predetermined value (ensuring a movement along the radial direction of the adhesion medium 40), for example, a filler may be contained in the adhesion medium 40, and the maximum length of these fillers may be set to 5-500 μm. Although depending on the orientation of the fillers in the adhesion medium, if the fillers are extending in the adhesion medium 40 in the optical axis O direction, the thickness of the adhesion medium 40 will be decided by the length of the fillers.

Further, as another means for ensuring the thickness of the adhesion medium 40 to be equal to or larger than a predetermined value, at least a part of the mutually facing surfaces 13*a*, 14*a* of the first lens 13 and the second lens 14 facing each other is provided with a protrusion (convex portion) having a height of 5-500 μm. Related examples are respectively shown in FIGS. 4-6.

Figure 4:
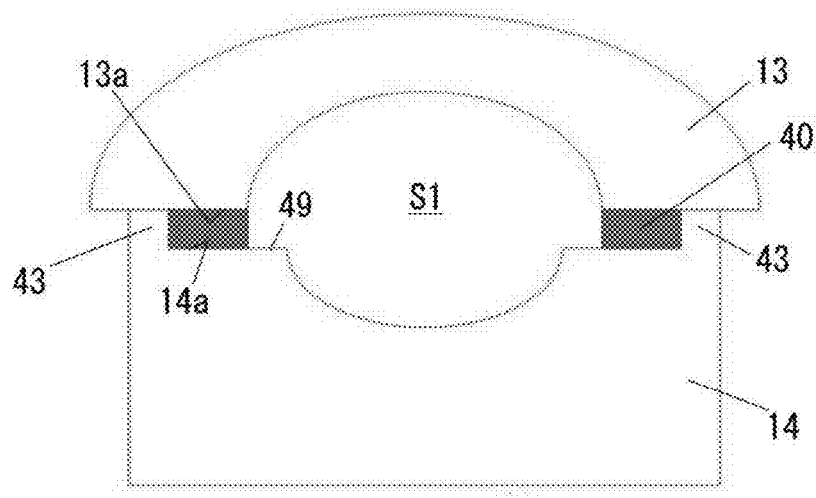
FIG. 4 Is a schematic diagram showing a second embodiment in which an adhesion between the facing surfaces of lenses is performed using an adhesion medium.
Figure 8:
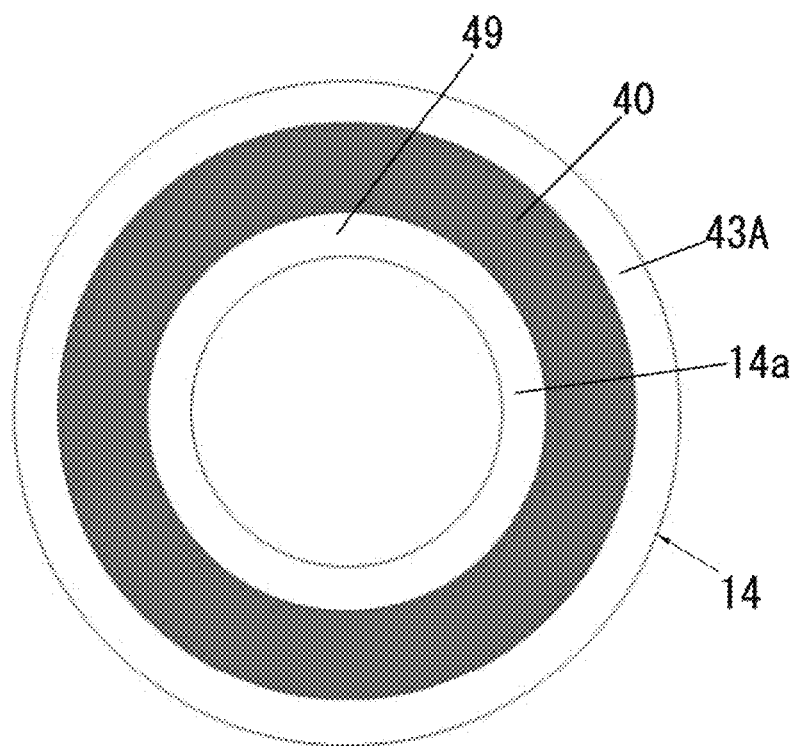
FIG. 8 Is a plan view of the second lens showing the first embodiment of the protrusion of FIG. 4.
Figure 9:
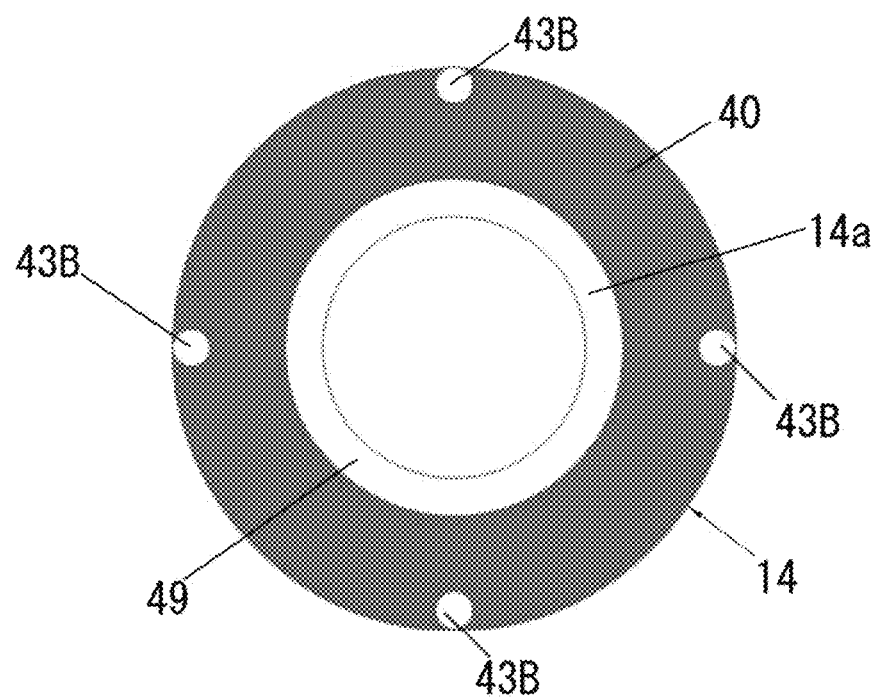
FIG. 9 Is a plan view of the second lens showing the second embodiment of the protrusion of FIG. 4.

In FIG. 4, a protrusion 43 having a height of 5-500 μm is provided on the radially outer side (outermost side) of the facing surface 14*a* of the second lens 14. As shown in FIG. 8, such a protrusion 43 may be annular (ring) (annular projection 43A). Alternatively, as shown in FIG. 9, it is also possible to provide a plurality of columnar projections 43B (each having a circular cross section) at a predetermined angular interval along the circumferential direction (in the accompanying drawings, there are four columnar protrusions paced apart by an angular interval of 90° along the circumferential direction). Such protrusions (43A, 43B) abut on the facing surface 13*a* of the first lens 13 and are disposed between the facing surfaces 13*a*, 14*a* of the first and second lenses 13, 14 (if it is the annular protrusion 43A, it is radially inside the annular projection 43A (see FIG. 8). On the other hand, if it is the columnar projection 43B, a filling region can be defined for the adhesion medium 40 to be introduced between the columnar projections 43B and disposed radially inwardly beyond the columnar projection 43B (see FIG. 9). Depending on the height of the projections, it is possible to structurally decide and adjust the thickness (dimension in the optical axis O direction) of the adhesion medium 40. When introducing the adhesion medium 40, the annular projection 43A shown in FIG. 8 makes it easy to control the flow of the adhesion medium 40, rendering it possible to prevent the adhesion medium 40 from flowing out of the facing surface 14*a*. On the other hand, regarding the columnar projection 43B shown in FIG. 9, since a wide adhesion area can be ensured, it is possible to enhance an adhesion force.

Figure 5:
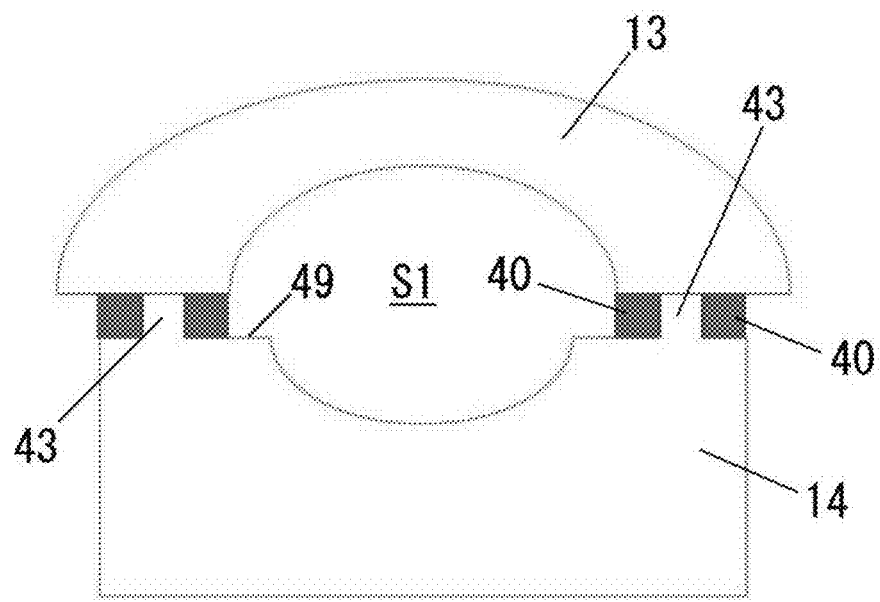
FIG. 5 Is a schematic diagram showing a first modification based on FIG. 4.
Figure 6:
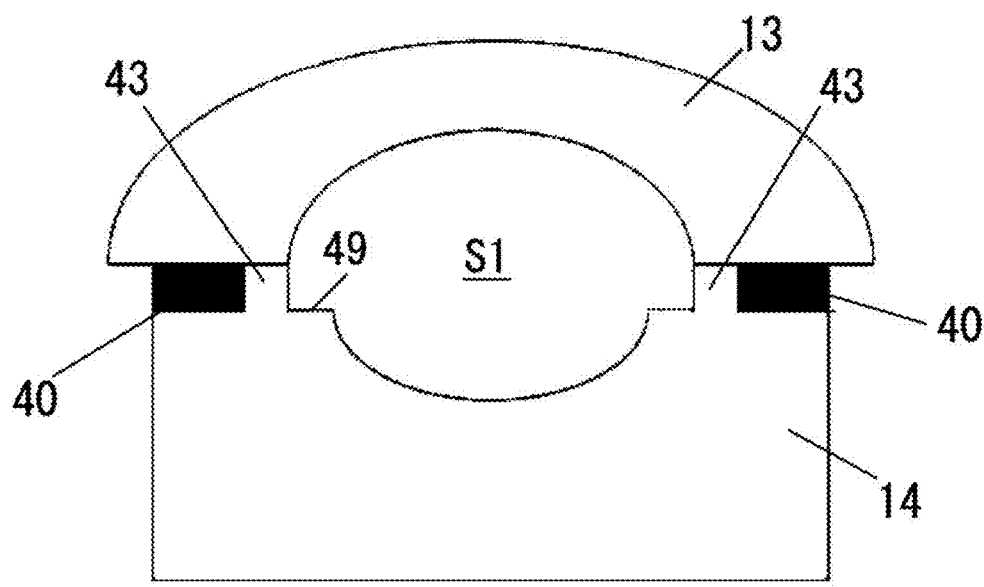
FIG. 6 Is a schematic diagram showing a second modification based on FIG. 4.

In FIG. 5, a protrusion 43 is provided at a height of 5-500 μm near the center of the facing surface 14*a* of the second lens 14 in the radial direction. In FIG. 6, the protrusion 43 having a height of 5-500 μm is provided radially inwardly on the facing surface 14*a* of the second lens 14, with an annular region 49 (a region within the effective diameter of the lens) being left. In FIG. 4 and FIG. 5, the annular region 49 is ensured as a region where the adhesion medium 40 is not introduced (applied). In these cases, the protrusion 43 may be an annular protrusion 43A shown in FIG. 8 or a plurality of columnar protrusions 43B shown in FIG. 9. Such protrusions 43 (43A, 43B) abut on the facing surface 13*a* of the first lens 13 and are disposed between the facing surfaces 13*a*, 14*a* of the first and second lenses 13, 14 (if it is the annular protrusion 43A, it is radially inside and outside the annular projection 43A). On the other hand, if it is the columnar projection 43B, a filling region can be defined for the adhesion medium 40 to be introduced between the columnar projections 43B and disposed radially inwardly and outwardly beyond the columnar projection 43B. Depending on the height of the projections, it is possible to structurally decide and adjust the thickness (dimension in the optical axis O direction) of the adhesion medium 40.

In FIGS. 4-6, the annular protrusion 43 is provided at only one location, but it can also be set in any other optional manners. For example, it is possible for the annular protrusion 43 to be set in two locations on the outer side and the inner side of the facing surface 14*a*. Similarly, the columnar protrusions 43B shown in FIG. 9 are not limited to four, and the purpose of ensuring the thickness of the adhesion medium 40 can be achieved by installing three or more.

Figure 7:
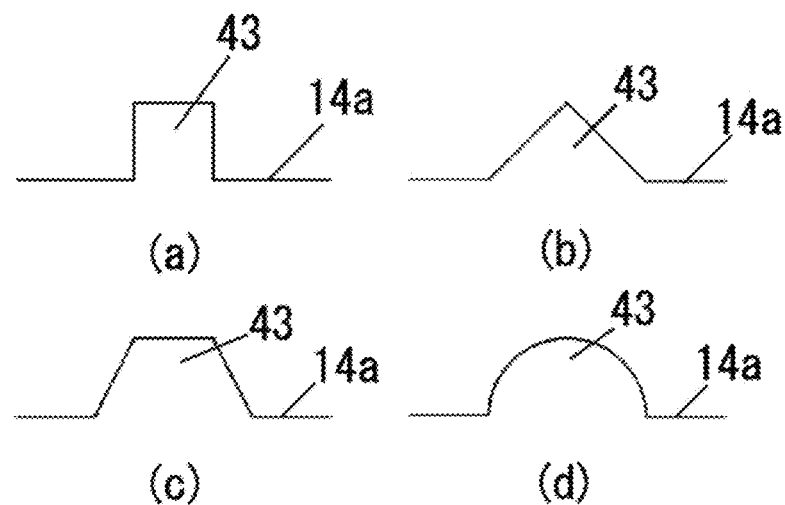
FIGS. 7(a)-7(d) are line diagrams showing four embodiments of protrusions.

The cross-sectional shape of the protrusions 43 (43A, 43B) (cross-section is formed by cutting, using a plane extending in the radial direction) may be a square as shown in FIG. 7(*a*) (it is also possible to use a rectangular shape such as a rectangle). Further, the cross-sectional shape of the protrusions 43 may also be a triangle as shown in FIG. 7(*b*), or it may be a trapezoid as shown in FIG. 7(*c*). Further, it may be a semicircle as shown in FIG. 7(*d*). Of course, the cross section of the protrusion 43 is not limited to these shapes, and any other shape can also be appropriately selected.

Figure 10:
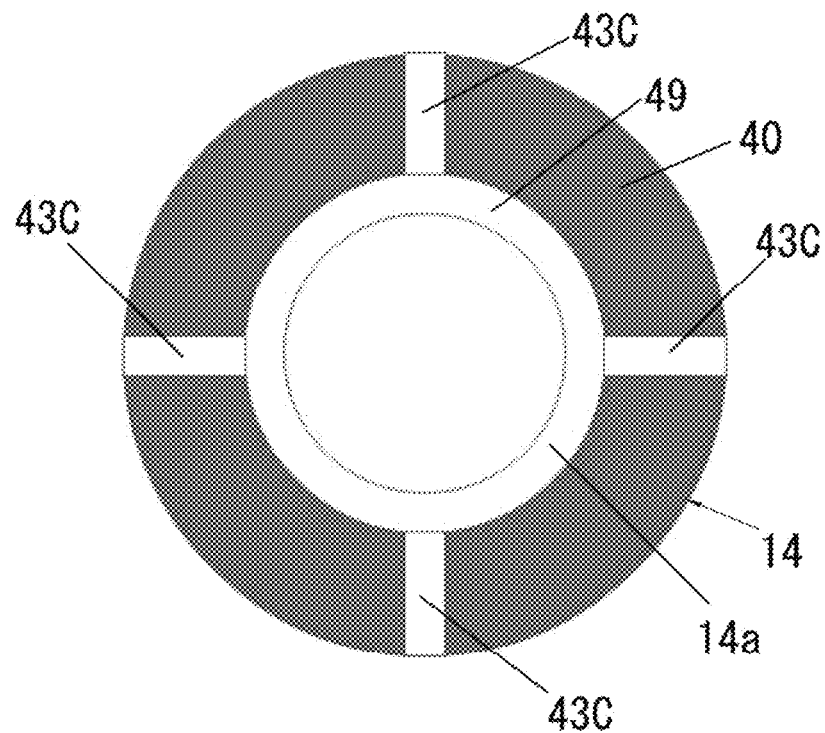
FIG. 10 Is a plan view of the second lens showing another embodiment of the protrusion.

Further, as shown in FIG. 10, the protrusion provided on the facing surface 14a of the second lens 14 may be a radially extending protrusion 43C extending along the radial direction. In this case, it is preferable that the cross-sectional shape of the protrusion 43C be formed by adopting one of the cross-sectional shapes shown in FIG. 7. Particularly, as shown in FIG. 10, radially extending projections 43C are provided radially (four radially extending projections 43C are provided at an interval of 90° in the circumferential direction). Such radially extending projections 43C are used to define a filling region for the adhesion medium 40 to be introduced between the radially extending projections 43C, and to divide the adhesive surface (adhesive layer) to form adhesive layers, thereby preventing an overall peeling of the adhesive layer. Namely, by dividing the adhesive layer, even if a part of the adhesive layer is peeled off, it is still possible to inhibit such peeling from spreading over the entire adhesive surface. In FIG. 10, four radially extending projections 43C are used, but the present invention is not limited to this, and it is also possible to reach the desired purpose by setting three or more projections.

Figure 11:
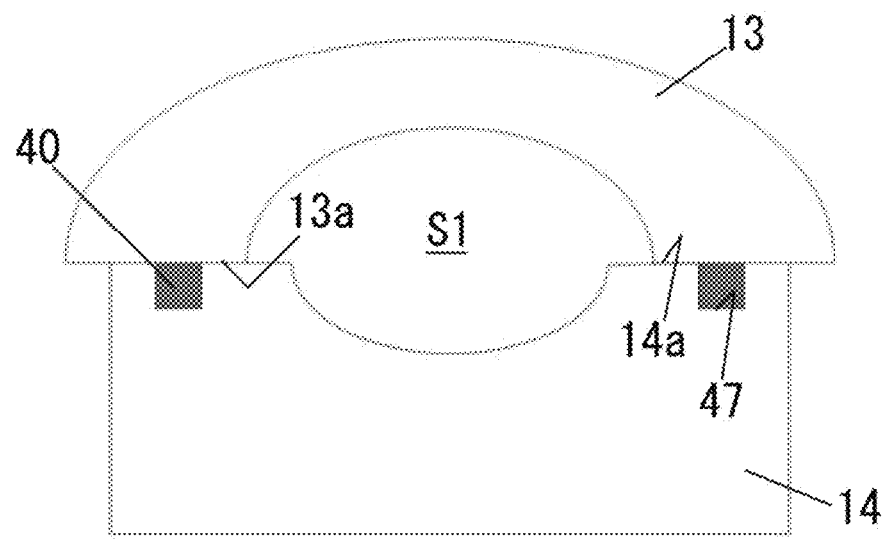
FIG. 11 Is a schematic diagram showing a third embodiment in which an adhesion between the lens facing surfaces is performed using an adhesion medium.
Figure 12:
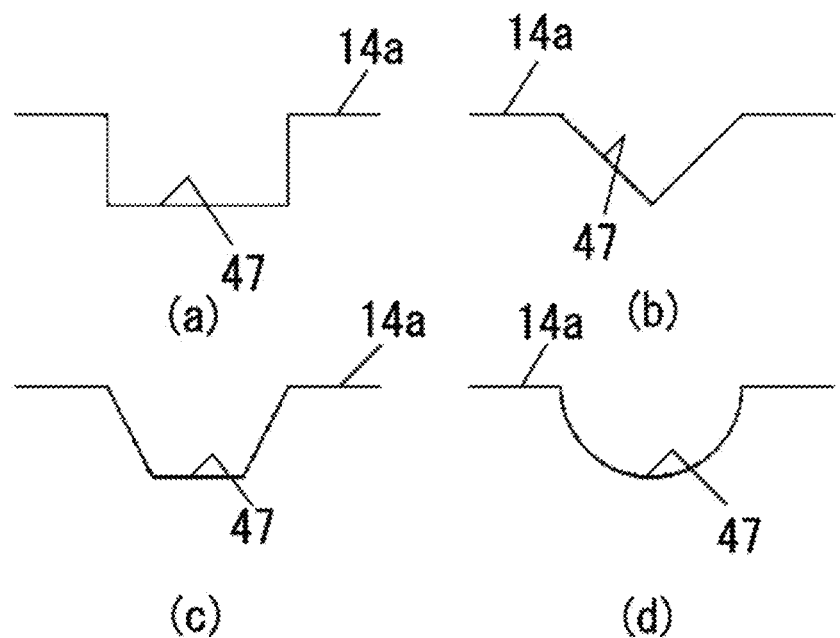
FIGS. 12 (a)-(d) are line diagrams showing four embodiments of recess.

In the examples of FIGS. 4-10, the protrusions 43 (43A, 43B, 43C) are provided only on the facing surface 14a of the second lens 14, but it is also possible to provide the protrusions 43 (43A, 43B, 43C) on the facing surface 13a of the first lens 13. Alternatively, the protrusions 43 (43A, 43B, 43C) may be provided on both the two facing surfaces 13a, 14a of the first lens 13 and the second lens 14. Further, instead of the protrusions, it is also possible for a recess (for receiving the adhesion medium 40) to be formed on at least one of two facing surfaces 13a, 14a of the first lens 13 and the second lens 14 facing each other. For example, in FIG. 11, an annular recess 47 is formed near the center of the facing surface 14a of the second lens 14 in the radial direction. If the recess 47 for receiving the adhesion medium is provided, it is possible to prevent an outflow of the adhesion medium 40 from an adhesion interface, and to allow the adhesion medium 40 to be easily applied to the adhesion interface. Further, the cross-sectional shape of the recess 47 (cross-section is formed by cutting, using a plane extending in the radial direction) may be rectangular shown in FIG. 12(*a*), and it is also possible to use a cross section shape such as a triangle shown in FIG. 12 (*b*). Alternatively, the cross-sectional shape of the recess 47 may be a trapezoid shown in FIG. 12 (*c*). Further, it may be a semicircle shown in FIG. 12(*d*). Of course, the present invention is not limited to these shapes, and any other shape can be appropriately selected. On the other hand, to ensure both of the lens facing region and the adhesion region in the radial direction, it is preferable that the width of the recess is 10-95%, more preferably 30-90% of the facing region of the lens 13 and the lens 14.

Further, as another means for structurally ensuring the thickness of the adhesion medium 40 to be equal to or larger than a predetermined value, it is possible to provide a sheet having a thickness of 5-500 μm between the facing surfaces 13a, 14a of the first and second lenses 13, 14. In this case, as a material for forming such a sheet, it is preferable to use EPDM, which is waterproof and inexpensive, as shown in FIGS. 13-15.

Figure 13:
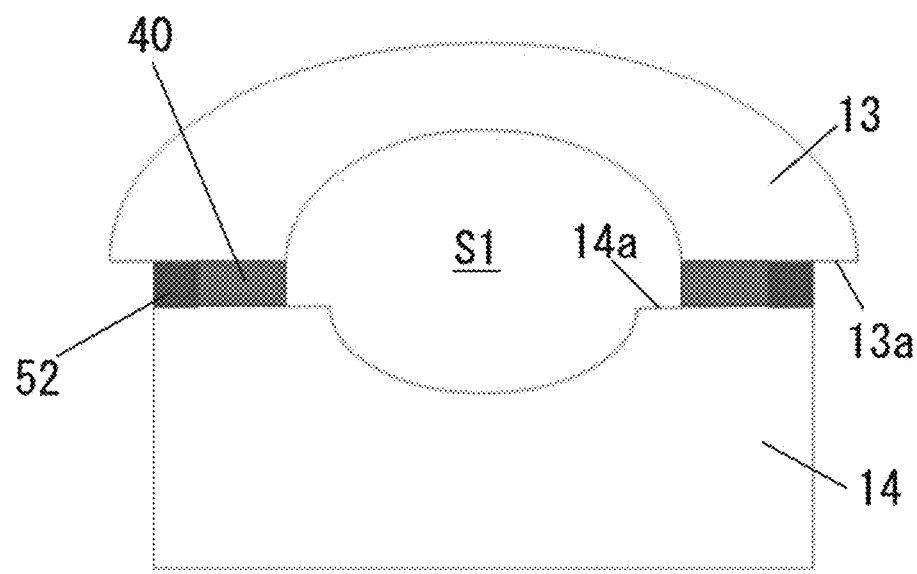
FIG. 13 Is a schematic diagram showing a fourth embodiment in which an adhesion between lens facing surfaces is performed using an adhesion medium.

In FIG. 13, an annular sheet 52 having a thickness of 5-500 μm is arranged on the outer side in the radial direction between the facing surfaces 13a, 14a. Such a sheet 52 is inserted between the facing surfaces 13a, 14a, and defines a filling region between the facing surfaces 13a, 14a for introducing the adhesion medium 40 radially inwardly beyond the sheet 52. The thickness of the adhesion medium (dimensions in the optical axis O direction) can be structurally defined and adjusted according to a desired thickness. Further, such an arrangement of the sheet 52 makes it possible to dispense with the need to provide the protrusions or the like on the lenses 13, 14 as described above (which is for the purpose of ensuring the thickness of the adhesion medium), thus making it easy to form the lenses 13, 14.

Figure 14:
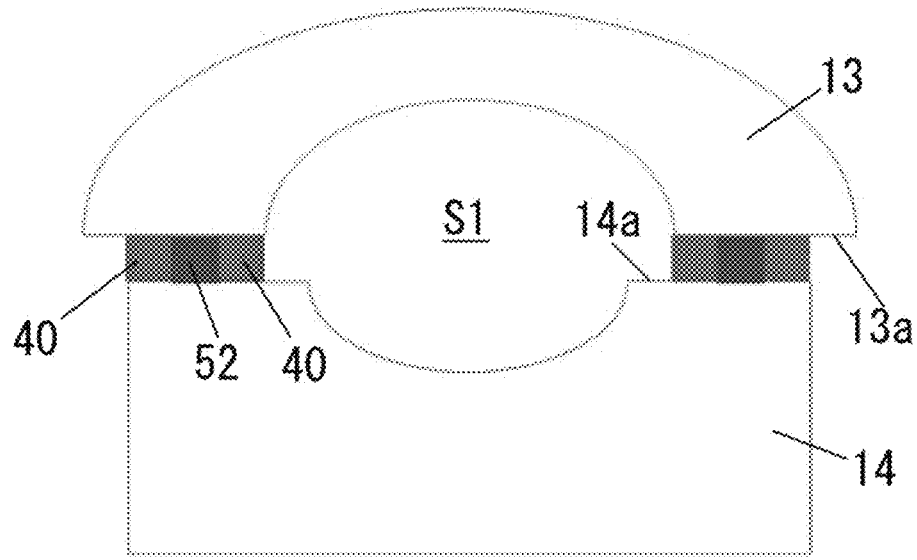
FIG. 14 Is a schematic diagram showing a first modification based on FIG. 13
Figure 15:
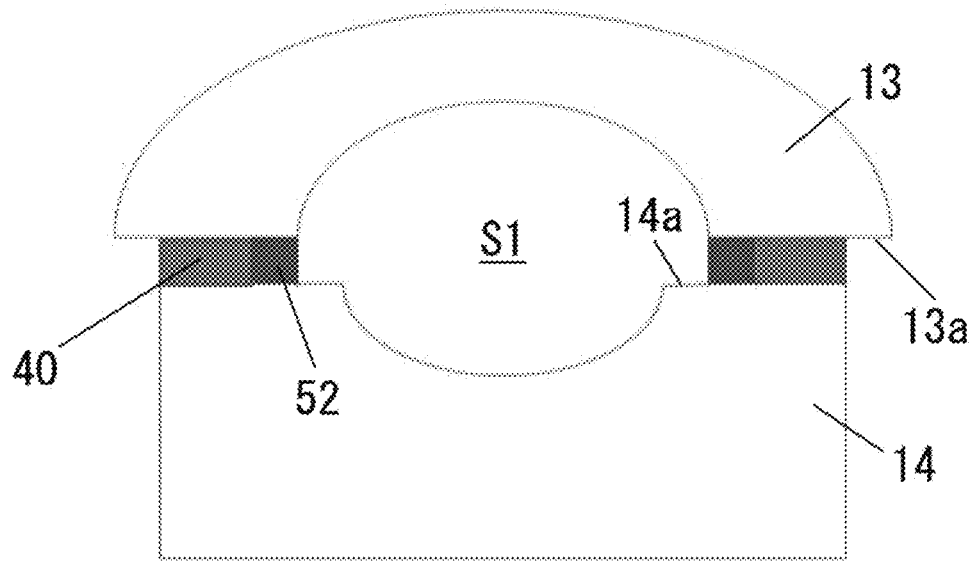
FIG. 15 Is a schematic diagram showing a second modification based on FIG. 13

Similarly, as shown in FIGS. 14-15, an annular sheet 52 having a thickness of 5-500 μm is arranged near the center in the radial direction and disposed inwardly in the radial direction between the facing surfaces 13a, 14a.

Although, as shown in FIGS. 13-15, the annular sheet 52 is set at only one location, it is also possible to set such an annular sheet in any optional manner. For example, it is possible for the annular sheet 52 to be set at two locations on the outer side and the inner side of the facing surface 14a. Further, as shown in FIG. 10, it is possible for the annular sheet 52 to be a radially arranged sheet extending in the radial direction.

Further, "tight adhesion" or "optical axis direction followability" required by the adhesion medium 40 described above can be realized by setting the surface roughness of at least one facing surface 13a (14a) of the first lens 13 and the second lens 14 at 0.01-200 μm in terms of square average roughness Rq. This is particularly beneficial when the first and second lenses 13, 14 are formed of glass that does not have to be deliberately considered regarding the above-mentioned "radial followability". This is because, in the case of glass being used, it is usually necessary to pay particular attention to the peeling of the adhesion interface between the lenses 13, 14 (which is usually caused due to an increase in the internal pressure of the inter-lens space S1 when in a high temperature environment).

Further, in the present embodiment, it is preferable that the water absorption rate of the adhesion medium 40 be 5.0 wt % (JIS K6911 (1 hour boiling)) or lower. By setting the water absorption rate of the adhesion medium 40 to be low in this way, it is possible to effectively suppress the infiltration of water vapor into the inter-lens space S1. Further, in the present embodiment, it is preferable that the adhesion medium 40 be black in color (the light transmittance of the adhesion medium 40 is 20% or less in a wavelength range of 450 nm-650 nm). If the adhesion medium 40 is made black in this way to suppress its light transmittance, it is possible to omit the blackening process for shading and preventing ghosting (the adhesion medium 40 can also serve as black ink). However, this does not hamper the combined use of black ink with the adhesion medium. Further, it is desirable to use a material for the sheet 52 having a light transmittance of 20% or less and a single-sided reflectance of 10% or less at a range of 450-650 nm. As a result, it is possible to suppress the occurrence of ghosts and flares caused by stray light. For example, it is possible to use a light-blocking resin material such as that used as a diaphragm member, or a light-blocking material obtained by blackening a thin metal plate. Further, in the present embodiment, it is preferable that the pressure in the inter-lens space S1 between the first lens 13 and the second lens 14 be at or below the atmospheric pressure under a room temperature of 20 degrees. In this way, if the pressure in the inter-lens space S1 is at atmospheric pressure or less, it is possible to avoid an increase in the internal pressure of the inter-lens space S1 even in a high temperature environment. Therefore, it is possible to solve a problem of peeling off on the adhesion interface between the lenses 13, 14, which is caused due to a mutual separation between the lenses 13, 14 in the optical axis O direction. As a method for the lens facing surfaces 13a, 14a to adhere to each other so that the pressure in the inter-lens space S1 becomes atmospheric pressure or less, it is possible to perform an adhesion between the lens facing surfaces 13a, 14a in a vacuum atmosphere, such that the adhesion can be carried out while sucking and degassing the inter-lens space S1.

As described above, according to the present embodiment, the facing surfaces 13a, 14a of the first lens 13 and the second lens 14 (which can be a path allowing water vapor to enter the lens unit 11) are adhered to each other such that the inter-lens space S1 between the first lens 13 and the second lens 14 is sealed to the outside. For this reason, even in a high-humidity environment, it is still possible to inhibit an invasion of water vapor into the inter-lens space S1 where a dew condensation is most likely to occur, and further to inhibit the invasion of water vapor into the lens unit 11 toward the image side (improving airtightness). Moreover, it is possible to reduce an amount of water vapor in the inter-lens space S1, to inhibit the dew condensation on the lens surface, particularly on the image-side surface (back surface 13c) of the first lens 13. Namely, according to such an adhesion between the lenses 13, 14, it is possible to ensure a highly reliable sealed state in the inter-lens space S1.

In the present embodiment, one of the first lens and the second lens is made of glass and the other is made of resin, but it is also possible for both the first lens and the second lens to be made of resin. In such case, a difference between the two linear expansion coefficients is allowed to be $40 \times 10^{-6}$/K (m) or more (forming a combination of lenses having different linear expansion coefficients). As described above, when the lenses facing each other are bonded to each other using an adhesion medium, the adhesion medium has a "radial followability" that can follow the relative displacement between the lenses in the radial direction, which is caused by a difference in an amount of expansion/contraction between the lenses when the temperature changes (which is in turn caused due to a difference in the coefficient of linear expansion between the lenses). Therefore, even if the lenses have different linear expansion coefficients in this way, it is still possible to achieve a highly reliable sealed state in the space between the lenses.

Second Embodiment

Figure 16:
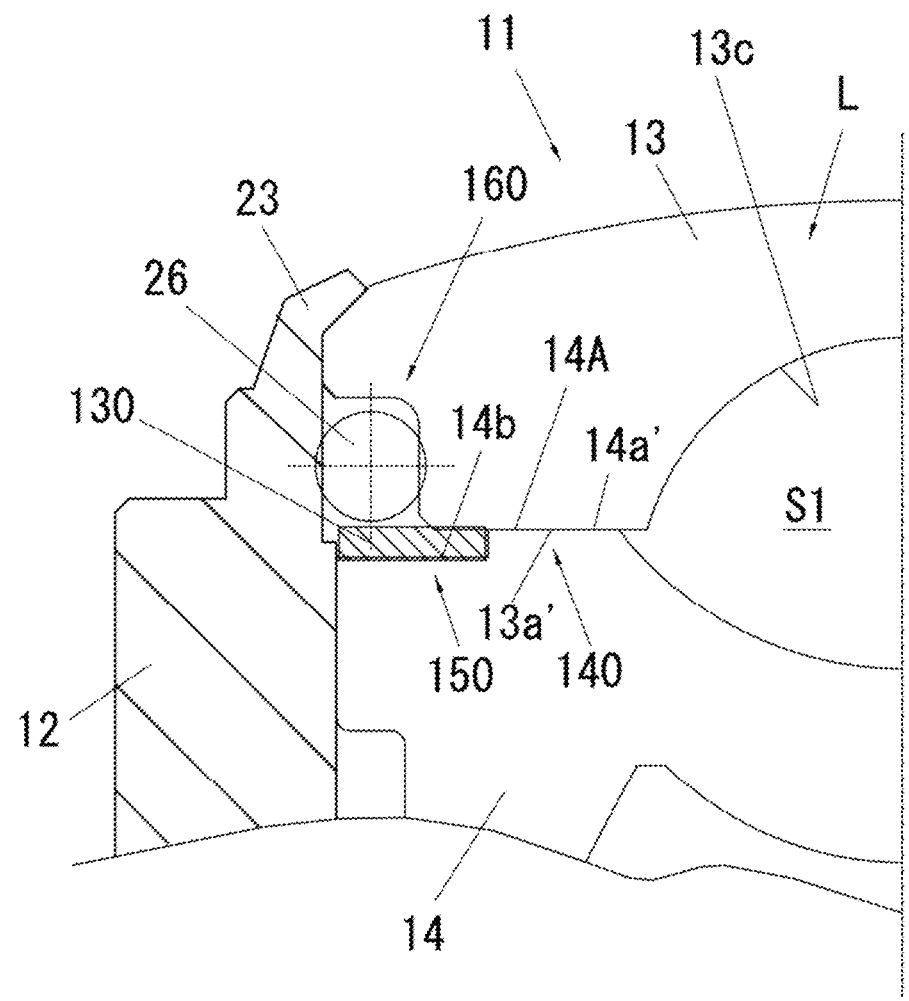
FIG. 16 Is a main portion enlarged diagram of the lens unit according to the second embodiment of the present invention.

FIG. 16 is an enlarged view showing a main portion of the lens unit according to the second embodiment of the present invention. In the present embodiment, unlike the first embodiment, since the first lens 13 and the second lens 14 have substantially the same diameter, the groove 18 and the annular body 27 are not provided. Therefore, the inner wall 12b is not formed on the lens barrel 12. Further, the shapes of the first lens 13 and the second lens 14 are also slightly different from those of the first embodiment (the second lens 14 is a resin lens having a concave surface on the object side and a convex surface on the image side).

As shown in FIG. 16 which has been enlarged for clear indication, the first lens 13 of the lens group L is in contact with the second lens 14 on the image side in the optical axis direction. The contact surfaces 13a', 14a' of the first lens 13 and the second lens 14 are in contact with each other. On the other hand, in the present embodiment, the contact surface 14a' of the second lens 14 is provided with, for example, a notched groove-shaped annular recess 14b. Therefore, the portion of the contact surface 14a' with the annular recess 14b is not in contact with the contact surface 13a' of the first lens 13. Further, the annular recess 14b is extending from a portion of the first lens 13 facing the contact surface 13a' to a portion facing the O-ring 26. In other words, the second lens 14 has a support surface 14A which faces the contact surface 13a' of the first lens 13 to support the first lens 13, and is extending to project outwardly in the radial direction beyond the contact surface 13a' of the first lens 13. Here, the support surface 14A has a contact surface 14a' that abuts the contact surface 13a' of the first lens 13 and also has an annular recess 14b.

Then, the annular recess 14b is filled with an airtight material 130 that ensures an airtightness between the first and second lenses 13, 14. Specifically, in the present embodiment, an annular rubber material or an adhesive (adhesion medium) is used to fill the annular recess 14b in the following part: a portion serving as a path allowing the intrusion of water vapor into the lens unit 11, i.e., a gap between the contact surfaces 13a', 14a' of the first lens 13 and the second lens 14, which can guide water vapor, from between the caulking portion 23 of the lens barrel 12 and the first lens 13, into the inter-lens space S1 (defined by the concave surface on the image side of the first lens 13 and the convex surface on the object side of the second lens 14) formed between the first and second lenses 13, 14. In detail, an annular rubber material serving as an airtight material 130 is used to fill and be arranged in the annular recess 14b by press fitting or the like. Alternatively, an adhesive (adhesion medium) serving as an airtight material 130 is used to fill the annular recess 14b.

In other words, in the present embodiment, the annular facing region 140 and the airtight region 150 are adjacent to each other along the radial direction of the first and second lenses 13, 14 (the first and second lenses 13, 14 are in airtight contact with each other). In detail, the annular facing region 140 is formed by allowing the first and second lenses 13, 14 to get into contact with each other on the contact surfaces 13a', 14a', and the airtight region 150 is formed by allowing the airtight material 130 to be in contact with the contact surface 13a' of the first lens 13 while at the same time maintaining the contact state between the contact surfaces 13a', 14a' by filling the annular recess 14b with the airtight material 130. Namely, in the present embodiment, on a path that can serve as a passage for water vapor, i.e., a path extending from the gap between the caulking portion 23 of the lens barrel 12 and the first lens 13 to the inside of the inter-lens space S1, there are, from the upstream side, a waterproof region 160 with the O-ring 26, an airtight region 150, and a facing region 140, arranged in such an order, with the waterproof region 160 and the airtight region 150 being located substantially adjacent to each other along the optical axis O direction. Since the airtight region 150 and the facing region 140 are positioned adjacent to each other along the radial direction of the lenses 13, 14, it is possible to maintain the waterproofness and airtightness of this path at high levels.

In this case, the hardness of the sealing member made of the O-ring 26 is set higher than the hardness of the airtight material 130. Therefore, it is possible to suppress a reaction force against the caulking portion which occurs on the airtight material, while improving the waterproof effected by the O-ring which is a sealing member. Further, in this case, the O-ring is compressed in the radial direction so as not to generate a reaction force with respect to the caulking portion as described above. Specifically, for example, the O-ring 26 serving as a sealing member preferably has a hardness of 50-70 degrees and a high elastic force to enhance the waterproof performance. On the other hand, the airtight material 30, not requiring a waterproof performance, preferably has a hardness of about 20-40 degrees if for example a rubber material is used. Further, it is particularly preferable that the airtight material 130 be an adhesive having a smaller reaction force than the rubber material. For use as an adhesive, it is more preferable to use an adhesive having a high viscosity (for example, a viscosity of about 62000 mPa·s). In addition, examples of the airtight material include Teflon and the like.

As described above, according to the present embodiment, the airtight material 130 is inserted into a portion serving as a path allowing water vapor to enter the lens unit 11. Namely, the airtight material 130 is inserted into a position between the contact surfaces 13a', 14a' of the first lens 13 and the second lens 14, which can guide water vapor from the gap between the caulking portion 23 of the lens barrel 12 and the first lens 13 into the inter-lens space S1 between the first and second lenses 13, 14. Accordingly, while ensuring the sealing performance (waterproof performance) by the O-ring 26 located in the path, it is possible to inhibit the intrusion of water vapor into the inter-lens space S1 where a dew condensation is most likely to occur, further to inhibit the water vapor from invading into the lens unit 11 toward the image side (improve airtightness). In addition, it is possible to reduce the amount of water vapor in the inter-lens space S1, and to prevent a dew condensation on the lens surface, particularly on the back surface 13c on the image side of the first lens 13.

Further, according to the present embodiment, the airtight material 130 is not inserted between the contact surfaces 13a', 14a' of the first and second lenses 13, 14 so as to separate them from each other, while the annular recess 14b is provided on the contact surface 14a' of the lens 14, and the annular recess 14b is filled with the airtight material 130. In this way, not only can the lenses 13, 14 exactly come into contact with each other to contribute to improving the airtightness between the lenses 13, 14, but also it is possible to accurately maintain the distance between the lenses at a desired distance by contact between the lenses 13, 14. Moreover, It is possible to prevent the optical performance from being adversely affected by virtue of the insertion of the airtight material 130.

Moreover, when the airtight material 130 is used to fill the annular recess 14b in this way, it is possible for the airtight material 130 not to generate a reaction force with respect to the caulking portion 23 through the first lens 13 in the optical axis direction, and the caulking force will not be unfavorably affected (it is possible to minimize a stress applied to the caulking portion 23, thereby improving a reliability of lens fixing by the caulking portion 23). Further, from the viewpoint that the airtight material does not generate a reaction force with respect to the caulking portion, it is preferable that the airtight material has a low elastic force.

Further, according to the present embodiment, since the O-ring 26 is compressed in the radial direction between the first lens 13 and the lens barrel 12, the elastic force (reaction force) of the O-ring 26 that has been crushed and elastically deformed will act on the caulking portion 23 in the optical axis direction and will not adversely affect the caulking force.

Moreover, according to the present embodiment, since the hardness of the O-ring 26 is set higher than the hardness of the airtight material 130, it is possible to suppress a reaction force against the caulking portion 23 associated with the airtight material 130, while increasing the waterproof performance by virtue of the O-ring 26.

Further, according to the present embodiment, the facing region 140 in which the first and second lenses 13, 14 are in contact with each other on the contact surfaces 13a', 14a' and the airtight region 150 formed by filling the annular recess 14b with the airtight material 130 are arranged adjacent to each other in radial direction of the first and second lenses 13, 14. Therefore, it is possible to effectively and efficiently obtain an acceptable airtightness between the lenses 13, 14.

In the above-described embodiment, the facing region 140 is located inwardly in the radial direction and the airtight region 150 is located outwardly in the radial direction, but it is also possible for the airtight region 150 to be located inwardly in the radial direction and for the facing region 140 to be located outwardly in the radial direction. Although in the above-described embodiment, the annular recess is provided on the contact surface 14a' of the second lens 14 that comes into contact with the first lens 13, it is also possible for the annular recess to be provided on the contact surface 13a' of the first lens 13 that comes into contact with the second lens 14. Further, in the above-described embodiment, although the recess is formed as a notch-shaped annular groove, it is also possible for the recess to be formed in any other manner, provided that the airtight material filled therein does not hinder the contact between the first and second lenses.

Moreover, in the above-described embodiment, although the sealing member (O-ring 26) and the airtight material 130 are members separated from each other, it is also possible for the sealing member and the airtight material to be integrally molded by two-color molding or the like (forming integrally molded body containing members having different hardness). In this way, it is possible to improve the assembling property of the sealing member and the airtight material, and it is also possible to reduce the number of parts and reduce the cost. Further, in the above-described embodiment, although the recess has an annular shape, it is not absolutely necessary for the recess to be annular, and it is also possible for the recess to be formed and set In any other optional shape. Here, an important point is only to prevent an intrusion of water vapor into the space between the lenses by virtue of the airtight region and the facing region.

Third Embodiment

Figure 17:
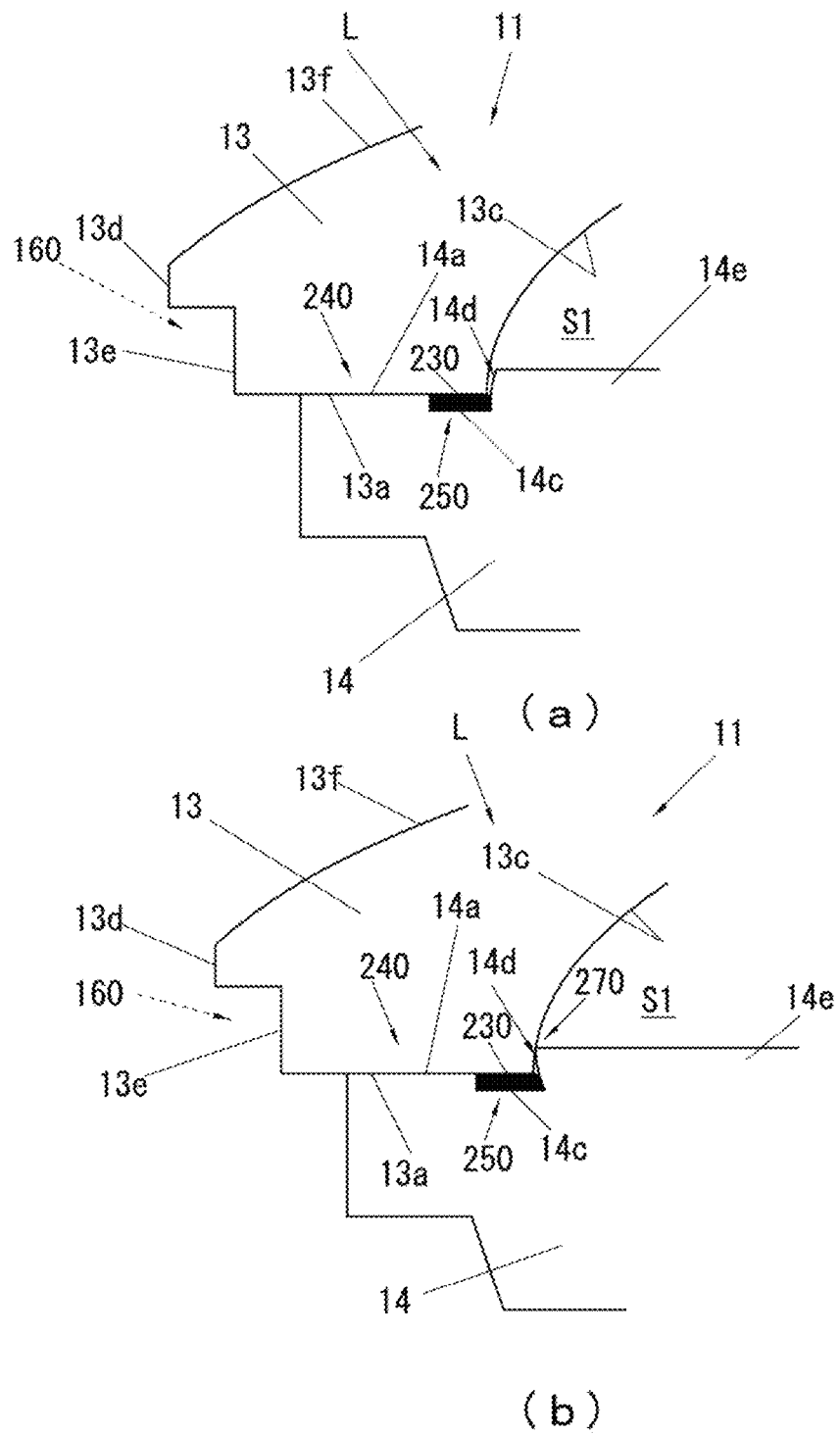
FIG. 17(a) is a main portion enlarged diagram of a lens unit according to a third embodiment of the present invention.
FIG. 17(b) is a main portion enlarged diagram showing an embodiment modified.

FIG. 17 is an enlarged view showing a main portion of the lens unit according to the third embodiment of the present invention. In the present embodiment, the first lens 13 located closest to object side constituting the lens group L is formed as a convex surface whose surface 13f is convex toward the object side. In fact, the first lens 13 is a spherical glass lens whose back surface 13c facing the second lens 14 forms a cavity recessed toward the inside of the lens. The second lens 14 is a lens made of a low moisture permeable resin (for example, a resin such as COP (cycloolefin polymer)) having a convex portion 14e (which will be described later) on the object side, and the other lenses 15, 16, 17 are resin lenses, but the present invention should not be limited to this (for example, the first lens 13 may also be a resin lens).

As shown in FIG. 17(a) which has been enlarged for clear indication, the first lens 13 of the lens group L is in contact with the second lens 14 in the optical axis direction on the image side thereof. On one of the annular facing surfaces 13a, 14a of the first lens 13 and the second lens 14 which are in contact with each other and are extending in radial direction of the lenses 13, 14, a notched groove-shaped annular recess 14c is provided on the facing surface 14a of the second lens 14, as shown in the present embodiment. Therefore, a portion of the facing surface 14a associated with the annular recess 14c does not come into contact with the facing surface 13a of the first lens 13. On the other hand, the depth dimension of the annular recess 14c is set to be, for example, 50-500 microns.

Then, the annular recess 14c is filled with a fluid airtight material 230 that ensures an airtightness between the first and second lenses 13 and 14. Namely, in the present embodiment the annular recess 14c is filled with an adhesive (adhesion medium) serving as an airtight material 230 at the portion that can be a path which allows water vapor to enter the lens unit 11 (the portion between the facing surfaces 13a, 14a of the first lens 13 and the second lens 14 that can guide water vapor into the inter-lens space S1 formed between the first and second lenses 13, 14 (defined by the concave surface 13c on the image side of the first lens 13 and the convex portion 14b on the object side of the second lens 14) through the O-ring 26 (see FIG. 1) from a gap between the caulking portion 23 (see FIG. 1) of the lens barrel 12 and the first lens 13, or directly through the breathable resin of the lens barrel 12 and through a gap between the first lens 13 and the lens barrel 12 and/or the second lens 14). Namely, it is possible to use an adhesive which is the same as that used in the first embodiment. Here, the adhesive preferably has a low moisture permeability and a viscosity of about 1-500 Pa s, such as an acrylic adhesive.

Further, the second lens 14 having such an annular recess 14c has a stepped portion 14d extending from the annular recess 14c to enter the first lens 13 side, which is adjacent to the inside of the annular recess 14c in the radial direction. Specifically, in the present embodiment, the stepped portion 14d is formed by allowing a portion of the second lens 14 facing the concave surface (back surface) 13c of the first lens 13 to at least partially enter a cavity formed by the concave surface 13c, and has a function serving as a barrier for preventing the airtight material 230 (filled in the annular recess 14c) from flowing inwardly in the radial direction. Then, the portion of the second lens 14 that enters the cavity of the first lens 13 and forms the stepped portion 14d in this way has a substantially circular protrusion that protrudes inwardly toward the object side in the radial direction of the annular recess 14c. On the other hand, to allow the convex portion 14e (stepped portion 14d) of the second lens 14 to enter the first lens 13 side in this way, in the present embodiment, for example, the small diameter portion of the first lens 13e is thickened so as to extend toward the image side. If the small diameter portion 13e is thickly formed to extend toward the image side, the mounting area for the O-ring 26 (see FIG. 1) will be increased, rendering it possible to prevent the O-ring 26 from falling off the first lens 13. In addition, as a method for inserting the stepped portion of the second lens into the first lens side, it is possible to have various ideas, such as cutting out the facing surface of the first lens to ensure a space for receiving the stepped portion.

In other words, in the present embodiment, the annular facing region 240 is formed in which the first and second lenses 13, 14 are in contact with each other on the facing surfaces 13a, 14a, and the airtight region 250 is formed in which the airtight material 230 is in contact with the facing surface 13a of the first lens 13 while maintaining the contact between the facing surfaces 13a, 14a by filling the annular recess 14c with the airtight material 230. The annular facing region 240 and the airtight region 250 are arranged adjacent to each other along the radial direction of the first and second lenses 13, 14. Namely, in the present embodiment, a path is formed that can be a passage for water vapor. Namely, on a path extending from the gap between the caulking portion 23 (see FIG. 1) of the lens barrel 12 and the first lens 13 until the inside of the inter-lens space S1, there are arranged from the upstream side thereof and in the following order, a waterproof region 160 with the O-ring 26 (see FIG. 16), a facing region 240, and an airtight region 250. In this way, it is possible to maintain a waterproofness and airtightness for this path.

In the present embodiment, as shown in FIG. 17(a), the convex portion 14e of the second lens 14 that enters the cavity formed by forming the concave surface (back surface) 13c in the first lens 13 is positioned with a certain clearance left between itself and the concave surface 13c. On the other hand, it is also possible for the concave surface 13c to be press-engaged into the concave surface (back surface) 13c of the first lens 13, as shown in FIG. 17(b).

As described above, according to the present embodiment, the airtight material 230 is used to fill the portion that can be a path which allows the intrusion of water vapor into the lens unit 11. Namely, between the facing surfaces 13a, 14a of the first lens 13 and the second lens 14 that can guide water vapor into the inter-lens space S1 between the first and second lenses 13, 14, the airtight material 230 is used to fill the annular recess 14c provided on the facing surface 14a of the second lens 14 which comes into contact with the first lens 13. In this way, without using a complex and high cost structural form in which a moisture absorbing member and a liquid are introduced and sealed into the lens unit, it is possible to inhibit the invasion of water vapor into the inter-lens space S1 where a dew condensation is most likely to occur, also to inhibit the invasion of water vapor into the lens unit 11 toward image side (improving airtightness), further to reduce an amount of water vapor inside the inter-lens space S1, thereby easily suppressing a dew condensation on the lens surface, especially on the front surface (back surface) 13c of the first lens 13 on the image side thereof.

Further, according to the present embodiment, the airtight material 230 is not inserted between the facing surfaces 13a, 14a of the first and second lenses 13, 14 which is for the purpose of separating them, but the annular recess 14c is provided on the facing surface 14a of the second lens 14 that comes into contact with the first lens 13, and such an annular recess 14c is filled with the airtight material 230. In this way, not only can the lenses 13, 14 exactly come into contact with each other to contribute to improving the airtightness between the lenses 13, 14, but it is also possible to correctly keep an inter-lens distance at a desired distance by the contact between the lenses 13, 14, rendering it possible to prevent the optical performance from being adversely affected by virtue of the insertion of the airtight material 230.

Moreover, in the present embodiment, since the second lens 14 has a stepped portion 14d extending from the annular recess 14c to enter the first lens 13, with the stepped portion 14d being adjacent to the inside of annular recess 14c in the radial direction, it is possible for the stepped portion 14d to serve as a barrier to prevent the airtight material 230 filled in the annular recess 14c from flowing inwardly in the radial direction. Therefore, it is possible to prevent the fluid airtight material 230 from overflowing beyond the annular recess 14c and from flowing inwardly in the radial direction toward the inside of the inter-lens space S1 between the first and second lenses 13, 14. Namely, it is possible for the annular recess 14c to function as a stabilized airtight material reservoir.

Further, in the present embodiment, the stepped portion 14d of the second lens 14 is formed by allowing a portion of the second lens 14 facing the concave surface 13c of the first lens 13 to at least partially enter the cavity formed by the concave surface 13c. Therefore, it is possible to ensure the airtightness at a location closest to the cavity, i.e., a location where the inter-lens space S1 can be easily sealed, thus effectively inhibiting the invasion of water vapor.

As shown in FIG. 17(b) described above, if the convex portion 14e is press-fitted into the concave surface 13c, it is possible to realize a double airtight state which includes i) an airtight region 250 on the outer side in the radial direction, forming a stable airtight material pool by virtue of the stepped portion 14d and the concave portion 14c and ii) a press-fitted region 270 on the inner side in the radial direction, which is formed by virtue of the concave surface 13c of the first lens 13 and the convex portion 14e of the second lens 14. Therefore, it becomes possible to further increase the airtightness between the lenses 13, 14, making it possible to exactly seal the inter-lens space S1 and to exactly prevent the invasion of water vapor into the inter-lens space S1.

In the above-described embodiment, the recess 14c is formed as a notch-shaped annular groove, but it is also possible for the recess to be formed into any other shape, provided that the airtight material filled therein does not hinder the contact between the first and second lenses. In short, what is necessary is only to inhibit (prevent) the invasion of the water vapor into the inter-lens space S1 by virtue of the airtight region 250. Further, in the above-described embodiment, although only one annular recess 14c is provided adjacent to the inter-lens space S1, it is also possible for the recess (to be provided on the facing surface 14a of the second lens 14) to be provided plurally in any positions on the facing surface 14a (arbitrary portions in the radial direction). Moreover, the number of steps provided along with the recesses is not necessarily to be limited to only one. Further, the airtight material filled in the recess is not limited to an adhesive, and examples thereof may also include a semi-gel-like airtight substance. Here, as an adhesive, it is preferable to use, for example, an adhesive having a low moisture permeability such as an acrylic adhesive. Alternatively, it is also possible to dispose in the recess a sealing material such as a butyl seal (un-vulcanized seal) or an olefin sealant. If, after the recess of the second lens is filled with an airtight material, the first lens is assembled into the lens barrel from above, it is possible to ensure an airtightness between the first and second lenses, thus allowing the space between the first and second lenses to be a sealed space.

Fourth Embodiment

Figure 18:
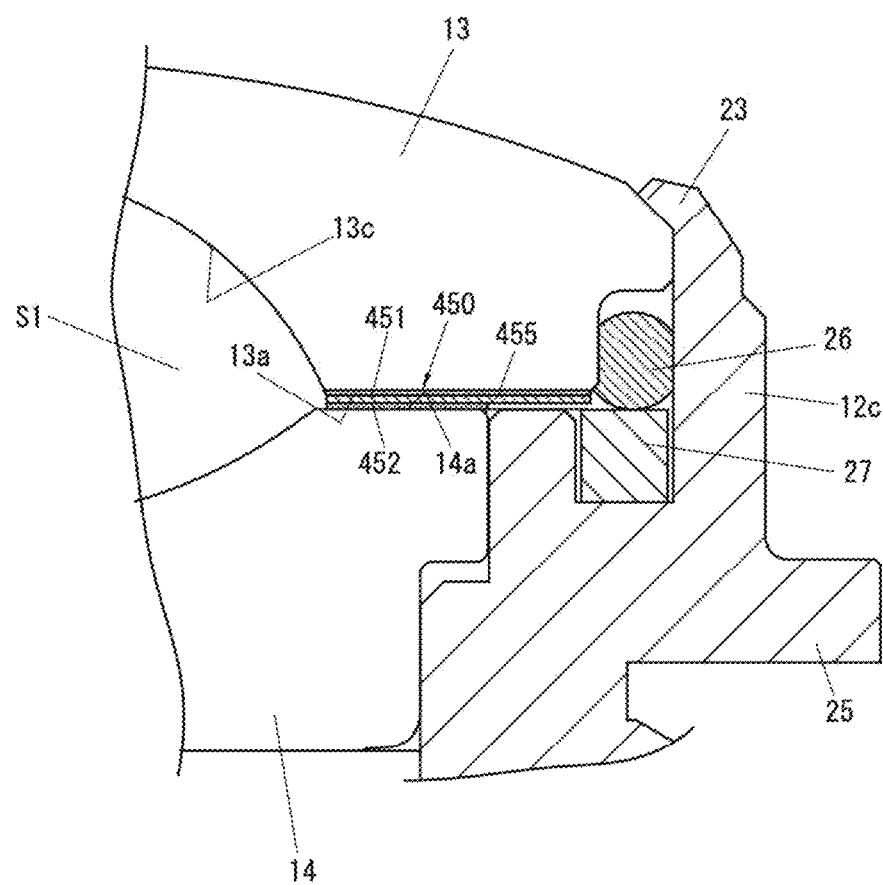
FIG. 18 is an enlarged cross-sectional view showing a main portion of a lens unit according to the fourth embodiment of the present invention.

FIG. 18 is a main portion enlarged diagram of the lens unit according to the fourth embodiment of the present invention. In the present embodiment, the facing surfaces 13a, 14a of the first lens 13 and the second lens 14 are bonded together by the adhesion medium layer 450, such that the inter-lens space S1 between the first lens 13 and the second lens 14 is sealed to the outside.

In the present embodiment, the adhesion medium layer 450 has a first adhesion medium layer 451 located on the first lens 13 side and a second adhesion medium layer 452 located on the second lens 14 side, while a thin plate-like inclusion 455 is interposed between the first adhesion medium layer 451 and the second adhesion medium layer 452.

The first adhesion medium layer 451 is applied to the entire area of the facing surface 13a of the first lens 13, while the second adhesion medium layer 452 is applied to the entire area of the facing surface 14a of the second lens 14. The facing surface 13a and the facing surface 14a are respectively formed into an annular shape, and the outer diameter of the facing surface 13a is larger than that of the facing surface 14a, while the inner diameters of the facing surface 13a and the facing surface 14a are substantially equal to each other. Therefore, the first adhesion medium layer 451 applied to the facing surface 13a extends radially outward from the second adhesion medium layer 452 applied to the facing surface 14a. Further, although the thicknesses of the first adhesion medium layer 451 and the second adhesion medium layer 452 are equal to each other, it is also possible for them to be different from each other.

Further, the thin plate-like inclusion 455 interposed between the first adhesion medium layer 451 and the second adhesion medium layer 452 is formed into an annular shape, and their inner diameter and outer diameter are almost equal to the facing surface 13a. The inner diameter edge and the outer diameter edge of the thin plate-like inclusion 455 are such that the inner diameter edge and outer diameter edge of the facing surface 13a are almost equal to their radial position.

Then, the upper surface (surface on the object side of optical axis) of the first adhesion medium layer 451 adheres to the facing surface 13a, and the lower surface thereof (the surface on the image side of optical axis) adheres to the upper surface of the thin plate-like inclusion 455. Further, the lower surface (surface on the optical axial image side) of the second adhesion medium layer 452 adheres to the facing surface 14a, and the upper surface (the surface on the optical axis object side) adheres to the lower surface of the thin plate-like inclusion 455.

As the thin plate-like inclusion 455, it is possible to use, for example, a light blocking plate or a rubber sheet. By using these light blocking materials, it is possible to omit an ink painting step for anti-ghosting measures on the facing surface 13a of the first lens 13. When the thin plate-like inclusion 455 is a light blocking plate (for example, SUS plate having a thickness of 1 mm or less), as an adhesion medium for forming an adhesion medium layer 450, it is possible to use an adhesive having transparent or translucent properties and a relatively high adhesion strength (having a higher adhesion strength than a black adhesive), thereby exactly ensuring a light blocking performance.

As the black adhesive, it is preferable to use an adhesive having a light transmission rate of 20% or lower in a wavelength range of 450 nm-650 nm. If an adhesive is made black in color and its light transmission rate is suppressed, it becomes possible to omit an ink painting step for preventing a ghosting. On the other hand, although the adhesion strength may decrease, in this embodiment since a light blocking plate is interposed between the first adhesion medium layer 451 and the second adhesion medium layer 452, it is possible to ensure a desired light blocking performance and the like even if a black-painting step is omitted. Meanwhile, since it is possible to use an adhesive having a transparency or a desired light transmittance as well as a relatively high adhesion strength, it is possible to ensure a predetermined adhesion strength. Further, by not having a black-painting step, it is possible to prevent a moisture contamination from between the facing surface 13a of the first lens 13 and the surface of the thin plate-like inclusion 455.

When the thin plate-like inclusion 455 is a heater, it is possible to heat the first lens 13 and the second lens 14 by using the heater, thus rendering it possible to inhibit a dew condensation in the inter-lens space S1 between the first lens 13 and the second lens 14. Further, even when moisture is mixed inwardly due to deterioration of the adhesion medium layer 450, it is still possible to eliminate the lens surface condensation by heating the moisture using the heater.

As the heater, it is possible to use, for example, a flat ceramic heater having a thickness of 1-2 mm.

When the thin plate-like inclusion 455 is a rubber sheet, it is possible to further improve a "radial followability" that can follow the radial relative displacement between the lenses (caused due to a difference in the amount of expansion/contraction of the lenses during the temperature change, which is associated with a linear expansion coefficient difference between the first lens 13 and the second lens 14). Namely, when there is a difference in the expansion/contraction amount between the first lens 13 and the second lens 14, since such a difference can be alleviated by the rubber sheet, it is possible to improve the "radial followability" and to prevent the peeling of the adhesion surface of the adhesion medium layer 450. On the other hand, the thickness of the rubber sheet is preferably about 50-150 µm.

In the present embodiment, the adhesion medium forming the first adhesion medium layer 451 and another adhesion medium forming the second adhesion medium layer 452 may be different from each other in their types.

For example, when the first lens 13 is a glass lens and the second lens 14 is a resin lens, it is easy to select an adhesion medium capable of firmly bonding a glass lens (first lens 13) with a thin plate-like inclusion 455 and another adhesion medium capable of bonding resin lens (second lens 14) with a thin plate-like medium 455, thud rendering it possible to firmly bond together the first lens 13 and the second lens 14.

Further, since it is possible to easily set the thickness of the first adhesion medium layer and the thickness of the second adhesion medium layer, it is possible to easily set and increase the above-described "radial followability".

Here, as an adhesion medium for use in the present embodiment, it is possible to use, for example, acrylic adhesive, epoxy adhesive, olefin-based adhesives, and an elastic material having an adhesion property (for example, gel-like elastic materials, and the like). Further, such an adhesion medium is provided on the outside of the effective diameter of the lenses 13, 14 (the facing surfaces 13a, 14a at an external position of the optical surface through which the light does not pass). In addition, such an adhesion medium may also be used in a form such as a combination or mixing.

Moreover, in the present embodiment, the adhesion medium used for bonding together the facing surfaces 13a, 14a through thin plate-like inclusion 455 has used the same material and same physical property values as the adhesion medium 40 shown in the 11th embodiment of the present invention, thus ensuring the above-described "radial followability" and "optical axial followability".

Further, in the present embodiment, on at least one of the facing surfaces 13a, 14a of the first lens 13 and the second lens 14, it is also possible to provide a deterrent portion that prevents the flow of the adhesion medium applied to the facing surfaces 13a, 14a from flowing into the inter-lens space S1.

As such a deterrent portion, on at least a part of one of the facing surfaces 13a, 13b, it is possible to provide a recess which is filled with an adhesion medium, and it is also possible to provide a convex portion that prevents the flow of the adhesion medium into the inter-lens space S1. According to such a configuration, it is possible to inhibit the adhesion medium applied to the facing surface from flowing into the inter-lens space by virtue of deterrent portion, thereby ensuring an easy application of the adhesion medium.

Figure 19:
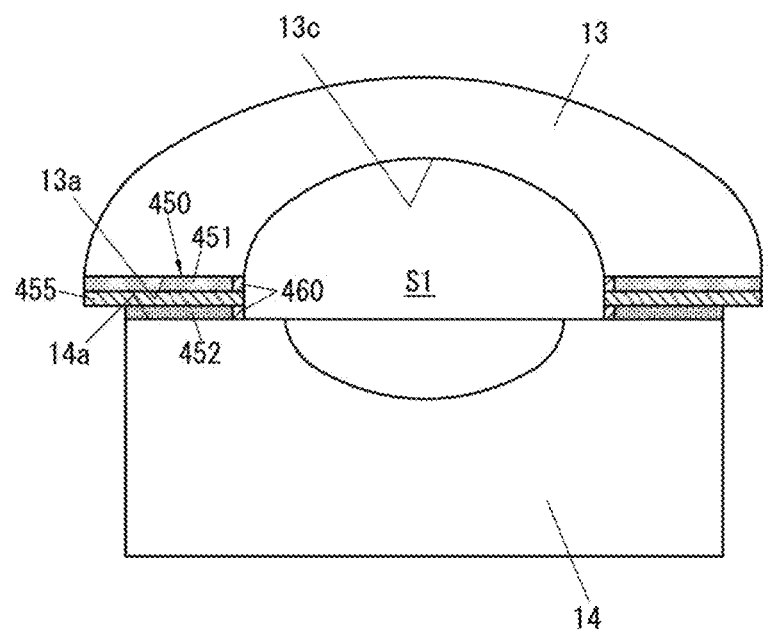
FIG. 19 is a cross-sectional view schematically showing an adhesion state of the first embodiment between lens facing surfaces.

For example, as schematically shown in FIG. 19, in the present embodiment, a convex portion 460 serving as a deterrent portion is provided in part of the two annular facing surfaces 13a, 14a, in the form of a circular ring around the center of the facing surfaces 13a, 14a.

The convex portion 460 is provided on the inner periphery of the facing surface 13a, and is also provided on the facing surface 14a at a position that is close to the outer diameter side by a predetermined length from the inner periphery. The height of the convex portion 460 is preferably about 5-500 µm. When forming the first lens 13 by using glass molding and forming the second lens 14 by performing resin injection molding, such a convex portion 460 may be provided integrally with the first lens 13 and the second lens 14, or may be provided separately after forming the first lens 13 and the second lens 14.

The convex portion 460 provided on the facing surface 13a is in contact with one surface of the thin plate-like inclusion 455 facing the facing surface 13a, and the convex portion 460 provided on the facing surface 14a is in contact with the other surface of the thin plate-like inclusion 455. Therefore, using the convex portions 460, 460 it is possible to perform a positioning in the thickness direction of the adhesion medium layer 450 of the thin plate-like inclusion 455, and to set the thicknesses of the first adhesion medium layer 451 and the second adhesion medium layer 452. Furthermore, it is also possible to set a radial region (filling area of the adhesion medium) of the first adhesion medium layer 451 and the second adhesion medium layer 452 on the facing surfaces 13a, 14a.

Further, by proving the convex portion 460 it is possible to inhibit the adhesion medium applied to the facing surfaces 13a, 14a from flowing into the inter-lens space S1, thus ensuring an easy application of the adhesion medium.

On the other hand, it is also possible to provide a similar convex portion 460 (not shown) on the radial outside of the facing surfaces 13a, 14a. In this way, it is possible to more correctly set thicknesses of the first adhesion medium layer 451 and the second adhesion medium layer 452, thus ensuring an easy application of the adhesion medium.

Figure 20:
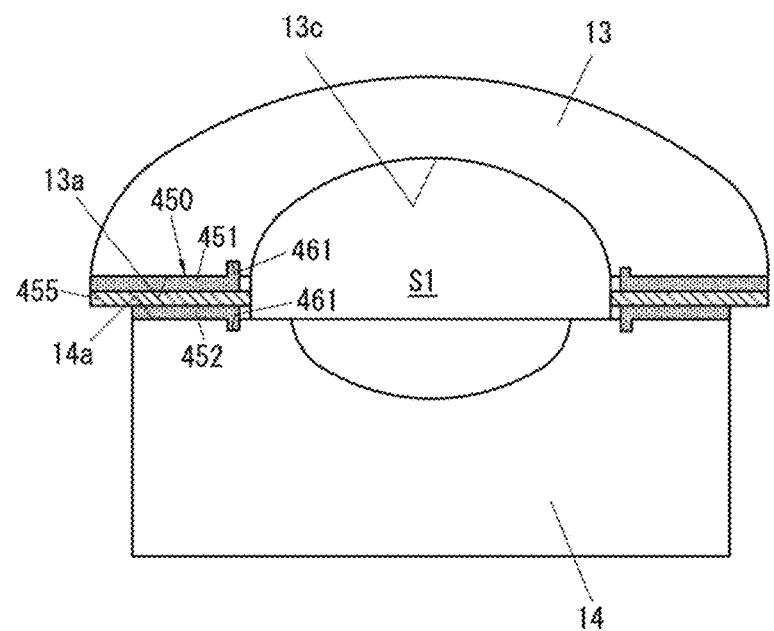
FIG. 20 is a cross-sectional view schematically showing an adhesion state of a second embodiment between lens facing surfaces.

Moreover, as schematically shown in FIG. 20, in this embodiment, a recess 461 serving as a deterrent portion is provided in the form of a circular ring around the center of the facing surfaces 13a, 14a on a part of both two circular facing surfaces 13a, 14a.

The recess 461 is provided on the facing surface 13a at a position where it is located close to the outer diameter side by a predetermined length from the inner periphery, and is also provided on the facing surface 14a at a position where it is located close to the outer diameter side by a predetermined length from the inner periphery, with the recesses 461, 461 corresponding to each other in the optical axis direction. Preferably, the depth of the recess 461 is about 5-500 µm. When the first lens 13 is formed by glass molding and the second lens 14 is formed by resin injection molding, it is also possible for the first lens 13 and the second lens 14 to be formed into an integral body, or for the first lens 13 and the second lens 14 to be formed separately after the formation of the first lens 13 and the second lens 14.

The adhesion medium is applied to the facing surfaces 13a, 14a to a predetermined thickness, but since the surplus adhesion medium flows into the recess 461, it is possible to inhibit the flow of the adhesion medium into the inter-lens space S1, thereby ensuring an easy application of the adhesion medium.

Figure 21:
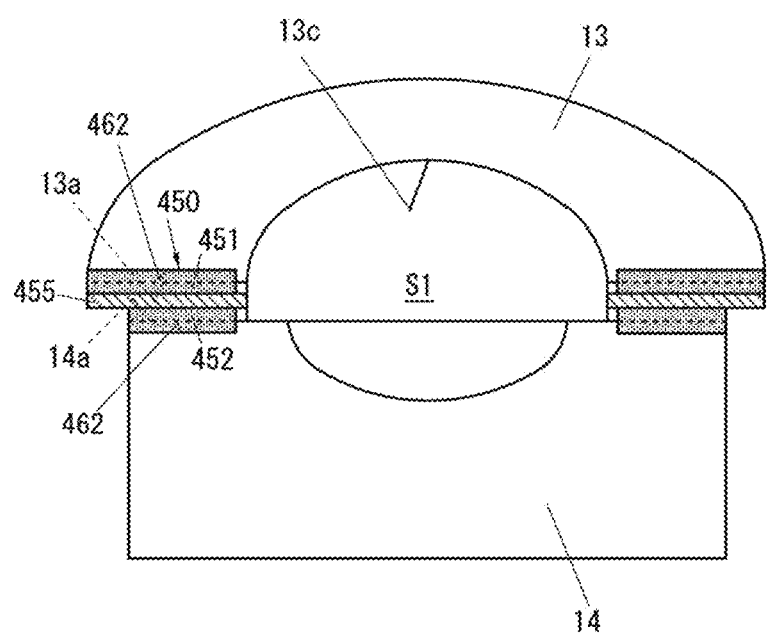
FIG. 21 is a cross-sectional view schematically showing an adhesion state of a third embodiment between lens facing surfaces.

Further, as schematically shown in FIG. 21, in this embodiment, a concave groove 462 serving as a deterrent portion is provided in the form of a circular ring around the center of the facing surfaces 13a, 14a in a part of both two circular facing surfaces 13a, 14a. Further, it is also possible for the concave grooves 462 to be radially provided around the center of the facing surfaces 13a, 14a. In this case, it is possible for the concave grooves 462, 462 arranged adjacent to each other in the circumferential direction to be evenly or unevenly spaced apart from each other.

The recess 462 is provided on the facing surface 13a in an area extending from a position where it is located close to the outer diameter side by a predetermined length from the inner periphery, until the outer periphery of the facing surface 13a. The recess 462 is also provided on the facing surface 14a in an area extending from a position where it is located close to the outer diameter side by a predetermined length from the inner periphery, until the outer periphery of the facing surface 14a. Preferably, the depth of the recess 462 is about 5-500 μm. When the first lens 13 is formed by glass molding and the second lens 14 is formed by resin injection molding, it is possible for the first lens 13 and the second lens 14 to be formed into an integral body, or for the first lens 13 and the second lens 14 to be formed separately after the formation of the first lens 13 and the second lens 14.

The adhesion medium is applied to the facing surfaces 13a, 14a to a predetermined thickness, but since the surplus adhesion medium flows into the recess 462, it is possible to inhibit the flow of the adhesion medium into the inter-lens space S1, thereby ensuring an easy application of the adhesion medium.

Further, "tight adhesion" or "optical axial followability" required by the adhesion medium forming the adhesion medium layer 450 described above can be realized by setting a surface roughness of at least one facing surface 13a (14a) of the first lens 13 and the second lens 14 at 01 μm-200 μm in terms of square average roughness Rq. This is particularly beneficial when the first and second lenses 13, 14 are formed of glass that does not need to be considered regarding the "radial followability" described above. In the case of glass, it is necessary to be particularly concerned about peeling of the adhesive interface between the lenses 13, 14 due to an increase in internal pressure within the inter-lens space S1 in a high temperature environment.

Further, in the present embodiment, it is preferable that the water absorption rate of the adhesion medium be 5.0 w % or less (JIS K6911 (boiling 1 hour)). If the water absorption rate of the adhesion medium is set low in this way, it is possible to effectively suppress the infiltration of water vapor into the inter-lens space S1. Further, in this embodiment, it is preferable that the adhesion medium is black (the light transmittance of the adhesion medium is 20% or less in a wavelength range from 450 nm to 650 nm). If the adhesion medium is made black in this way and its light transmittance is suppressed, it is also possible to omit the ink painting step for light blocking and ghost prevention (the adhesion medium can also be used as a blacking material).

In this embodiment, it is preferable that the pressure in the inter-lens space S1 between the first lens 13 and the second lens 14 is an atmospheric pressure or less under the room temperature of 20 degrees. Thus, if the pressure in the inter-lens space S1 is atmospheric pressure or less, since it is possible to avoid an internal pressure rise in the inter-lens space S1 even under a high temperature environment, it is still possible to overcome a problem that the adhesion interface between the lenses 13, 14 peels off due to a detachment between the lenses 13, 14 in the optical axis O direction due to an increase in internal pressure. As a method of bonding together the facing surfaces 13a, 14a such that the pressure in the inter-lens space S1 is equal to or lower than atmospheric pressure, it is possible to perform such a bonding while performing a suction for degassing the inter-lens space S1, in a process of bonding together the facing surfaces 13a, 14a under a vacuum atmosphere.

As described above, according to the present embodiment, facing surfaces 13a, 14a of the first lens 13 and the second lens 14 which can form a path that allows water vapor to enter the lens unit 11, are bonded to each other by an adhesion medium layer 450 so that the inter-lens space S1 between the first lens 13 and the second lens 14 is sealed to the outside. Accordingly, even in a high humidity environment, it is still possible to inhibit an invasion of water vapor into the inter-lens space S1 in which a dew condensation is most likely to occur, further to inhibit an invasion of water vapor into the lens unit 11 on the image side (improving airtightness), also to reduce an amount of water vapor in the inter-lens space S1, thereby suppressing the dew condensation on the lens surface, particularly on the surface (back surface 13c) of the first lens 13. Namely, according to an adhesion state between such lenses 13, 14, it is possible to ensure a highly reliable sealed state in the inter-lens space S1.

Further, the adhesion medium layer 450 has a first adhesion medium layer 451 located on the first lens 13 side and a second adhesion medium layer 452 located on the second lens 14 side, and a thin plate-like inclusion 455 interposed between the first adhesion medium layer 451 and the second adhesion medium layer 452. Therefore, it is possible that the adhesion medium forming the first adhesion medium layer 451 and the adhesion medium forming the second adhesion medium layer 452 are allowed to be different in their types. Accordingly, for example, when the first lens 13 is a glass lens and the second lens 14 is a resin lens, it is possible to easily select an adhesion medium that can firmly bond together the glass lens (the first lens 13) and the thin plate-like inclusion 455 and to select another adhesion medium that can firmly bond together a resin lens (second lens 14) and a thin plate-like inclusion 455.

Further, since it is possible to set the thickness of the first adhesion medium layer 451 and the thickness of the second adhesion medium layer 452, it is possible to easily set and improve the above-described "radial followability".

Fifth Embodiment

A fifth embodiment shown below provides the first lens that is located closed to the object side, the second lens located adjacent to the first lens, and a lens unit and camera module that can prevent lens surface dew condensation by suppressing an invasion of water vapor into the inter-lens space surrounded by an intermediate spacer.

Figure 22:
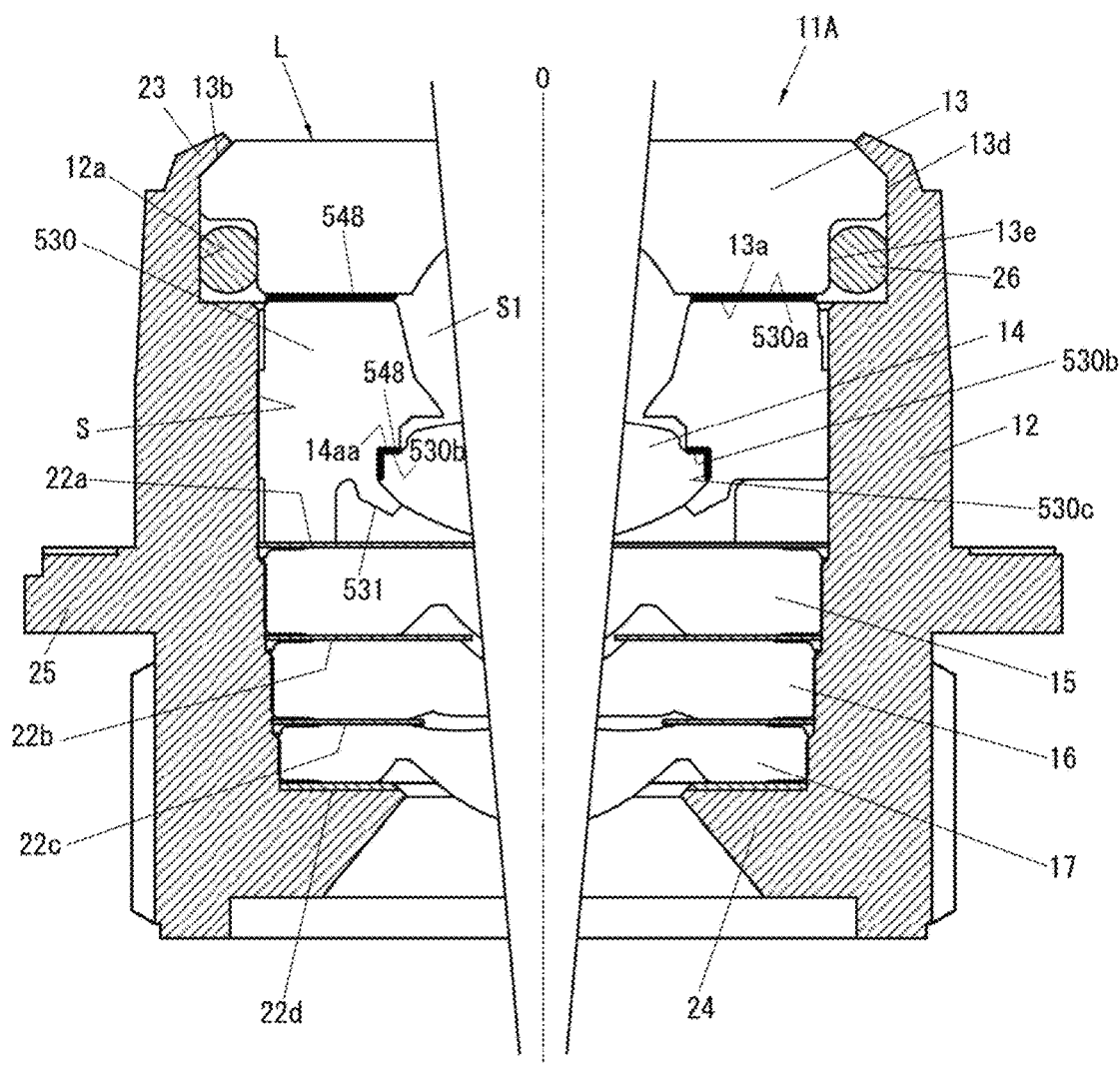
FIG. 22 is a schematical cross section view of a lens unit, showing the fifth embodiment of the present invention.

FIG. 22 shows a lens unit 11A according to the fifth embodiment. As shown, the lens unit 11A of this embodiment includes, for example, a cylindrical lens barrel (barrel) 12 made of resin and a plurality of lenses arranged within the stepped inner housing space S of the lens barrel 12. In detail, the lens unit includes, from the object side (upper side in FIG. 22), five lenses consisting of a first lens 13 made of glass, a second lens 14, a third lens 15, a fourth lens 16, and a fifth lens 17, as well as four diaphragm members 22a, 22b, 22c, and 22d.

The first diaphragm member 22a from the object side of the four diaphragm members 22a, 22b, 22c, and 22d is arranged between the second lens 14 and the third lens 15. The second diaphragm member 22b from the object side is arranged between the third lens 15 and the fourth lens 16. The third aperture member 22c from the object side is arranged between the fourth lens 16 and the fifth lens 17. The fourth diaphragm member 22d from the object side is arranged between the fifth lens 17 and the inner flange portion 24.

The diaphragm members 22a, 22b, 22c, and 22d are each an "aperture diaphragm" that limit an amount of transmitted light and determine an F value serving as an indicator of brightness, or "light blocking diaphragm" that block light rays which cause ghosting and light rays that cause an aberration. Such an in-vehicle camera having such a lens unit 11 includes a lens unit 11, a substrate having an image sensor (not shown), and an installation member (not shown) for installing the substrate in a vehicle such as a car.

A plurality of lenses 13, 14, 15, 16, and 17 incorporated and housed in the inner housing space S of the lens barrel 12 are stacked and arranged in a state where their optical axes are aligned with each other, and respective lens 13, 14, 15, 16, 17 are arranged along one optical axis O, forming a group of lenses L used for imaging. In this case, the first lens 13 located closest to the object side constituting the lens group L is a spherical glass lens having a flat surface on the object side and a concave surface on the image side. The second lens 14 is a spherical glass lens having a convex surface on the object side and the image side respectively. Other lenses 15, 16, and 17 are resin lenses, but present invention should not be limited as such. For example, the first lens 13 and the second lens 14 may be resin lenses. When the first and second lenses 13, 14 are made of resin, the first lens 13 and the second lens 14 are allowed to have different linear expansion coefficients, with a difference at $40 \times 10^{-6}$/K(m) or more. Here, when an adhesion between the first lens and the intermediate spacer and an adhesion between the intermediate spacer and the second lens are performed using an adhesion medium, the adhesion medium has "radial followability" which can follow the radial relative displacement between the lenses due to differences in the expansion/contraction amounts of the lenses and the intermediate spacer at the time of temperature change, which is associated with the difference in linear expansion coefficient between the lens (first lens and second lens) and the intermediate spacer. In this way, even if the lenses having different linear expansion coefficients are combined, it is still possible to ensure a highly reliable sealed state in the inter-lens space.

The present invention including the present embodiment has an intermediate spacer 530 located between the first lens 13 and the second lens 14 within the lens barrel 12. Specifically, between the first lens 13 and the second lens 14, there is formed an inter-lens space S1 surrounded by the first lens 13 and the second lens 14 and the intermediate spacer 530. The first lens 13 and the intermediate spacer 530, as well as the intermediate spacer 530 and the second lens 14, are respectively characterized by being bonded to each other so that the inter-lens space S1 is sealed to the outside, while the number of lenses, the number of spacers, and the material of the lens can be arbitrarily selected according to an actual application and the like.

On the other hand, if necessary, it is also possible for an anti-reflection film, hydrophilic film, water repellent film, and the like to be applied to the surfaces of these lenses 13, 14, 15, 16, and 17.

Further, in the present embodiment, the O-ring 26 serving as a sealing member is inserted between the first lens 13 (located closest to the object side) and the lens barrel 12, so that water and dust can be prevented from entering the lens group L inside the lens barrel 12. On the other hand, since the configuration associated with the O-ring 26 and the caulking portion 23 are the same as the first embodiment described above, related descriptions will be omitted here by providing the same reference numerals.

Further, the second lens 14 is formed in a smaller diameter than the lenses 13, 15, 16, 17, and is held and fixed to the intermediate spacer 530. Further, on the outer periphery surface of the lens barrel 12, there is provided an outer flange portion 25 for use in stalling the lens barrel 12 into the in-vehicle camera, in a manner of a collar shape on the outer periphery surface of the lens barrel 12.

Figure 23:
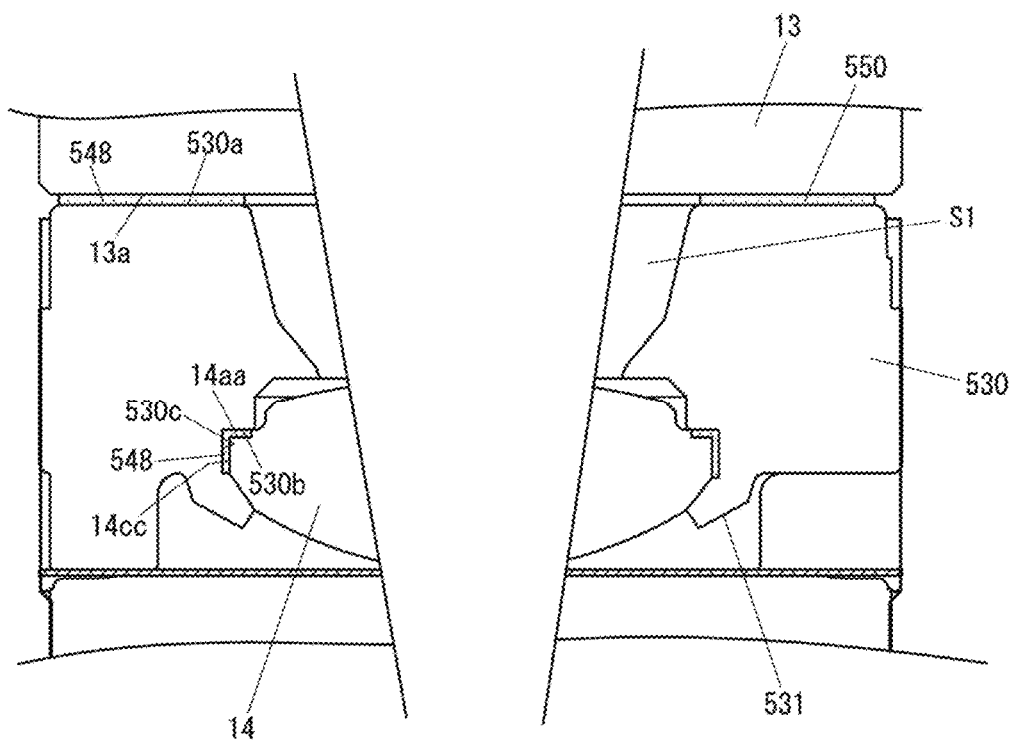
FIG. 23 is an enlarged cross-sectional view showing a main portion of the lens unit of FIG. 22.

In the lens unit 11A and the camera module 300A having the above-described configuration shown in FIG. 22 and FIG. 23, the first lens 13 located closest to the object side and the intermediate spacer 530 located adjacent to the first lens 13 on the image side have facing surfaces 13a, 530a facing each other in the optical axis direction. These facing surfaces 13a, 530a are bonded together by an adhesion medium (adhesive) 548 in a manner such that the inter-lens space S1 surrounded by the first lens 13, the second lens 14, and the intermediate spacer 530 is sealed to the outside.

The intermediate spacer 530 is formed cylindrically, and its end face on the object side (upper side in FIG. 22 and FIG. 23) is an annular facing surface 530a. Further, on the inner circumferential surface of the intermediate spacer 530, there is formed a facing surface 530b orthogonal to the optical axis direction in an annular shape, and there is also formed a cylindrical facing surface 530c parallel to the optical axis direction. The facing surface 530b and the facing surface 530c are arranged at right angles to each other in cross-sectional view.

On the other hand, the second lens 14 has a facing surface 14aa formed in an annular shape and facing the facing surface 530b, and another facing surface 14cc is formed in a cylindrical shape and facing the facing surface 530a. The facing surface 14aa is provided on the outside of the effective diameter of the second lens 14 (the optical surface external portion through which the light ray does not pass) facing the object side (upper side in FIG. 22 and FIG. 23). The facing surface 14cc is a cylindrical surface that forms an outermost diameter of the second lens 14. Here, the facing surfaces 14aa, 14cc are arranged at right angles to each other in a cross-sectional view.

Then, the facing surfaces 530b, 14aa and the facing surfaces 530c, 14cc are bonded together respectively by the adhesion medium 548 such that the inter-lens space S1 is sealed to the outside, and the adhesion medium 548 adheres to the facing surfaces 530b, 530c, 14aa, 14cc.

Further, the intermediate spacer 530 has a caulking portion 531 at the lower end edge of the inner diameter side, and the caulking portion 531 is thermally an inwardly caulked in the radial direction by pressing the facing surface 14aa of the second lens 14 in the optical axial direction towards the facing surface 530b of the intermediate spacer 530.

In this way, since the facing surface 14aa of the second lens 14 is pressed against the facing surface 530b of the intermediate spacer 530 by the caulking portion 531, the adhesion of the adhesion interface between the second lens and the intermediate spacer 530, in particular, can contribute to an adhesion required by the adhesion medium described above.

Here, for use as an adhesion medium (adhesive) in the present embodiment, it is possible to use an adhesive (for example, gel-like) such as an acrylic adhesive, an epoxy adhesive, an olefin-based adhesive or the like. Further, such an adhesion medium is provided on the outside of the effective diameter of the lenses 13, 14 (the facing surfaces 513*a*, 14*aa* at the optical surface external portion through which the light ray does not pass), and is further provided on the facing surface 14 *cc* of the lens 14. These adhesion mediums may be used in a form such as a combination or mixing.

In the present embodiment, the adhesion medium (adhesive) for use in bonding together the facing surfaces 13*a*, 530*a*, and the facing surfaces 530*b*, 14*aa*, and the facing surfaces 530*c*, 14*cc*, has "radial followability", and/or "tight adhesion", or "optical axial followability. The "radial followability" can follow radial relative displacement between lenses 13, 14 which is caused due to difference in lens expansion/contraction during temperature changes (which is in turn caused due to differences in linear expansion coefficients of lenses 13, 14, and intermediate spacers 530) (exhibiting a flexibility to sufficiently withstand radial stresses applied to the adhesion interface between the lens 13 and the intermediate spacer 530 and another adhesion interface between the lens 14 and the intermediate spacer 530 after expansion (shrinkage) of the lens 13, 14 and intermediate spacer 530 due to temperature change). The "tight adhesion" prevents the separation between the lens 13 and the intermediate spacer 530 in the optical axis O direction, and another separation between the second lens 14 and the intermediate spacer 530 in the optical axis O direction, thereby preventing a peeling on the interface between the lens 13 and the intermediate spacer 530, and a peeling on the interface between the lens 14 and the intermediate spacer (effecting a tight adhesion of the adhesion medium against the facing surfaces 13*a*, 530*a*, and the facing surfaces 14*aa*, 530*b*. The"optical axial followability" can follow a separative displacement between the lens 13 and the intermediate spacer 530 in the optical axis O direction and another separative displacement between the lens 14 and the intermediate spacer 530.

The adhesion medium (adhesive) makes it possible to obtain "radial followability" and "optical axial followability" by using an adhesive containing the same material and having the same physical property value as the adhesion medium 40 shown in the first embodiment.

Further, in the present embodiment, on any one of the facing surfaces 13*a*, 530*a* of the first lens 13 and the intermediate spacer 530, there is provided a deterrent portion that prevents the flow of adhesive (adhesion medium) applied to the inter-lens space S1 from flowing into the inter-lens space S1.

For use as such deterrent portion, on a part of at least one of the facing surfaces 13*a*, 530*a*, there may be provided a recess to be filled with an adhesive, and there may also be provided a convex portion that can suppress the flow of the adhesive into the inter-lens space S1.

Figure 24:
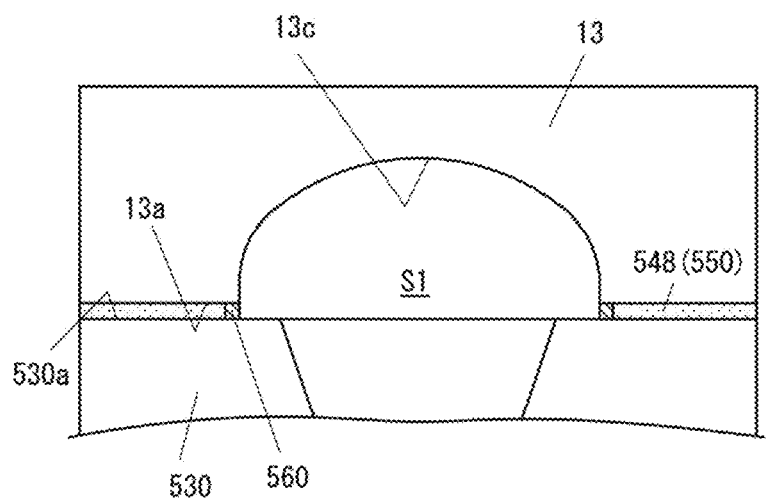
FIG. 24 is a cross-sectional view schematically showing an adhesion state of the first embodiment between the first lens and the intermediate spacer.

For example, as schematically shown in FIG. 24, in this embodiment, a convex portion 560 serving as a deterrent portion is provided on part of the facing surfaces 530*a* among the annular facing surfaces 13*a*, 530, in the form of a circular ring around the center of the facing surface 530*a*. Here, the convex portion 560 may also be provided on the facing surface 13*a*.

The convex portion 560 is provided at a position where the convex portion is close to the outer diameter side by a predetermined length from the inner periphery of the facing surface 530*a*, and the inner periphery edge of the convex portion 560 is consistent with the inner periphery of the facing surface 13*a*. Here, the height of the convex portion 560 is preferably about 5-500 µm. When forming an intermediate spacer 530 by resin injection molding, such a convex portion 560 may be integrally formed with an intermediate spacer 530. Meanwhile, it is also possible that the intermediate spacer 530 and the convex portion 560 may be provided separately, upon molding the intermediate spacer 530 by means of resin injection molding.

The convex portion 560 provided on the facing surface 530*a* is in contact with the facing surface 13*a*. Therefore, it is possible to set the thickness of the adhesion medium 548 by virtue of the convex portion 560, and it is also possible to set a radial region (adhesive filling area) for the adhesion medium 548.

Further, by providing a convex portion 560, it is possible to prevent the adhesion medium applied to the facing surface 530*a* from flowing into the inter-lens space S1, and to ensure an easy application of the adhesion medium.

On the other hand, a similar convex portion 560 (not shown) may be provided on the radial outside of the facing surface 530*a*. In this way, it is possible to more accurately set the thickness of the adhesion medium, and to ensure an easy application of the adhesion medium.

Figure 25:
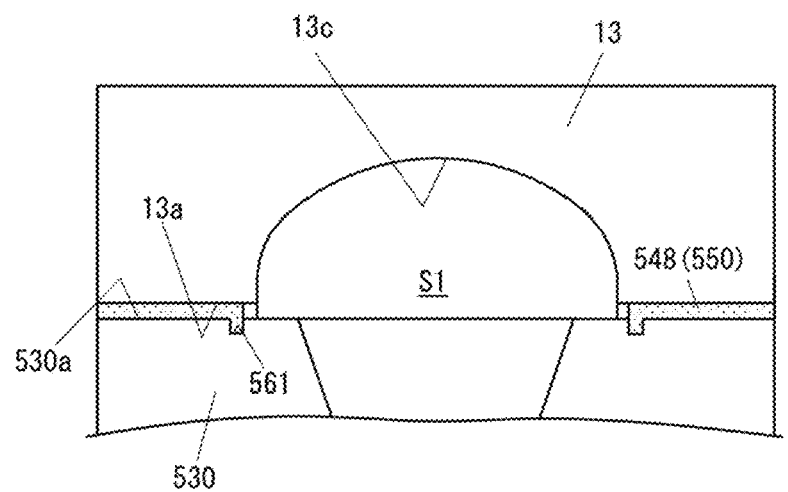
FIG. 25 is a cross-sectional view schematically showing an adhesion state of the second embodiment between the first lens and the intermediate spacer.

Further, as schematically shown in FIG. 25, in this embodiment, a recess 561 serving as a deterrent portion is provided in a portion of the annular facing surface 530*a*, in the form of a circle around the center of the facing surface 530*a*.

The recess 561 is provided on the facing surface 530*a* at a position that is close to the outer diameter side by a predetermined length from the inner periphery. The depth of the recess 561 is preferably about 5-500 µm. When forming the intermediate spacer 530 by resin injection molding, a recess 561 may be provided in an integral form with the intermediate spacer 530. Alternatively, it is also possible for the intermediate spacer 530 to be provided on the facing surface 530*a* after the intermediate spacer 530 has been formed by resin injection molding.

Although the adhesion medium is applied to the facing surfaces 13*a*, 530*a* in a predetermined thickness, since the surplus adhesion medium flows into the recess 561, it is possible to inhibit the adhesion medium from flowing into the inter-lens space S1, and to ensure an easy application of the adhesion medium.

Figure 26:
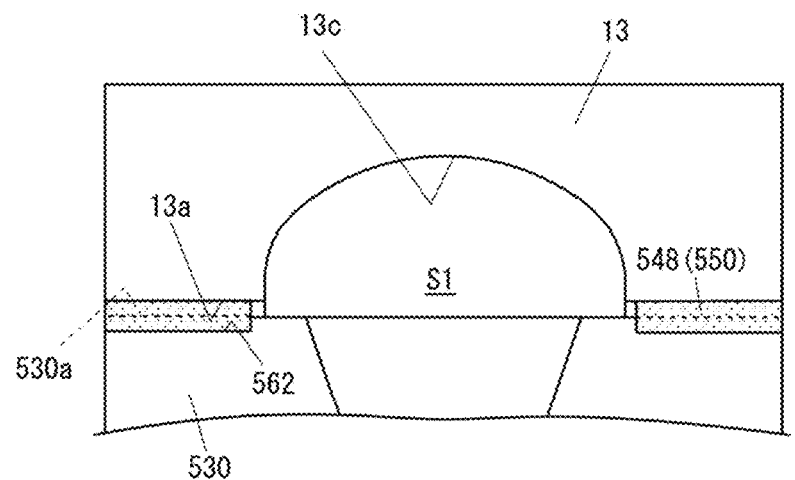
FIG. 26 is a cross-sectional view schematically showing an adhesion state of the third embodiment between the first lens and the intermediate spacer.

Further, as schematically shown in FIG. 26, in the present embodiment, a concave groove 562 serving as a deterrent portion is provided on part of the facing surface 530*a*, in the form of a circle around the center of the facing surface 530*a*. Moreover, it is also possible for the concave groove 562 to be radially provided around the center of the facing surface 530*a*. In this case, it is possible for the concave grooves 562, 562 adjacent to each other in the circumferential direction to be evenly or unevenly spaced from each other.

The concave groove 562 is provided on the facing surface 530*a* in an area extending from a position (in which the groove is close to the outer diameter side by a predetermined length from the inner periphery) to the outer periphery of the facing surface 530*a*. The depth of the concave groove 562 is preferably about 5-500 µm. When forming the intermediate spacer 530 by resin injection molding, such a concave groove 562 may be provided in an integral form with the intermediate spacer 530. On the other hand, it is also possible for the groove to be formed on the facing surface 530a after the intermediate spacer 530 is formed by resin injection molding.

Although the adhesion medium is applied to the facing surfaces 13a, 530a in a predetermined thickness, but since the surplus adhesion medium flows into the concave groove 562, it is possible to inhibit the flow of the adhesion medium into the inter-lens space S1, and to ensure an easy application of adhesion medium.

In the present embodiment, on at least one of the facing surfaces 530b, 14aa of the intermediate spacer 530 and the second lens 14, there may be provided a deterrent portion that prevents the flow of adhesive (adhesion medium) applied to the facing surfaces 530b, 14aa from flowing into the inter-lens space S1.

For use as such a deterrent portion, on part of at least one of the facing surfaces 530b, 14aa there may be provided a recess to be filled with the adhesion medium, and it may also be convex portion that suppresses the flow of the adhesion medium into the inter-lens space S1.

Figure 27:
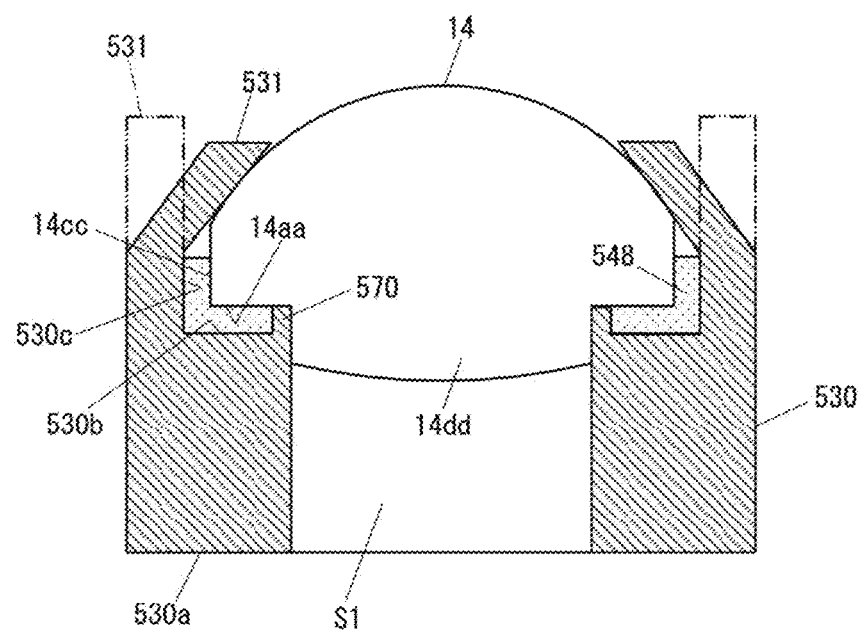
FIG. 27 is a cross-sectional view schematically showing an adhesion state of the first embodiment between the second lens and the intermediate spacer.

For example, as schematically shown in FIG. 27, in this embodiment, a convex portion 570 serving as a deterrent portion is provided on part of the facing surfaces 530b among the annular facing surfaces 14aa, 530b, in the form of a circle around the center of the facing surface 530b. On the other hand, the convex portion 570 may be provided on the facing surface 14aa.

The convex portion 570 is provided on the inner periphery portion of the facing surface 530b, while the inner periphery of the convex portion 570 is consistent with the inner periphery of the facing surface 14aa. Here, the height of the convex portion 570 is preferably about 5-500 μm. When the intermediate spacer 530 is formed by resin injection molding, such a convex portion 570 may be provided integrally with the intermediate spacer 530. On the other hand, it is also possible for the convex portion 570 and the intermediate spacer 530 to be provided separately after the intermediate spacer 530 is formed by resin injection molding.

The adhesion medium 548 is used to fill between the facing surfaces 530b, 14aa and between the facing surfaces 530c, 14cc, while the adhesion medium 548 closely adheres to the facing surfaces 530b, 14aa and the facing surfaces 530c, 14cc.

The convex portion 570 provided on the facing surface 530b is in contact with the facing surface 14a. Therefore, it is possible to set the thickness of the adhesion medium 548 by virtue of the convex portion 570, further to set a radial region (adhesive filling area) of the adhesion medium 548.

Further, by providing the convex portion 570, it is possible to inhibit the adhesion medium applied to the facing surface 530b from flowing into the inter-lens space S1, and to ensure an easy application of the adhesion medium 548.

Figure 28:
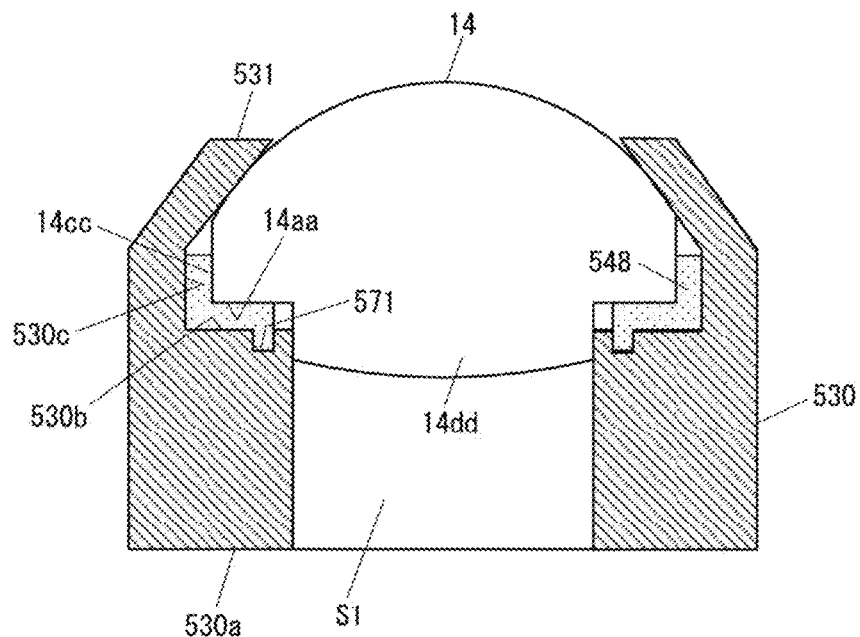
FIG. 28 is a cross-sectional view schematically showing an adhesion state of the second embodiment between the second lens and the intermediate spacer.
Figure 29:
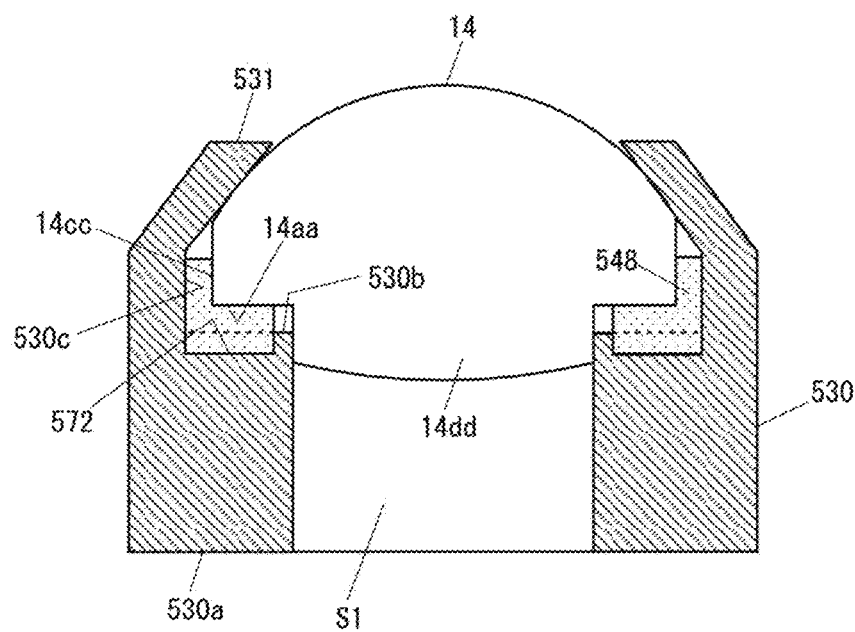
FIG. 29 is a cross-sectional view schematically showing an adhesion state of the third embodiment between the second lens and the intermediate spacer.

FIGS. 27-29 show the vertical direction of the second lens 14 and the intermediate spacer 530 upside down with respect to those shown in FIG. 22 and FIG. 23. This is shown upside down for the convenience of the description because the second lens 14 and the intermediate spacer 530 are integrated together in advance before being inserted into the lens barrel 12.

When the second lens 14 and the intermediate spacer 530 are integrated together, as shown in FIG. 27, before caulking the caulking portion 531 (the caulking portion 531 before caulking is shown by a double-dashed line), a predetermined amount of adhesion medium 548 is used to file (to be applied to) the facing surface 530b of the intermediate spacer 530. In this way, since a convex portion 570 is provided around the inner periphery portion of the facing surface 530b, the adhesion medium 548 may be weir-stopped by the convex portion 570 to prevent its flow into the inter-lens space S1.

Next, the second lens 14 is inserted from above to the inner diameter side of the intermediate spacer 530, and the facing surface 14aa is contacted with the facing surface 530b of the intermediate spacer 530 via the adhesion medium 548. As a result, an adhesion medium is used to fill between the facing surfaces 14aa, 530b and between the facing surfaces 14 cc, 530c, while the adhesion medium 548 adheres to the facing surfaces 14aa, 530b and the facing surfaces 14cc, 530c. On the other hand, the small diameter portion 14dd of the second lens 14 is inserted on the inner diameter side of the intermediate spacer 530.

Finally, the caulking portion 531 is caulked in the radial inward direction. As a result, the second lens 14 is pushed toward the radial center side of the intermediate spacer 530 and the facing surface 530b, while the facing surface 14aa of the second lens 14 is pressed in the optical axis direction (vertical direction in FIG. 28) on the facing surface 530b of the intermediate spacer 530. In this way, the second lens 14 is positioned optically and radially on the intermediate spacer 530 and is firmly bonded by the adhesion medium 548. By using a thermosetting material as an adhesion medium 548, the adhesion medium 548 is cured and the second lens 14 and the intermediate spacer 530 are firmly integrated by holding the second lens 14 and the intermediate spacer 530 in a high temperature room or the like for a certain time.

Further, as schematically shown in FIG. 28, in the present embodiment, a recess 571 serving as a deterrent portion is provided in part of the annular facing surface 530b, in the form of a circle around the center of the facing surface 530b.

The recess 571 is provided on the facing surface 530b at a position that is close to the outer diameter side by a predetermined length from the inner periphery. The depth of the recess 571 is preferably about 5-500 μm. When the intermediate spacer 530 is formed by resin injection molding, such a recess 571 may be provided in integral form with the intermediate spacer 530. Alternatively, the recess 571 may be provided on the facing surface 530b, after the intermediate spacer 530 is formed by resin injection molding.

The adhesion medium 548 is used to fill between the facing surfaces 530b, 14aa and between the facing surfaces 530c, 14cc, while the adhesion medium 548 adheres to the facing surfaces 530b, 14aa and the facing surfaces 530c, 14cc.

Although the adhesion medium 548 is applied to the facing surfaces 14aa, 530b in a predetermined thickness, but since the surplus adhesion medium 548 flows into the recess 571, it is possible to inhibit the adhesion medium from flowing into the inter-lens space S1, and to ensure an easy application of the adhesion medium.

Further, as schematically shown in FIG. 29, in the present embodiment, a concave groove 572 serving as a deterrent portion is provided in part of the annular facing surface 530b, in the form of a circle around the center of the facing surface 530b. Further, the concave grooves 572 may be radially provided around the center of the facing surface 530b. In this case, the concave grooves 572, 572 adjacent to each other in the circumferential direction may be evenly or unevenly spaced apart from one another.

The concave groove 572 is provided on the facing surface 530b in an area extending from a position (where it is close to the outer diameter side by a predetermined length from the inner periphery) to the outer periphery of the facing surface 530b. The depth of the concave groove 572 is preferably about 5-500 μm. When the intermediate spacer 530 is formed by resin injection molding, such a concave groove 572 may be provided in an integral form with the intermediate spacer 530. Further, after the intermediate spacer 530 is formed by resin injection molding, it is also possible for the concave groove 572 to be provided on the facing surface 530a.

The adhesion medium 548 is introduced to file between the facing surfaces 530b, 14aa and between the facing surfaces 530c, 14cc, while the adhesion medium 548 adheres to the facing surfaces 530b, 14aa and the facing surfaces 530c, 14cc.

Although the adhesion medium is applied to the facing surfaces 14aa, 530b in a predetermined thickness, since the surplus adhesion medium flows into the concave groove 572, it is possible to inhibit adhesion medium 548 from flowing into the inter-lens space S1, and to ensure an easy application of the adhesion medium 548.

Further, the "tight adhesion" or "optical axial followability" required for the adhesion medium 548 described above can be realized by setting, at a range of 01 μm-200 μm (in terms of square average roughness Rq), a surface roughness of at least one facing surface 13a (530a) of the first lens 13 and intermediate spacer 530 and at least one facing surface 14aa (530b) of the second lens 14 and intermediate spacer 530. This is particularly beneficial when the first and second lenses 13, 14 and the intermediate spacer 530 are formed by glass that does not need any attention regarding its "radial followability" described above. In the case of glass, there is a particular concern about peeling on the adhesion interface between the first lens 13 and the intermediate spacer 530 and another adhesion interface between the second lens 14 and the intermediate spacer 530 due to an increase in internal pressure of the inter-lens space S1 in a high temperature environment.

Further, in the present embodiment, it is preferable that the water absorption rate of the adhesion medium is 5.0 wt % (JIS K6911 (boiling 1 hour)) or lower. If the water absorption rate of the adhesion medium is set low in this way, the infiltration of water vapor into the inter-lens space S1 can be effectively suppressed. Further, in the present embodiment, it is preferable that the adhesion medium is black (the light transmittance of the adhesion medium is 20% or less in the wavelength range from 450 nm to 650 nm). If the adhesion medium is black in this way and its light transmittance is suppressed, it is also possible to omit the ink painting step which would otherwise be necessary for light blocking and ghost prevention (here, the adhesion medium can also function as an ink).

In this embodiment, it is preferable that the pressure in the inter-lens space S1 is an atmospheric pressure or less under a room temperature of 20 degrees. Thus, if the pressure in the inter-lens space S1 is atmospheric pressure or less, since it will not cause an internal pressure rise in the inter-lens space S1 even under a high temperature environment, it is possible to eliminate a problem of peeling off on the adhesion interface between the lens 13 and the intermediate spacer 530 and another adhesion interface between the lens 14 and the intermediate spacer 530, which is usually caused due to a mutual separation between the lens 13 and the intermediate spacer 530 in the optical axis O direction due to an increase in internal pressure. As a method of bonding together the facing surfaces 13a, 14aa and the facing surfaces 530a, 530b such that the pressure in the inter-lens space S1 is below atmospheric pressure, it is possible to perform an adhesion while at the same time suctioning and degassing the inter-lens space S1 where an adhesion is performed between the facing surfaces 13a, 14aa, and between the facing surfaces 530a, 530b under a vacuum atmosphere.

In the present embodiment, a single layer of adhesion medium 550 is formed by the adhesion medium 548 between the facing surface 13a of the first lens 13 and the facing surface 530a of the intermediate spacer 530. On the other hand, as shown in FIGS. 19-21 showing the fourth embodiment described above, it is also possible for the adhesion medium layer 550 to include a first adhesion medium layer located on the first lens 13 side, and second adhesion medium layer located on the intermediate spacer 530 side, with a plate-like inclusion interposed between the first adhesion medium layer and the second adhesion medium layer.

Namely, as shown in FIGS. 19-21, the second lens 14 may be replaced with an intermediate spacer 530. Here, for use as a thin plate-like inclusion, it is possible to use, for example, a light blocking plate having light blocking property, a heater or a rubber sheet. By using these light blocking materials having a light blocking property, it is possible to omit the ink painting step on the facing surface 13a of the first lens (which is otherwise necessary for ghost prevention). As described in the fourth embodiment, it is possible to use an adhesion form and an adhesion method in which the thin plate-like medium is bonded between the second lens 14 and the intermediate spacer 530 through the first adhesion medium layer and the second adhesion medium layer.

As described above, according to the present embodiment, the first lens 13 and the intermediate spacer 530, the intermediate spacer 530 and the second lens 14 are bonded to each other so that the inter-lens space S1 is sealed to the outside. In this way, even in a high humidity environment, it is still possible to prevent the water vapor from invading into the inter-lens space S1 where a dew condensation is most likely to occur, further to prevent the water vapor from entering the lens unit on the image side (improving airtightness). In addition, it is possible to reduce an amount of water vapor in the inter-lens space S1, and to inhibit dew condensation on lens surface, especially on the lens surface (back side) 13c on the image side of the first lens 13. Namely, using the adhesion form of such lenses 13, 14 and the intermediate spacer 530, it is possible to ensure a highly reliable sealed state in the inter-lens space S1.

Further, the first lens 13 and the intermediate spacer 530 are bonded together by the adhesion medium (adhesive) 548 for use in bonding together the facing surfaces 13a, 530a, while the intermediate spacer 530b and the second lens 14 are bonded together by the adhesion medium (adhesive) 548 for use in bonding together the facing surfaces 530b, 14aa facing each other in the optical axis direction. Here, the adhesion medium 548 has "radial followability", and/or "tight adhesion", or "optical axial followability. The "radial followability" can follow radial relative displacements between lenses 13, 14 which is caused due to i) a linear expansion coefficient difference between the first lens 13 and the intermediate spacer 530, ii) a difference in expansion/shrinkage amount between the first lens 13 and the intermediate spacer 530 which is associated with linear expansion coefficient difference between the second lens 14 and the intermediate spacer 530, iii) a difference in expansion/shrinkage amount between the second lens 13 and the intermediate spacer 530 (which is a flexibility to sufficiently withstand radial stresses applied to the adhesion interface between the lenses after the expansion (shrinkage) of lenses associated with temperature change). The "tight adhesion" prevents the separation between the lens 13 and the intermediate spacer 530 in the optical axis O direction, and another separation between the second lens 14 and the intermediate spacer 530 in the optical axis O direction, thereby preventing a peeling on the interface between the lens 13 and the intermediate spacer 530, and a peeling on the interface between the lens 14 and the intermediate spacer 530 (exhibiting a tight adhesion of the adhesion medium against the facing surfaces 13*a*, 530*a* of the first lens 13 and the intermediate spacer 30, and another tight adhesion of the adhesion medium against the facing surfaces 530*b*, 14*aa* of the second lens 14 and the intermediate spacer 530). The "optical axial followability" can follow a separative displacement between the lens 13 and the intermediate spacer 530 in the optical axis O direction and another separative displacement between the lens 14 and the intermediate spacer 530. In this way, it is possible to obtain the "radial followability", and optical axial followability.

Further, deterrent portions 560, 561, 562 are provided on the facing surfaces 13*a*, 530*a* of the first lens 13 and the intermediate spacer 530, while the deterrent portions 570, 571, and 572 are provided on the facing surfaces 14*aa*, 530*b* of the second lens 14 and the intermediate spacer 530. In this way, it is possible to inhibit the adhesion medium 548 applied to the facing surface from flowing into the inter-lens space S1, and to ensure an easy application of the adhesion medium 548.

Further, the adhesion medium layer 550 has a first adhesion medium layer 551 located on the first lens 13 side and a second adhesion medium layer 552 located on the intermediate spacer 530 side, while a thin plate-like intermediate inclusion 555 is interposed between the first adhesion medium layer 551 and the second adhesion medium layer 552. In this way, it is possible to have an adhesion medium forming the first adhesion medium layer 551 and another adhesion medium forming the second adhesion medium layer 552, with the two adhesion mediums being different from each other in their types. As a result, for example, when the first lens 13 is made of glass and the intermediate spacer 530 is made of resin, it is possible to easily select an adhesion medium capable of firmly bonding together the glass lens (first lens 13) and the thin plate-like intermediate inclusion 555, also to easily select an adhesion medium capable of firmly bonding together the intermediate spacer 530 and the thin plate-like intermediate inclusion 555.

Further, since it is possible to easily set the thickness of the first adhesion medium layer 551 and the thickness of the second adhesion medium layer 552, it becomes possible to easily set and increase the above-described "radial followability".

Sixth Embodiment

On the other hand, when the facing surfaces 13*a*, 14*a* of the first lens 13 and the second lens 14 are bonded to each other by the adhesion medium, there is a possibility that the lens may crack under certain circumstances, depending on the hardness of the adhesion medium. Particularly, regarding the combinations of lenses with different linear expansion coefficients, for example, when the first lens 13 is made of glass and the second lens 14 is made of resin, and when the adhesion medium is a hard adhesive that is difficult for water to pass through, such as epoxy adhesive (for example, its hardness is around D80 in terms of Shore hardness), it is possible to firmly bond together the lenses by making full use of the hardness of the adhesive. On the other hand, due to the radial relative displacement between the lenses 13, 14, which is caused due to the difference in the amount of expansion/contraction of the lenses during the temperature change associated with the difference in linear expansion coefficient between the lenses 13, 14, the adhesive will peel off from the first glass lens 13. Accordingly, the surface of the first lens 13 may be cracked due to a stress acting on the first lens 13. In particular, such a cracking phenomenon is likely to occur inwardly in the radial direction of the facing region between the lenses 13, 14, where a stress concentration is likely to occur depending on shape of the lens and the junction state between the lenses.

Figure 30:
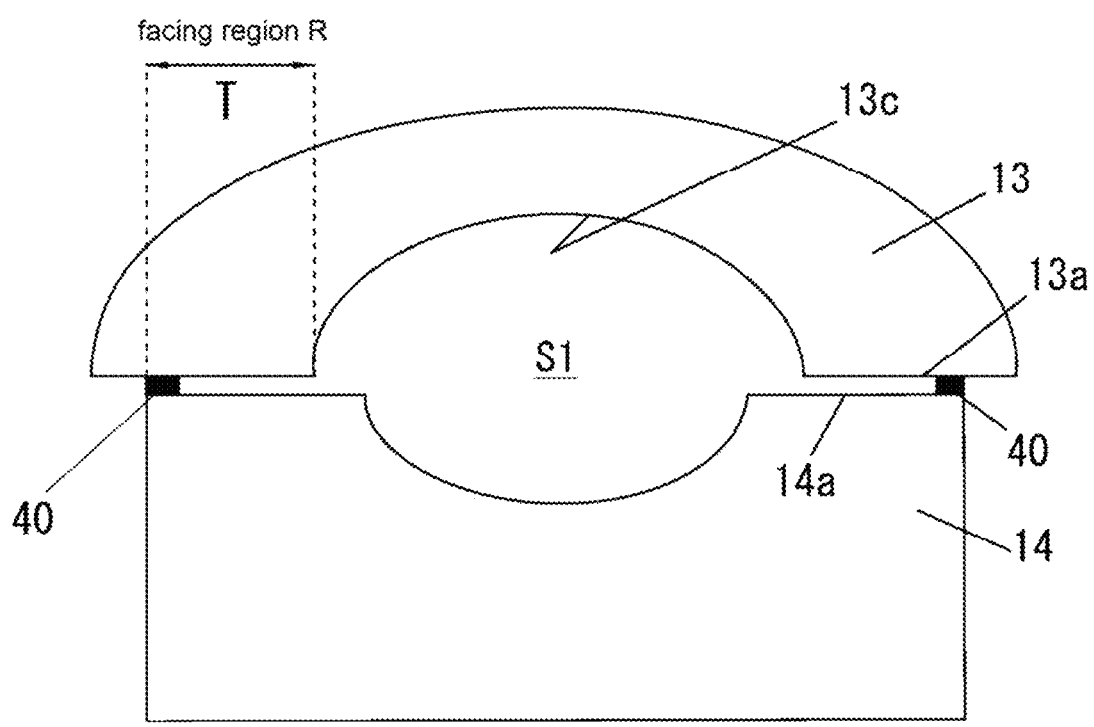
FIG. 30 is a schematic diagram showing a main portion of a lens unit according to a sixth embodiment of the present invention.

The inventors of the present invention have found that such a cracking phenomena is mainly due to the application of a hard adhesion medium (adhesive) throughout the facing region of the facing surfaces 13*a*, 14*a* of the lenses 13, 14 facing each other. If the first lens 13 is made of glass and the second lens 14 is made of resin, and an adhesion medium containing an epoxy adhesive, is an adhesive having a high hardness of D70 or more in terms of Shore hardness, it is possible to obtain the following effects. Namely, as shown in FIG. 30, in the circular facing region of the facing surfaces 13*a*, 14*a* of the lenses 13, 14 facing each other, it is possible to avoid the first lens cracking phenomenon described above, by not applying the adhesion medium in a range exceeding 50% of the thickness of the circle (which is a difference between the outer diameter and the inner diameter of the ring) extending from the inner circumference of the circle. In other words, the adhesive is applied only within 50% of the thickness of the circular ring from the outer circumference of the circular facing region. Here, the facing region between the facing surfaces 13*a*, 14*a* of the lenses 13, 14 means a region in which an interval between the facing surfaces 13*a*, 14*a* in the optical axial direction is 500 μm or less.

As described in the sixth embodiment, the respective embodiments shown in FIGS. 31-36 are illustrating a condition where an adhesion medium is an adhesive containing an epoxy adhesive having a high hardness of D70 or more in terms of a Shore hardness. At this time, to suppress a cracking on the surface of the first glass lens, the present embodiment is characterized by not actively providing an adhesive agent in the annular facing region R which is facing surface between the first lens and the adjacent second resin lens or an intermediate spacer, thereby illustrating an example showing an adhesion medium application state in the lens unit. Here, the circular facing region R which is between facing surface 13*a*, 14*a* of the first lens 13 and the second lens 14, means a region in which an axial interval between the facing surfaces 13*a*, 14*a* of the first lens 13 and the second lens 14 is 500 μm or less, including a tangential region having an interval of 0.

Seventh Embodiment

Figure 31:
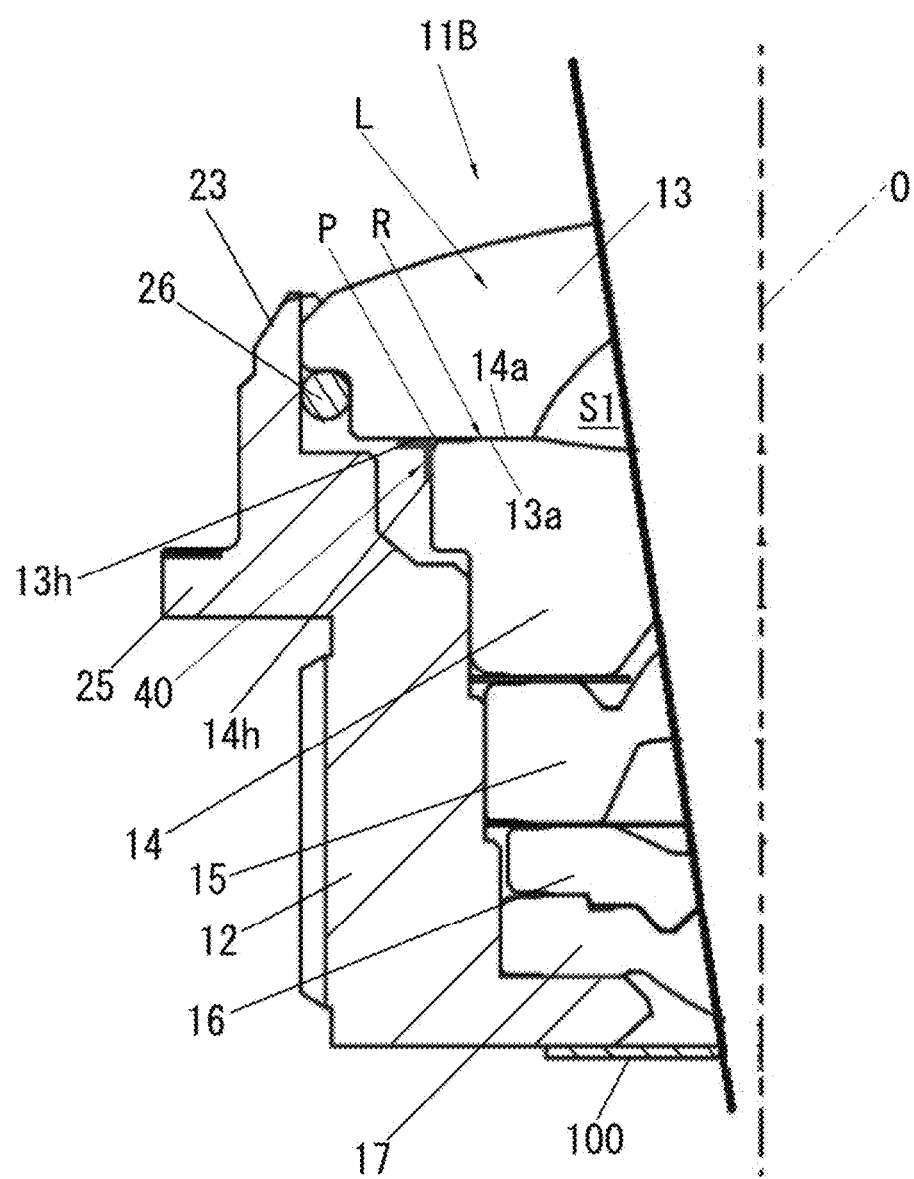
FIG. 31 is a schematic half-cross-sectional view of a lens unit according to the seventh embodiment of the present invention.

In the lens unit 11B according to the seventh embodiment shown in FIG. 31, the first lens 13 made of glass and the second lens 14 made of resin (hereinafter, they are the same in all the drawings up to FIG. 34) have facing surfaces 13*a*, 14*a*. On the radial outside beyond the outside edge P in radial direction of the facing region where the facing surfaces 13*a*, 14*a* are facing each other (including contact state), the adhesion medium 40 (in this embodiment, an epoxy adhesive has a Shore hardness of about D80) is applied to the outer surface of the first lens 13 (bottom surface; the surface on the image side) and the outer surface of the second lens 14 (outer periphery surface facing the inner surface of the barrel), in a manner such that the inter-lens space S1 is sealed to the outside. In this case, the adhesion medium 40 is continuously extending to an outer surface portion 13h and an outer surface portion 14h (L-shaped applied state). The outer surface portion 13h is in contact with the facing surface 14a of the second lens 14 or not facing thereto, among the surfaces facing the image side on the first lens 13. The outer surface portion 14h is an outer periphery surface of the second lens 14 which is adjacent to the outer surface portion 13h and facing the inner surface of lens barrel 12. In such an applied state of the adhesion medium 40, the adhesion medium 40 may penetrate slightly into the annular facing region R due to surface tension during the applying step. On the other hand, the adhesion medium 40 will not even partially enter a range exceeding 50% of the thickness of circle from the outer periphery of the circle. Consequently, even when the temperature changes, it is still possible to prevent a cracking on the first lens 13 which will otherwise be caused due to a large stress (due to adhesion medium 40) acting on the first lens 14. Further, the first lens 13 and the second lens 14 to which the adhesion medium 40 has been applied are incorporated into the lens barrel 12 in a state combined into an integral lens unit associated with the adhesion medium 40. The unitization of such lenses 13, 14 has an advantage of being possible to perform an airtight test (a test to confirm the sealed state) in the inter-lens space S1 by such a unit alone.

Eighth Embodiment

Figure 32:
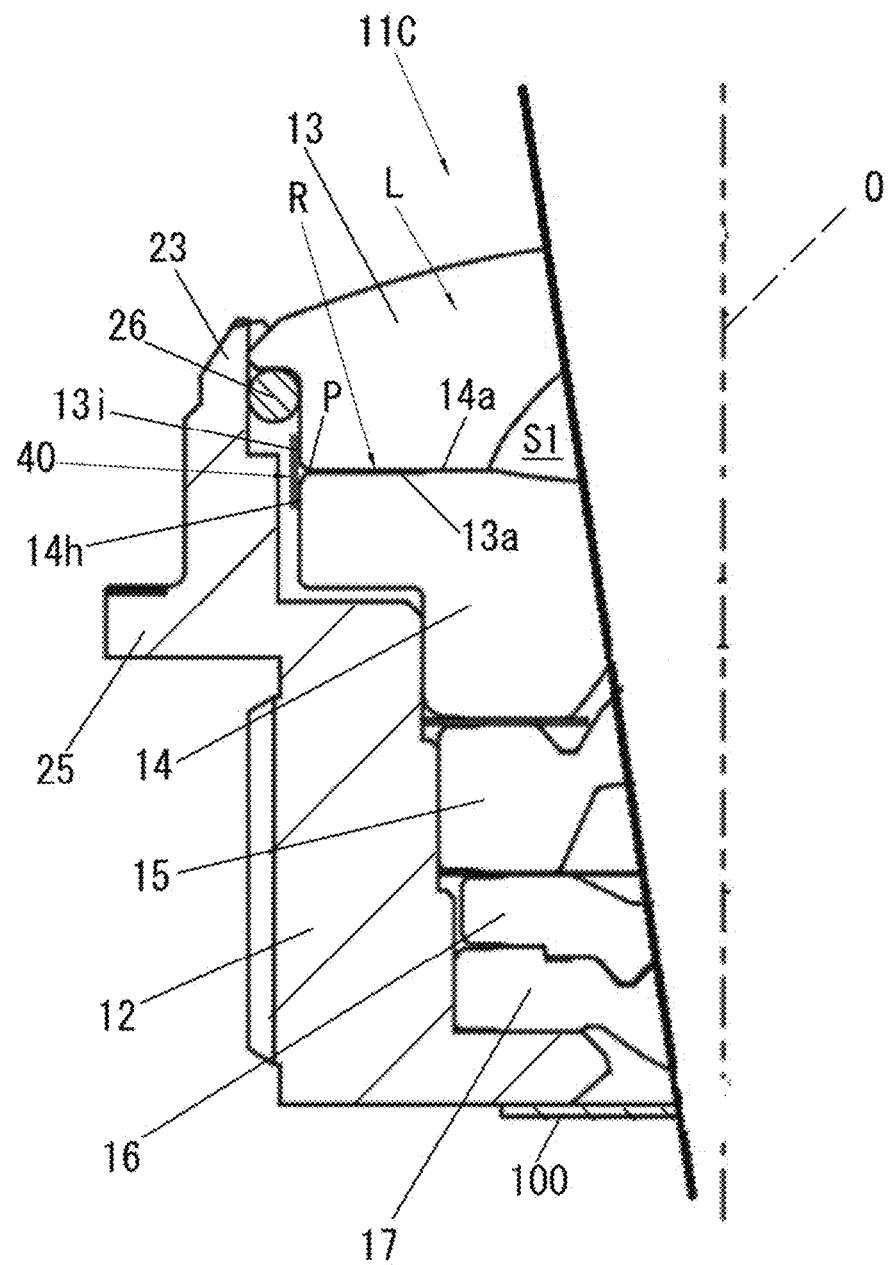
FIG. 32 Is a schematic half-cross-sectional view of a lens unit according to the eighth embodiment of the present invention.

In the lens unit 11C according to the eighth embodiment shown in FIG. 32, as described in the above embodiments, on the radial outside beyond the radial outer edge P in the facing region R where the facing surfaces 13a, 14a of the first lens 13 and the second lens 14 are facing each other, the adhesion medium 40 is applied to the outer periphery surface which is the outer surface of the first lens, and to another outer periphery surface which is the outer surface of the second lens, in a manner such that the inter-lens space S1 is sealed to the outside. In this case, the adhesion medium 40 is continuously extending over the outer surface portion 13i of the first lens 13 facing the inner surface of the lens barrel 12 and the outer surface 14h of the second lens facing the inner surface of the lens barrel 12 (the outer surface portion 14h is adjacent to the outer surface portion 13i (straight applying form)). In this way, the first lens 13 and the second lens 14 to which the adhesion medium 40 has been applied are also incorporated into the lens barrel 12 in a state of having been combined as an integral unit associated with the adhesion medium 40. Further, even in such an applying form of the adhesion medium 40, the adhesion medium 40 may slightly infiltrate into the annular facing region R due to a surface tension in the applying step. Nevertheless, it is still possible to inhibit the adhesion medium 40 from entering a range exceeding 50% of the thickness (a difference between the outer diameter and the inner diameter of the annulus) even partially from the outer circumference of the annulus.

Ninth Embodiment

Figure 33:
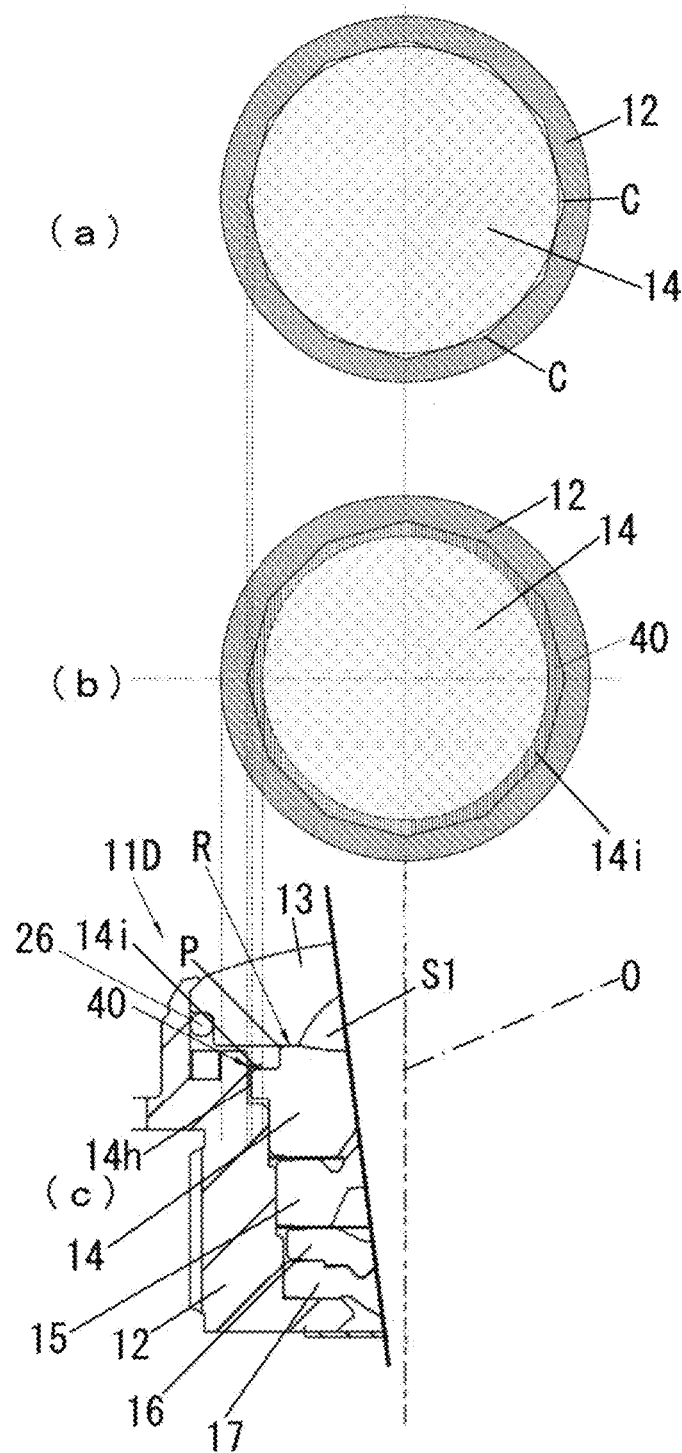
FIG. 33 shows a lens unit according to a ninth embodiment of the present invention, (a) is a cross section that is orthogonal to the optical axis direction at a position where the second lens is attached before application of the adhesion medium, (b) is a cross section that is orthogonal to the optical axis direction at a position where the second lens is attached after application of the adhesion medium, and (c) is a half-cross-sectional view along the optical axis direction of the lens unit.

Further, in the lens unit 11D according to the ninth embodiment shown in FIG. 33, the lenses 14, 15, 16 and 17 except for the first lens 13 constituting the lens group L are arranged in the optical axis direction, forming point contacts with the lens barrel in the circumferential direction when viewed in cross section (for example, in a cross section perpendicular to the optical axis direction, the inner peripheral surface of the lens barrel 12 has a polygonal shape and the lens has a circular shape), thus forming gaps C with the inner surface of the lens barrel 12 in the radial direction (see FIG. 33(a)). Further, also in this embodiment, the adhesion medium 40 is applied to the outer surface of the second lens 14 on the radial outer side beyond the radial outer edge P of the facing region R. However, in this case, the adhesion medium 40 is continuously extending from the outer surface portion 14i facing the object side of the second lens 12 to the outer surface portion 14h which is the outer peripheral side surface of the second lens 14 facing the inner surface of the lens barrel 12, in a manner such that the adhesion medium 40 can be used to completely fill the gaps C formed between the inner surface of the lens barrel 12 and the second lens, thereby bonding together the outer surface portion 14h of the second lens 14 and the lens barrel 12. In such an applying form of the adhesion medium 40, it is possible not to completely apply the adhesion medium 40 to the entire range which is 100% of the area of the facing region R (100% of the thickness of the annulus). Therefore, it is possible to block the path which allows water vapor to move from the image sensor (imaging element) 304 (see FIG. 2) to arrive at the inter-lens spacer S1. As a result, by virtue of the adhesion medium 40 on the outer surface of the second lens 14 and the O-ring 26 on the side surface of the first lens 13, it is possible to ensure an airtightness of the inter-lens space S1 with respect to the outside. In this case, if the adhesion medium 40 is provided over the outer surface of the first lens 13 and the outer surface of the second lens 14 in the vicinity of the radial outer edge P of the facing region R, it is possible to further improve the airtightness of the inter-lens space S1.

The method of bringing the respective lenses into point contact with the lens barrel 12 in the circumferential direction within a cross section perpendicular to the optical axis direction is not limited to the case where the inner surface of the lens barrel 12 is polygonal. In fact, it is also possible to provide protruding ribs on the inner periphery surface of the lens barrel. Here, the point contact means point contacts in a cross section perpendicular to the optical axis direction, and includes point contacts in a linear formation in the optical axis direction. Further, in the present embodiment, the second lens 14 and the lens barrel 12 are adhered to each other, but the present invention is not limited to this embodiment. In fact, it is also possible that any one of the second lens to fifth lens, or a plurality of lenses and the lens barrel 12 are bonded together.

Tenth Embodiment

Figure 34:
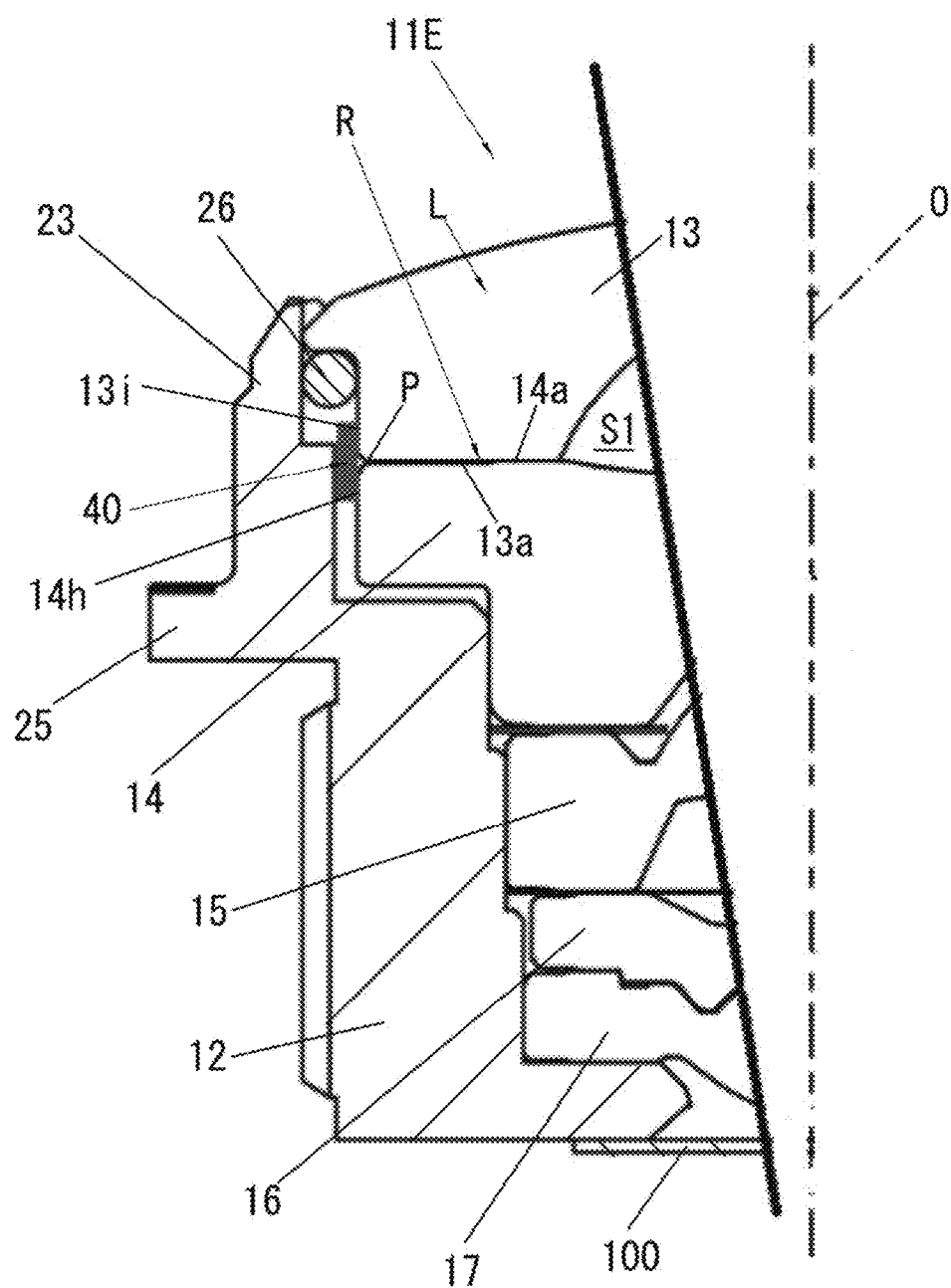
FIG. 34 Is a schematic half-cross-sectional view of a lens unit according to 10th embodiment of the present invention.

Further, the lens unit 11E according to the tenth embodiment shown in FIG. 34 is a modified embodiment based on FIG. 32, as has been described referring to FIG. 32, the adhesion medium 40 is continuously extending from the outer surface portion 13i of the lens 13 to the outer surface portion 14h of the second lens 14 (which is adjacent to the outer surface portion 13i) facing the inner surface of the lens barrel 12. However, in the present embodiment, the adhesion medium 40 is also used to bond the outer surface portion 14h of the lens 14 to the inner surface of the lens barrel 12. Even in such an applying form of the adhesion medium 40, the adhesion medium 40 may slightly infiltrate into the annular facing region R due to a surface tension during the applying step, but it is also possible to inhibit the adhesion medium 40 from entering a range exceeding 50% of the thickness of an annulus from the annular outer circumference (difference between the outer diameter and the inner diameter).

As described above, in order for the adhesion medium 40 not to be applied (from the outer periphery of the annular facing region R) to a range exceeding 50% of the thickness of the circle, if (on the radial outside beyond radial outer edge P of the facing region R) the adhesion medium 40 is applied to the outer surfaces of the first lens 13 and/or the second lens 14 in a manner such that the inter-lens space S1 is sealed to the outside, it is possible to obtain the following effect. Namely, as described above, it is possible to prevent a peeling of the adhesion medium 40 from the first lens 13 made of glass (such peeling is caused due to a relative displacement between the lenses 13, 14, that in turn is caused due to a difference in an expansion/shrinkage amount between the lenses during temperature change, which is associated with a difference in linear expansion coefficients between the lenses 13, 14), thereby avoiding a cracking on the surface of the first lens 13 which will be otherwise caused due to a stress acting on the first lens 13.

Further, as described above, there are various routes for water vapor to enter the lens unit, but there are also various routes for water vapor to enter the inter-lens space S1. Regarding the inter-lens space S1, in order to prevent a dew condensation on the back surface 13c of the first lens 13, to prevent a captured image from becoming blurred, further to prevent a deterioration of visibility that makes it impossible to ensure a desired resolution, it is necessary to suppress an invasion of water vapor into the inter-lens space S1. However, as described using FIG. 33, the lenses 14, 15, 16 and 17 make point contacts with the lens barrel 12 in the circumferential direction within a cross section perpendicular to the optical axis direction (Namely, in a cross section perpendicular to the optical axis direction, the inner peripheral surface of the lens barrel 12 is polygonal and the lenses are circular). In this way, gaps C are formed between lenses and the inner surface of the lens barrel (thus forming a connecting path continuously extending in the optical axial direction). At this time, a moisture contained in the substrate of the constantly energized image sensor (imaging element) 304 (see FIG. 2) for receiving a light collected through the lens unit and converting it into an electric signal is vaporized by heating the substrate and then the moisture enters the containment space S1. The embodiment shown in FIG. 33 described above can solve such a problem, and the adhesion medium 40 can bond the outer surface portion 14h of the second lens 14 to the inner surface of the lens barrel 12, so that it is possible to block the path through which water vapor from the image sensor (imaging element) 304 will reach the inter-lens space S1.

Figure 35:
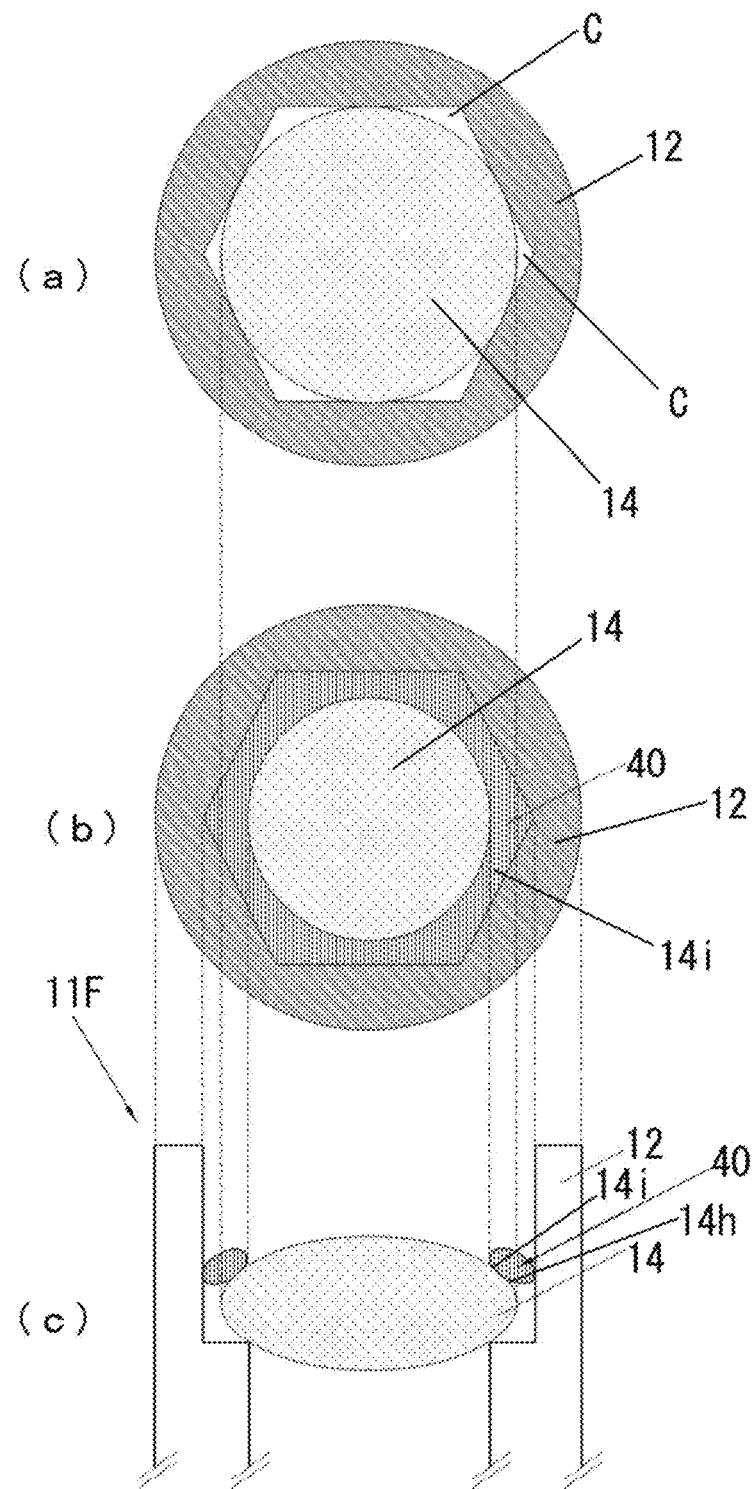
FIG. 35 Is a schematic diagram for explaining a passage blocking in detail, (a) is a cross section that is orthogonal to the optical axis direction at a position where the second lens is attached before application of the adhesion medium, (b) is a cross section that is orthogonal to the optical axis direction at a position where the second lens is attached after application of the adhesion medium, and (c) is an extremely schematic cross-sectional view along the optical axis direction of the lens unit at a position where the second lens is attached.

Now, description will be given to explain a passage blocking in more detail with reference to FIG. 35. In the lens unit 11F shown in FIG. 35, the gaps C are filled with the adhesion medium 40 to block the gas flow path extending from the image side to the inside of the inter-lens space S1 (a continuous passage formed by respective gaps C between the inner surface of the lens barrel 12 and the respective lens 14, 15, 16, 17. Specifically, as shown in FIG. 33, in order to completely fill the gaps C formed between the inner surface of the lens barrel 12 and the second lens 14, the adhesion medium 40 is applied continuously to the outer surface portion 14i of the lens 14 facing the object side and the outer surface portion 14h of the second lens 14 facing the inner surface of the lens barrel 12, thereby bonding together the outer surface portion 14h of the second lens 14 and the inner surface of the lens barrel 12. However, the gaps C filled with the adhesion medium 40 to block the gas flow path extending from the image side to the inside of the inter-lens space S1, means not only the radial gaps C between the second lens 14 and the lens barrel 12, but also the gaps between the lens barrel 12 and other lenses 15, 16, 17. By virtue of the blocking of the gas flow path using the adhesion medium 40, it is possible to prevent the water vapor (starting from the image sensor 304 and entering the inner accommodation space S) from invading into the inter-lens space S1, thereby avoiding a dew condensation on the back surface 13c of the first lens 13.

Eleventh Embodiment

Figure 36:
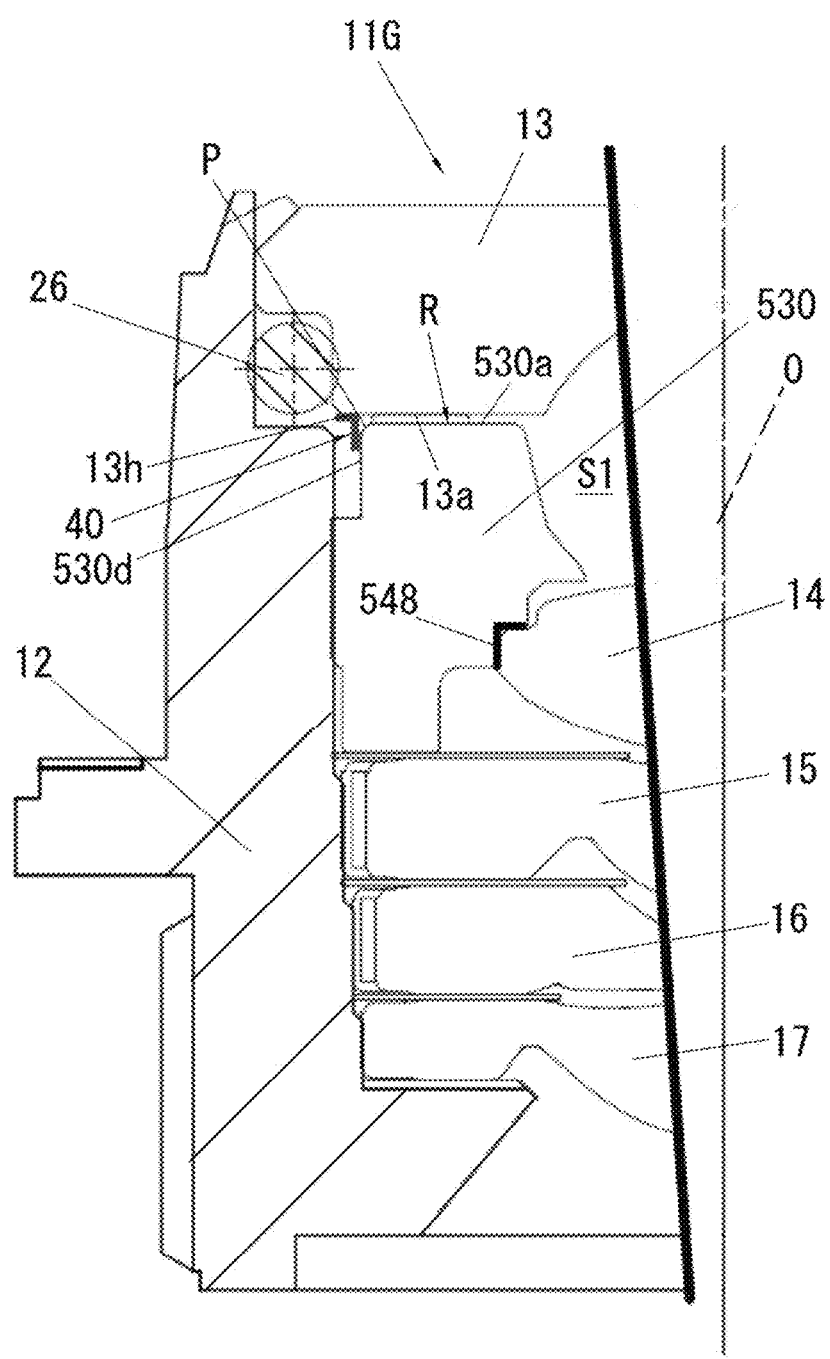
FIG. 36 Is a schematic half-cross-sectional view of a lens unit according to an 11th embodiment of the present invention.

FIG. 36 shows an eleventh embodiment based on the configuration of the lens unit of FIG. 22 described above. As shown, the L-shaped adhesion medium applying form shown in FIG. 31 is applied between the resin intermediate spacer 530 and the first glass lens 13. Specifically, as in FIG. 22, the adhesion medium 548 is interposed between the second lens 14 and the intermediate spacer 530, while an L-shaped adhesion medium applying form is adopted instead of the adhesion medium 548 between the first lens 13 and the intermediate spacer 530. More specifically, in the lens unit 11G according to this embodiment, on the radial outside beyond the radial outer edge P of the annular facing region R in which the facing surfaces 13a, 530a of the first lens 13 and the intermediate spacer 530 are facing each other, the adhesion medium 40 is applied to the outer surface of the first lens 13 (bottom surface; the surface on the image side) and the outer surface of the intermediate spacer 530 (outer circumferential side surface facing the inner surface of the lens barrel 12) such that that the inside of the inter-lens space S1 is sealed to the outside. Here, the adhesion medium 40 is an adhesive containing an epoxy-based adhesive having, for example, a Shore hardness as high as D70 or higher.

In this case, the adhesion medium 40 is applied to, among surfaces of the first lens 13 facing the image side, a radial outer surface portion 13h that does not abut or face the facing surface 150a of the intermediate spacer 530, and to the outer surface portion 530d which is the outer peripheral side surface of the intermediate spacer 530 that is adjacent to the outer surface portion 13h and facing the inner surface of the lens barrel 12 (L-shaped applying form). In such an applying form of the adhesion medium 40, there is a possibility that the adhesion medium will slightly infiltrate into the annular facing region R due to surface tension during the applying process. On the other hand, since the adhesion medium 40 does not move even partially from the annular outer circumference, into a range exceeding 50% of the thickness of circle (difference between the outer diameter and the inner diameter of the annulus), it is possible to prevent a cracking on the first lens 13 which will otherwise occur due to a large stress acting on the first lens 13 due to the adhesion medium 40 when the temperature changes. Further, an applying form of the adhesion medium 40 between the first lens 13 and the intermediate spacer 530 is not limited to the L-shaped applying form. In fact, it is also possible to use other applying form, such as a straight applying form not associated with an adhesion with the lens barrel described in connection with FIG. 32, a straight applying form associated with an adhesion with the lens barrel described in connection with FIG. 34, or an applying form described in connection with FIG. 33. Namely, it is possible to use an applying form for the adhesion medium to be applied to completely fill the gaps between the intermediate spacer 530 and the lens barrel 12. On the other hand, an adhesion medium for bonding together the second lens 14 and the intermediate spacer is not limited to the epoxy-based adhesive, and it is also possible to use an adhesive as described in the first embodiment.

Twelfth Embodiment

Further, the inventors of the present invention, after various trials and failures experienced, have found an appropriate adhesion width and also found a calculation formula for calculating such an adhesion width. Namely, by virtue of such an appropriate adhesion width, regarding an adhesion medium having a moisture permeability of 40 g/m²×24 hr or more, a water vapor which is about to enter between the facing surfaces 13a, 14a of the first and second lenses 13, 14 will not enter the inter-lens space S1. Namely, the following findings have been reached. Namely, if a moisture permeability of the adhesion medium is M (g/m²×24 hr), an adhesion width which is the radial dimension of the adhesion medium is W (mm), and a thickness which is the optical axis dimension of the adhesion medium is T (μm), when (0.0016×M−0.004)×T=A (mm), and if an adhesion width W is equal to or greater than a required minimum adhesion width A, it is possible to prevent a water vapor (which is about to enter between the facing surfaces 13a, 14a of the first and second lenses 13, 14) from entering the inter-lens space S1. FIG. 37 shows the experiment data serving as evidence for the above-mentioned advantages.

FIG. 37 shows experiment data for investigating the occurrence of fogging when three types of adhesion mediums having different moisture permeabilities are exposed to a high temperature and high humidity environment by changing the adhesion thickness and the adhesion width. In this test, as adhesion mediums, what were used include i) an olefin-based adhesive A having a moisture permeability (g/m²×24 hr) of 45 (an adhesive containing 100% by weight of an olefin-based resin (chain hydrocarbon having one double bond)), ii) acrylic adhesive B having a moisture permeability of 50 (an adhesive containing 100% by weight of acrylic resin), and iii) acrylic adhesive C having a moisture permeability of 60 (an adhesive containing 100% by weight of acrylic resin). With respect to the respective adhesion thicknesses (adhesive layer thickness) T of 20 μm, 25 μm and 30 μm and the respective adhesive widths W of 1.4 mm, 1.7 mm and 2.1 mm, an investigation was carried out to confirm whether there is an occurrence of fogging on the back surface of the first lens 13 (a surface of the first lens 13 facing the inter-lens space S1) under a high humidity environment, all relating to the lens unit containing the first and second lenses 13, 14 adhered to each other on their facing surfaces by virtue of adhesives A, B, C. Further, FIG. 37 shows a required minimum adhesion width (required adhesion width) which was calculated based on the above calculation formula for each of the adhesives A, B, and C regarding each adhesive thickness T. Here, as a specific condition for exposing the lens unit to a high temperature and high humidity environment, the lens unit was placed in a constant temperature and humidity chamber at 60° C. and 90% RH for 24 hours. Further, as a method for measuring the moisture permeability, a cup method (JIS 20208, a constant temperature and humidity of 40° C. and 90% RH, and a thickness of an adhesion medium of 200 μm) was adopted. Further, the presence or absence of fogging was determined based on the following procedures (a), (b), (c), (d), and (e). At step (a), the lens unit was taken out of a constant temperature and humidity chamber at 60° C. and 90% RH. At step (b), the lens unit was exposed to room temperature (25° C.) for 15 minutes. At step (c), the lens unit was exposed to a constant temperature chamber at 65° C. for 15 minutes. At step (d), a water at 25° C. was sprayed to the surface of the first lens for 5 seconds. At step (e), confirmation was performed to see the presence or absence of fogging on the back surface of the first lens (the surface of the first lens facing the inter-lens space) (in the figure, ○ indicates that fogging did not occur, X indicates that fogging has occurred).

As can be seen from these results, the adhesion width W that did not cause fogging was equal to or greater than the required minimum adhesion width A, while the adhesion width W that caused fogging was less than the required minimum adhesion width A. If the adhesion width W is equal to or greater than the required minimum adhesion width A, it can be confirmed that the water vapor that tries to enter between the facing surfaces 13a, 14a of the first and second lenses 13, 14 does not reach the inter-lens space S1. Further, as can be seen from these results, it is understood that a larger adhesion thickness T can ensure an easier permeating of water vapor (because there is an increased cross-section in the adhesion medium into which water vapor enters). Therefore, the required minimum adhesion width A is also increased. Accordingly, to reduce the applying amount of the adhesion medium and reduce the cost, it is preferable to reduce the adhesive thickness. Of course, the above-mentioned relationship between the adhesion width W and the required minimum adhesion width A also applies to an adhesion medium having a moisture permeability of 40 or less, which is difficult for water vapor to permeate.

As described above, if the adhesion width W of the adhesion medium for bonding the facing surfaces 13a, 14a of the first and second lenses 13, 14 to each other is equal to or larger than the required minimum adhesion width A, it is possible to prevent water vapor (that is about to enter between the facing surfaces 13a, 14a of the first and second lenses 13, 14) from reaching the inside of the inter-lens space S1. Therefore, the inside of the inter-lens space S1 between the first lens 13 and the second lens 14 is sealed to the outside, and the amount of water vapor in the inter-lens space S1 can be reduced even in a high temperature and high humidity environment. Thus, it is possible to suppress a dew condensation on the lens surface, particularly on the front surface (back surface) 13c of the first lens 13 on the image side.

Figure 38:
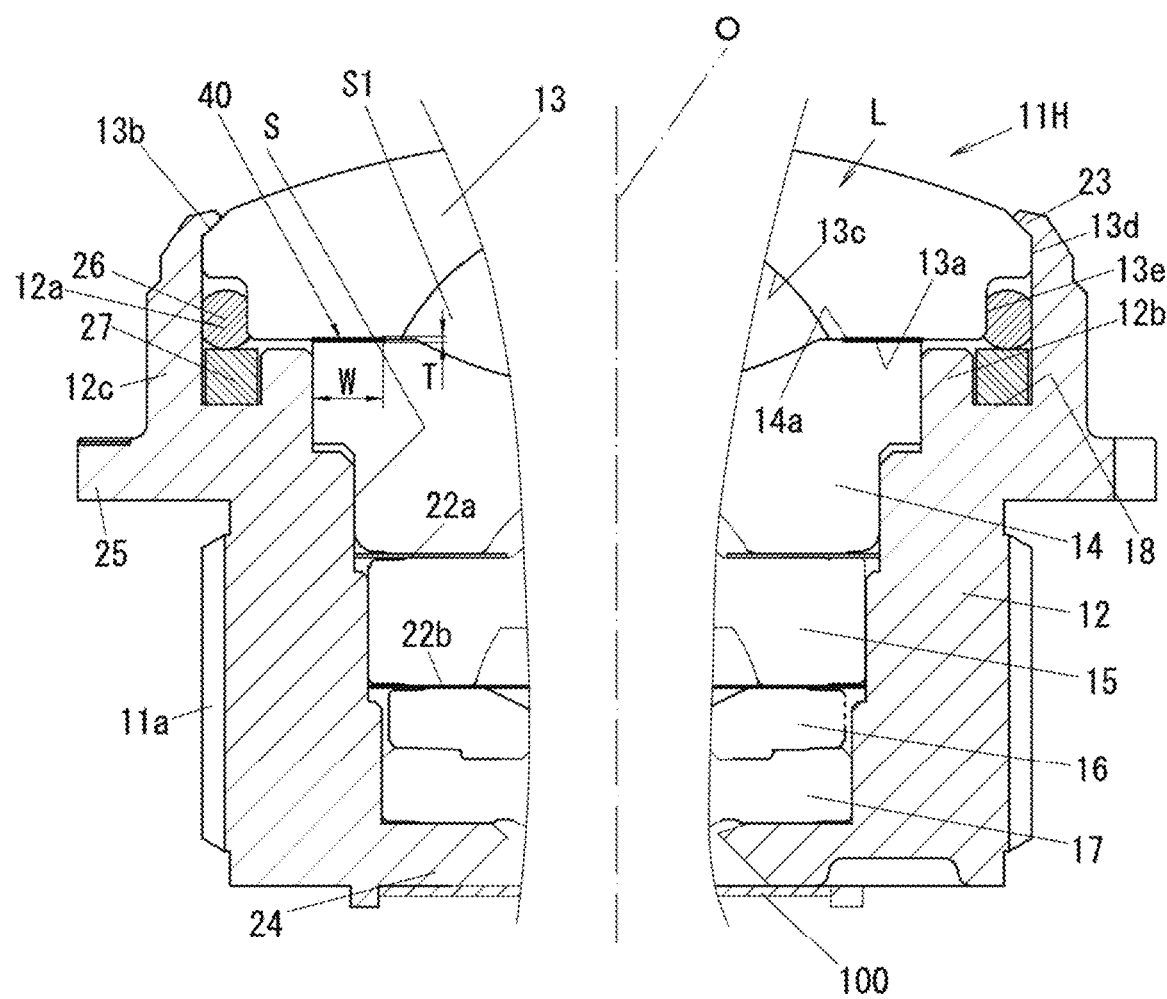
FIG. 38 Is a schematic cross-sectional view of a lens unit according to the 12th embodiment of the present invention.

FIG. 38 shows the lens unit 11H according to the twelfth embodiment, which is a specific example characterized by the adhesion width of such an adhesion medium. As shown in the figure, in the lens unit 11H, the inter-lens space S1 between the first lens 13 and the second lens 14 is opposed to each other in the optical axis direction so as to be sealed to the outside. The adhesion medium 40 is applied between the annular facing surfaces 13a, 14a of the first and second lenses 13, 14 extending in the radial direction. In this case, if a moisture permeability of the adhesion medium 40 is M (g/m²×24 hr), an adhesion width which is the radial dimension of the adhesion medium 40 is W (mm), and a thickness which is the optical axial dimension of the adhesion medium 40 is T (μm), when a related formula is effective which is (0.0016×M−0.004)×T=A (mm), the adhesion width W of the adhesion medium 40 is set to be equal to or greater than the required minimum adhesion width A.

The adhesion medium 40 used here is an adhesive having a moisture permeability M of 40 or more. Specifically, it is possible to use an olefin-based adhesive (an adhesive containing 50% by weight or more of an olefin-based resin (chain hydrocarbon having one double bond)) or an acrylic adhesive having a moisture permeability M of 40 or more (an adhesive containing 50% by weight or more of acrylic resin) and the like. On the other hand, it is also possible to use a urethane-based adhesive having a moisture permeability M of 40 or more (an adhesive containing 50% by weight or more of urethane resin), or an adhesive having a moisture permeability of 40 or less, for example, an epoxy-based adhesive (an adhesive containing 50% by weight or more of epoxy resin). Of course, it is also possible to use an adhesion medium other than an adhesive, for example, it is possible to use an elastic material having an adhesiveness (for example, gel). Preferably, the adhesion medium 40 be provided outside the effective diameters of the lenses 13, 14 (outside the optical surface through which light rays do not pass), and has the above-mentioned "radial followability", "tight adhesion", and "optical axial followability".

In the above-described embodiments, the shapes of the lenses, the intermediate spacer, and the lens barrel, and the shapes of the protrusions and recesses are not limited to the above-described embodiments. Further, although the above-described embodiments have disclosed means for preventing dew condensation on the lens surface, it is also possible to use (at the same time and in addition to the above-described dew condensation preventing means) other conventional method of installing a moisture absorbing material inside the lens unit. Further, in all the above-described embodiments, it is also preferable that the second lens 14 be made of a resin material such as resin having low moisture permeability (for example, 30 g/m²×24 h or less at a thickness of 0.025 mm). For example, it is preferable to use COP (cycloolefin polymer) or the like. As a result, not only is it possible to ensure an airtightness between the first and second lenses 13, 14, but also it is possible to prevent the invasion of water vapor into the inter-lens space S1 which will otherwise be caused due to the moisture permeation through the second lens 14 itself. Further, within a range not deviating from the gist of the present invention, it is also possible to combine a part or all of the above-described embodiments, alternatively it is possible to omit a part of one configuration described in the above-described embodiments. In addition, it is also possible to apply the technical matters described in each embodiment to other embodiments to obtain a desired effect.

EXPLANATIONS OF REFERENCE NUMERALS 11 lens unit
12 lens barrel
13 first lens
13a facing surface
13a' contact surface
13c back side (concave side)
13f surface (convex surface)
14 second lens
14a facing surface
14a' contact surface
14b annular recess (recess)
14c annular recess (recess)
14d stepped portion
14e convex portion
26 O-ring (sealing member)
40 adhesion medium
43, 43A, 43B, 43C protrusions
47 recess
52 sheet
130, 230 airtight material
140 facing region
150 airtight region
450 adhesion medium layer
451 first adhesion medium layer
452 second adhesion medium layer
455 thin plate-like inclusion (light-blocking plate, heater, rubber sheet)
460 convex portion (deterrent portion)
461 recess portion (deterrent portion)
462 concave groove (deterrent portion)
530 intermediate spacer
530a, 530b facing surfaces
531 caulking portion
548 adhesion medium
560, 570 convex portion (deterrent portion)
561, 571 recess (deterrent portion)
562, 562 concave groove (deterrent portion)
300 camera module
L lens group
O optical axis
S inner accommodation space
S1 inter-lens space

The invention claimed is:

1. A lens unit comprising:
an optical element including at least a lens group in which a plurality of lenses are arranged along an optical axis;
a cylindrical lens barrel having an inner accommodation space for accommodating and holding the optical element; and
a sealing member for sealing a space inside the lens barrel between a first lens and the lens barrel, wherein
the lens group includes the first lens located closest to the object side thereof; and a second lens adjacent to the first lens on the image side thereof,
optical elements and/or the optical element and the lens barrel are bonded to each other in an airtight state, such that an inter-lens space between the first lens and the second lens is sealed to the outside,
facing surfaces of the first lens and the second lens facing each other in the optical axis direction are bonded to each other using an adhesion medium having radial followability in a manner such that the inter-lens space is sealed to the outside, and
adhesive areas of the facing surfaces of the first lens and the second lens that are bonded to each other by the adhesion medium face the space inside the lens barrel that is sealed by the sealing member, wherein adhesive areas of facing surfaces of the first lens and the second lens face and overlap, in a radial direction, the inner accommodation space inside the lens barrel sealed by the sealing member, via a space formed between the first lens and the lens barrel.

2. The lens unit according to claim 1, wherein
when a moisture permeability of the adhesion medium (measured by cup method (JIS Z0208, constant temperature and humidity are 40° C. and 90% RH, thickness of the adhesion medium is 200 μm)) is M (g/m²× 24 hr), an adhesion width which is a radial dimension of the adhesion medium is W (mm), and a thickness of the adhesion medium which is its dimension in the optical axis direction is T (μm), and when (0.0016×M− 0.004)×T=A (mm) is effective, an adhesion width W is A or more.

3. The lens unit according to claim 2, wherein the moisture permeability M of the adhesion medium is 40 or more.

4. The lens unit according to claim 1, wherein
the facing surfaces of the first lens and the second lens facing each other in the optical axis direction are bonded to each other using an adhesion medium layer of the adhesion medium, in a manner such that the inter-lens space is sealed to the outside, the adhesion medium layer has a first adhesion medium layer located on the first lens side and a second adhesion medium layer located on the second lens side, a thin plate-like inclusion is interposed between the first adhesion medium layer and the second adhesion medium layer.

5. The lens unit according to claim 4, wherein the thin-plate like inclusion is a light blocking plate, a heater or a rubber sheet each having a light blocking property.

6. The lens unit according to claim 4, wherein the facing surface is provided with a deterrent portion that inhibits the adhesion medium applied to the facing surface from flowing into the inter-lens space.

7. The lens unit according to claim 4, wherein an adhesion medium forming the first adhesion medium layer and an adhesion medium forming the second adhesion medium layer are different types.

8. The lens unit according to claim 1, wherein the first and second lenses have annular facing surfaces that are facing each other in the optical axis direction and are extending in the radial direction of the lens, and on the radial outside beyond the radial outer edge of the facing region where the facing surfaces face each other, the adhesion medium is applied to outer surface of the first lens and/or the second lens, in a manner such that the inter-lens space is sealed to the outside.

9. The lens unit according to claim 8, wherein the adhesion medium is applied over the outer surface of the first lens and the outer surface of the second lens.

10. The lens unit according to claim 9, wherein the adhesion medium is used to bond the outer surfaces of the first lens and the second lens to the inner surface of the lens barrel.

11. The lens unit according to claim 8, wherein the adhesion medium is used to bond the outer surface of the second lens to the inner surface of the lens barrel.

12. The lens unit according to claim 8, wherein the adhesion medium is not applied to a range exceeding 50% or more of the thickness of the annulus in the facing region.

13. The lens unit according to claim 12, wherein the adhesion medium is not applied inside the facing region in the radial direction.

14. The lens unit according to claim 1, wherein the first and second lenses have annular facing surfaces facing each other in the optical axis direction and extending in the radial direction of the lenses, the second lens has i) a recess on the facing surface, which is filled with a fluidic airtight material for the adhesion to ensure airtightness between the first and second lenses, ii) a stepped portion adjacent to radial inner side of the recess, which is extending from the recess and entering the first lens side.

15. The lens unit according to claim 14, wherein the stepped portion is formed as a barrier for preventing the airtight material filled in the recess from flowing inwardly in the radial direction.

16. The lens unit according to claim 14, wherein the first lens is formed as a convex surface whose front surface is facing the object side and forms a convex shape, also forms a concave surface in which a back surface facing the second lens has a cavity recessed towards the lens inner side, the stepped portion of the second lens is formed by at least partially inserting a portion of the second lens facing the concave surface of the first lens into the cavity.

17. The lens unit according to claim 16, wherein a portion of the second lens entering the cavity is formed as a convex portion that fits into the concave surface forming the cavity.

18. The lens unit according to claim 14, wherein the second lens is formed of a resin based on a cycloolefin polymer.

19. The lens unit according to claim 1, further including an intermediate spacer inserted between the first lens and the second lens, wherein the inter-lens space is surrounded by the first lens, the second lens, and the intermediate spacer, wherein the first lens and the intermediate spacer, as well as the intermediate spacer and the second lens, are respectively arranged in a manner such that their facing surfaces facing each other in the optical axis direction are bonded to each other by the adhesion medium, in a manner such that the inter-lens space is sealed to the outside.

20. The lens unit according to claim 19, wherein the facing surface is provided with a deterrent portion that inhibits the adhesion medium applied to the facing surface from flowing into the inter-lens space.

21. The lens unit according to claim 19, wherein the intermediate spacer has a caulking portion;

the caulking portion is caulked by pressing the facing surface of the second lens in the optical axis direction towards the facing surface of the intermediate spacer.

22. The lens unit according to claim 1, wherein on at least one of the two facing surfaces of the first lens and the second lens facing each other, there is provided a protrusion having a height of 5-500 μm for ensuring the thickness of layer of the adhesion medium or an airtight material serving as the adhesion medium.

23. The lens unit according to claim 1, wherein between the facing surfaces of the first lens and the second lens facing each other, there is disposed a sheet having a thickness of 5-500 μm for ensuring the thickness of layer of the adhesion medium or an airtight material serving as the adhesion medium.

24. The lens unit according to claim 1, wherein at least one of the first lens and the second lens has a surface roughness of the facing surfaces which is 0.01-200 μm in terms of square average roughness Rq.

25. The lens unit according to claim 1, wherein the adhesion medium is black in color, and has a light transmittance rate of 20% or less in a wavelength region of 450 nm-650 nm.

26. The lens unit according to claim 1, wherein the hardness of the adhesion medium is in a range of A10-A100 or in a range of D10-D90 in terms of Shore hardness.

27. The lens unit according to claim 1, wherein one of the first lens and the second lens is made of glass and the other is made of resin, or the first lens and the second lens are both made of resin, while a difference in the linear expansion coefficients between the two lenses is $40 \times 10^{-6}$/K (m) or more.

28. The lens unit according to claim 1, wherein the water absorption rate of the adhesion medium is 5.0 wt % (JIS K6911 (1 hour boiling)) or less.

29. The lens unit according to claim 1, wherein a pressure in the inter-lens space between the first lens and the second lens is atmospheric pressure or less.

30. A camera module having a lens unit recited in claim 1.

31. A lens unit comprising:
a lens group in which a plurality of lenses are arranged along an optical axis;
a cylindrical lens barrel having an inner accommodation space for accommodating and holding the lens group;
a sealing member for sealing a space inside the lens barrel between a first lens and the lens barrel; and
a caulking portion provided in the lens barrel for fixing, in the optical axis direction, the first lens of the lens group accommodated in the inner accommodation space by being caulked inwardly in the radial direction, wherein
the lens group includes the first lens located closest to the object side thereof; and a second lens adjacent to the first lens on the image side thereof,
on at least one of contact surfaces of the first lens and the second lens which are in contact with each other, there is provided a recess which is filled with a material for ensuring an airtightness between the first lens and the second lens,
facing surfaces of the first lens and the second lens facing each other in the optical axis direction are in contact with each other, in a manner such that the inter-lens space is sealed to the outside,
the space inside the lens barrel that is sealed by the sealing member is adjacent to the recess filled with the material, and
the recess filled with the material is adjacent to contact areas of the facing surfaces of the first lens and the second lens that are in contact with each other, and
the recess faces the sealing member in the optical axis direction via a space formed between the first lens and the lens barrel.

32. The lens unit according to claim 31, wherein the sealing member has a hardness which is higher than the hardness of the material.

33. The lens unit according to claim 31, wherein i) an annular facing region in which the first lens and the second lens are in contact with each other on the contact surface, and ii) a tubular airtight region formed by filling the recess with the material, are disposed adjacent to each other in the radial direction of the first lens and the second lens.

* * * * *